US010236031B1

(12) United States Patent
Gurijala

(10) Patent No.: US 10,236,031 B1
(45) Date of Patent: Mar. 19, 2019

(54) TIMELINE RECONSTRUCTION USING DYNAMIC PATH ESTIMATION FROM DETECTIONS IN AUDIO-VIDEO SIGNALS

(71) Applicant: Digimarc Corporation, Beaverton, OR (US)

(72) Inventor: Aparna R. Gurijala, Port Coquilam (CA)

(73) Assignee: Digimarc Corporation, Beaverton, OR (US)

( * ) Notice: Subject to any disclaimer, the term of this patent is extended or adjusted under 35 U.S.C. 154(b) by 130 days.

(21) Appl. No.: 15/479,959

(22) Filed: Apr. 5, 2017

Related U.S. Application Data

(63) Continuation-in-part of application No. 15/145,784, filed on May 3, 2016.

(60) Provisional application No. 62/318,732, filed on Apr. 5, 2016, provisional application No. 62/457,892, filed on Feb. 11, 2017.

(51) Int. Cl.
| | |
|---|---|
| *G10L 19/00* | (2013.01) |
| *G10L 21/00* | (2013.01) |
| *G11B 27/32* | (2006.01) |
| *G11B 20/10* | (2006.01) |
| *G10L 19/018* | (2013.01) |

(52) U.S. Cl.
CPC .......... *G11B 27/323* (2013.01); *G10L 19/018* (2013.01); *G11B 20/10527* (2013.01); *G11B 2020/1062* (2013.01)

(58) Field of Classification Search
None
See application file for complete search history.

(56) References Cited

U.S. PATENT DOCUMENTS

| | | | |
|---|---|---|---|
| 6,625,780 B1 * | 9/2003 | Charbon | G06F 17/5045 716/103 |
| 6,674,876 B1 | 1/2004 | Hannigan | |

(Continued)

FOREIGN PATENT DOCUMENTS

| | | |
|---|---|---|
| WO | 2015100430 | 8/2015 |
| WO | 2016176056 | 11/2016 |

OTHER PUBLICATIONS

Muller, "Information Retrieval for Music and Motion", Section 4—Dynamic Time Warping, 2007.

(Continued)

*Primary Examiner* — Kevin Ky
(74) *Attorney, Agent, or Firm* — Digimarc Corporation

(57) ABSTRACT

A dynamic path estimation method reconstructs a program timeline in real time from an incoming stream of audio or visual content in which watermark payloads are redundantly encoded. A receiving device buffers a portion of the incoming signal, executes watermark detection on the contents of the buffer, presents detection results, and then advances the incoming signal in the buffer. Each detection result corresponds to different possible detection paths, as the detector does not reveal the precise position of the watermark payload. The dynamic path estimation method operates on the detection results to determine a global cost function for each possible detection path. As the incoming audio advances through a detection buffer, the method updates cost values for the possible paths, determines a global cost for the paths, and outputs a timeline based on the path of the lowest global cost.

20 Claims, 30 Drawing Sheets

(56) References Cited

U.S. PATENT DOCUMENTS

| | | | |
|---|---|---|---|
| 6,968,564 B1 | 11/2005 | Srinivasan | |
| 7,020,304 B2 | 3/2006 | Alattar | |
| 7,451,318 B1* | 11/2008 | Johnston | G10L 19/018 |
| | | | 380/252 |
| 7,574,686 B1* | 8/2009 | Wadland | G06F 17/5077 |
| | | | 716/126 |
| 8,300,884 B2 | 10/2012 | Sharma | |
| 8,548,810 B2 | 10/2013 | Rodriguez | |
| 9,292,894 B2 | 3/2016 | MacIntosh | |
| 9,466,307 B1 | 10/2016 | Sharma | |
| 9,607,623 B2* | 3/2017 | Chen | G10L 19/018 |
| 9,690,967 B1* | 6/2017 | Brundage | G06T 1/0021 |
| 2002/0054355 A1 | 5/2002 | Brunk | |
| 2002/0061118 A1 | 5/2002 | Tachibana | |
| 2002/0076084 A1 | 6/2002 | Tian | |
| 2002/0106104 A1 | 8/2002 | Brunk | |
| 2003/0004589 A1 | 1/2003 | Bruekers | |
| 2003/0177359 A1 | 9/2003 | Bradley | |
| 2006/0126892 A1* | 6/2006 | Tapson | G06T 1/005 |
| | | | 382/100 |
| 2006/0277530 A1* | 12/2006 | Wu | G06F 8/4434 |
| | | | 717/136 |
| 2007/0217649 A1* | 9/2007 | Lowe | G10L 19/018 |
| | | | 382/100 |
| 2008/0052516 A1 | 2/2008 | Tachibana | |
| 2008/0130941 A1* | 6/2008 | Araki | G10L 19/018 |
| | | | 382/100 |
| 2008/0310310 A1* | 12/2008 | Asher | H04L 45/12 |
| | | | 370/238 |
| 2009/0100243 A1* | 4/2009 | Ault | G06F 12/023 |
| | | | 711/170 |
| 2009/0175490 A1* | 7/2009 | Price | G06T 1/0021 |
| | | | 382/100 |
| 2010/0322469 A1 | 12/2010 | Sharma | |
| 2012/0214515 A1 | 8/2012 | Davis | |
| 2012/0251079 A1* | 10/2012 | Meschter | G06F 19/3481 |
| | | | 386/278 |
| 2012/0308074 A1* | 12/2012 | He | G06T 1/0064 |
| | | | 382/100 |
| 2013/0114847 A1 | 5/2013 | Petrovic | |
| 2013/0272672 A1* | 10/2013 | Padro Rondon | G03B 31/04 |
| | | | 386/201 |
| 2014/0108020 A1* | 4/2014 | Sharma | G10L 19/018 |
| | | | 704/500 |
| 2014/0142958 A1 | 5/2014 | Sharma | |
| 2014/0285338 A1 | 9/2014 | Davis | |
| 2015/0016661 A1 | 1/2015 | Lord | |
| 2015/0168538 A1 | 6/2015 | Bradley | |
| 2015/0293743 A1* | 10/2015 | Yang | G05B 15/02 |
| | | | 700/94 |
| 2016/0049154 A1* | 2/2016 | Chen | G10L 19/018 |
| | | | 700/94 |
| 2016/0055606 A1 | 2/2016 | Petrovic | |
| 2016/0217798 A1* | 7/2016 | Chen | H04N 1/3232 |
| 2016/0378427 A1 | 12/2016 | Sharma | |

OTHER PUBLICATIONS

Deller, "Discrete-Time Processing of Speech Signals", Chapter 11, Dynamic Time Warping, Wiley-IEEE Press, 2000.

* cited by examiner

Location of Detection Buffer
at device time, i

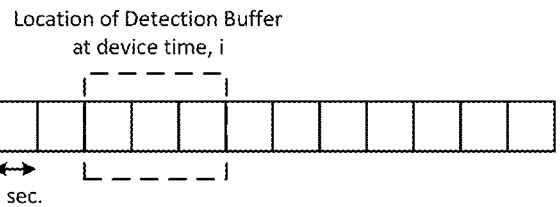

1 sec.

| Path | Path to cost mapping | Time since first occurrence plus 1 | Cost at time i (initial detection) | Location of wmkd audio Yes/No in each of the 3 1-second buffers | | |
|---|---|---|---|---|---|---|
| P1 | 1 | 1 | 3 | N | N | Y |
| P2 | 2 | 1 | 2 | N | Y | Y |
| P3 | 3 | 1 | 1 | Y | Y | Y |
| P4 | 4 | 1 | 2 | Y | Y | N |
| P5 | 5 | 1 | 3 | Y | N | N |

Location of Detection Buffer
at device time, i+1

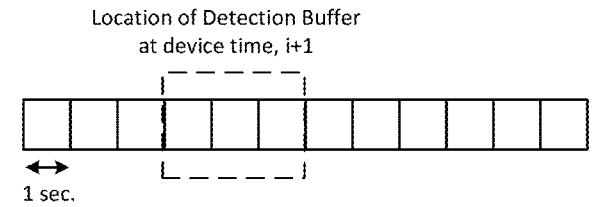

1 sec.

| Path | Path to cost mapping | Time since first occurrence plus 1 | Cost at time i+1 (second detection of initial payload) | Location of wmkd audio Yes/No in each of the 3 1-second buffers | | |
|---|---|---|---|---|---|---|
| P1 | 1 | 2 | 2 | N | Y | Y |
| P2 | 2 | 2 | 1 | Y | Y | Y |
| P3 | 3 | 2 | 2 | Y | Y | N |
| P4 | 4 | 2 | 3 | Y | N | N |
| P5 | 5 | 2 | β=1000000 | N | N | N |

Location of Detection Buffer
at device time, i+2

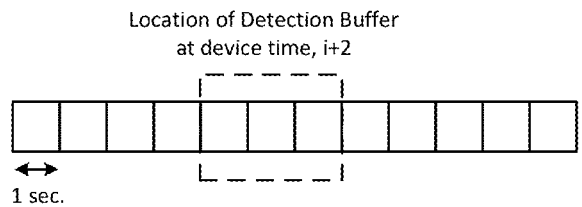

1 sec.

| Path | Path to cost mapping | Time since first occurrence plus 1 | Cost at time i+2 (second detection of initial payload) | Location of wmkd audio Yes/No in each of the 3 1-second buffers | | |
|---|---|---|---|---|---|---|
| P1 | 1 | 3 | 1 | Y | Y | Y |
| P2 | 2 | 3 | 2 | Y | Y | N |
| P3 | 3 | 3 | 3 | Y | N | N |
| P4 | 4 | 3 | β=1000000 | N | N | N |
| P5 | 5 | 3 | β=1000000 | N | N | N |

Fig. 31

TIMELINE RECONSTRUCTION USING DYNAMIC PATH ESTIMATION FROM DETECTIONS IN AUDIO-VIDEO SIGNALS

RELATED APPLICATION DATA

This application is a continuation in part of U.S. application Ser. No. 15/145,784, filed May 3, 2016, and this application also claims benefit of US Provisional Application Nos. 62/318,732, filed Apr. 5, 2016, and 62/457,892, filed Feb. 11, 2017, which are hereby incorporated by reference.

TECHNICAL FIELD

The invention relates to digital signal processing for signal recognition and identification, and encoding and decoding auxiliary signals in audio-visual signals.

BACKGROUND AND SUMMARY

Digital watermarking is type of signal processing in which auxiliary message signals are encoded in host content, such as image, audio or video signals, in a manner that is imperceptible to humans when the content is rendered. It is used for a variety of applications, including, for example, broadcast monitoring, device control, asset management, audience measurement, forensic tracking, automatic content recognition, etc. In general, a watermarking system is comprised of an encoder (the embedder) and a compatible decoder (often referred to as a detector, reader or extractor). The encoder transforms a host audio-visual signal to embed an auxiliary signal, whereas the decoder transforms this audiovisual signal to extract the auxiliary signal. The primary technical challenges arise from design constraints posed by real world usage scenarios. These constraints include computational complexity, power consumption, survivability, granularity, retrievability, subjective quality, and data capacity per spatial or temporal unit of the host audio-visual signal.

Despite the level of sophistication that commercial watermarking technologies have attained, the increasing complexity of audio-visual content production and distribution, combined with more challenging use cases continue to present significant technical challenges. Distribution of content is increasingly "non-linear" meaning that audio-visual signals are distributed and then redistributed within the supply chain among intermediaries and consumers through myriad of different wired and wireless transmission channels and storage media, and consumed on a variety of rendering devices. In such an environment, audio and visual signals undergo various transformation that watermark signals must survive, including format conversions, transcoding with various compression codecs and bitrates, geometric and temporal distortions of various kinds, layering of watermark signals and mixing with other watermarked or un-watermarked content.

Encoding of watermarks at various points in the distribution path benefits from a scheme for orchestrating encoding of a watermarks to avoid collision with previously embedded watermark layers. Orchestrating encoding may be implemented, for example, by including a decoder as a pre-process within an encoder to detect a previously embedded watermark layer and execute a strategy to minimize collision with it. For more background, please see our U.S. Pat. Nos. 8,548,810 and 7,020,304, which are hereby incorporated by reference.

While such orchestration is effective in some cases, it is not always possible for a variety of reasons. As such, watermarks need to be designed to withstand overlaying of different watermarks. Additionally, they need to be designed to be layered or co-exist with other watermarks without exceeding limits on perceptual quality.

When multiple watermark layers are potentially present in content, it is more challenging to design encoders and decoders to achieve the above mentioned constraints Both encoding and decoding speed can suffer as encoding becomes more complex and presence of watermark layers may make reliable decoding more difficult. Relatedly, as computational complexity increases, so does power consumption, which is particularly problematic in battery powered devices. Data capacity can also suffer as there is less available channel bandwidth for watermark layers within the host audio-visual signal. Reliability can decrease as the presence of potentially conflicting signals may lead to increases in false positives or false negatives.

The challenges are further compounded in usage cases where there are stringent requirements for encoding and decoding speed. Both encoding and decoding speed is dictated by real time processing requirements or constraints defined in terms of desired responsiveness or interactivity of the system. For example, encoding often must be performed within time constraints established by other operations of the system, such as timing requirements for transmission of content. Time consumed for encoding must be within latency limits, such as frame rate of an audio-visual signal. Another example with stringent time constraints is encoding of live events, in which encoding is performed on an audio signal captured at a live event and then played to an audience. See U.S. Patent Application Publication 20150016661, which is hereby incorporated by reference. Another example is encoding and decoding within the time constraints of a live distribution stream, namely, as the stream is being delivered, including terrestrial broadcast, cable/satellite networks, IP (managed or open) networks, and mobile networks, or within re-distribution in consumer applications (e.g., AirPlay, WiDi, Chromecast, etc.).

The mixing of watermarks presents additional challenges in the encoder and decoder. One challenge is the ability to reliably and precisely detect a boundary between different watermarks, as well as boundaries between watermarked and un-watermarked signals. In some measurement and automatic recognition applications, it is required that the boundary between different programs be detected with a precision of under 1 second, and the processing time required to report the boundary may also be constrained to a few seconds (e.g., to synchronize functions and/or support interactivity within a time period shortly after the boundary occurs during playback). These types of boundaries arise at transitions among different audio-visual programs, such as advertisements and shows, for example, as well as within programs, such as the case for product placement, scene changes, or interactive game play synchronized to events within a program. Due to mixing of watermarked and un-watermarked content and watermark layering, each program may carry a different watermark, multiple watermarks, or none at all. It is not sufficient to merely report detection time of a watermark. Demands for precise measurement and interactivity (e.g., synchronizing an audio or video stream with other events) require more accurate localization of watermark boundaries. See, for example, U.S. Patent Application Publications 20100322469, 20140285338, and 20150168538, which are hereby incorporated by reference and which describe techniques for synchronization and localization of watermarks within host content.

In some usage scenarios, mixing of watermark layers occurs through orchestrated or un-orchestrated layering of watermark signals within content as it moves through distribution. In others, design constraints dictate that a watermark be replaced by another watermark. One strategy is to overwrite an existing watermark without regard to pre-existing watermarks. Another strategy is to decode pre-existing watermark and re-encode it with a new payload. Another strategy is to decode a pre-existing watermark, and seek to layer a subsequent watermark in the host content so as to minimize collision between the layers.

Another strategy is to reverse or partially reverse a pre-existing watermark. Reversal of a watermark is difficult in most practical use cases of robust watermarking because the watermarked audio-visual signal is typically altered through lossy compression and formatting operations that occur in distribution, which alters the watermark signal and its relationship with host audio-visual content. If it can be achieved reliably, partial reversal of a pre-existing watermark enables additional bandwidth for further watermark layers and enables the total distortion of the audio-visual content due to watermark insertion to be maintained within subjective quality constraints, as determined through the use of a perceptual model. Even partial reversal is particularly challenging because it requires precise localization of a watermark as well as accurate prediction of its amplitude. Replacement also further creates a need for real time authorization of the replacement function, so that only authorized embedders can modify a pre-existing watermark layer.

As noted, an application of digital watermarking is to use the encoded payload to synchronize processes with the watermarked content. This application space encompasses end user applications, where entertainment experiences are synchronized with watermarked content, as well as business applications, such as monitoring and measurement of content exposure and use.

When connected with an automatic content recognition (ACR) computing service, the user's mobile device can enhance the user's experience of content by identifying the content and providing access to a variety of related services.

Digital watermarking identifies entertainment content, including radio programs, TV shows, movies and songs, by embedding digital payloads throughout the content. It enables recognition triggered services to be delivered on an un-tethered mobile device as it samples signals from its environment through its sensors.

Media synchronization of live broadcast is needed to provide a timely payoff in broadcast monitoring applications, in second screen applications as well as in interactive content applications. In this context, the payoff is an action that is executed to coincide with a particular time point within the entertainment content. This may be rendering of secondary content, synchronized to the rendering of the entertainment content, or other function to be executed responsive to a particular event or point in time relative to the timeline of the rendering of the entertainment content.

This specification presents approaches for achieving media synchronization at the listening device by building an explicit content timeline based on timing marks embedded in the content, or at a resolver service (e.g., a software implemented service executing on one more servers in the cloud) based on a predetermined timeline. Also, it presents approaches for refining the timeline estimation. The resolver service executes on a server that the listening devices accesses via a network connection. The listening device provides payloads and other context information to the resolver service such as device identifier, attributes, time stamps (e.g., output by local clock on listening device marking time of content capture and/or time stamps extracted from sensed content) and device location (GPS, venue, theater, outdoor event location). The resolver service uses this information to determine the response to provide back to the listening device. This may be secondary content for the user's device to render, or a pointer to and/or instructions on rendering secondary content. The user device renders the secondary content, e.g., in synchronization with sensed content or in synchronization with rendering on other user devices being exposed to the same sensed content (e.g., at a theater, venue, outdoor event where users are exposed to and sense the same content).

The embedded timing marks can be sequential payloads that repeat at regular intervals of time, or they can be a single payload repeating at a predetermined sequence of varying intervals of time (known to at the application or at the resolver service). Along with the timing payloads, the content may also be embedded with content identifying payloads. The listening devices and/or the resolver service use the identifying payloads combined with the content timeline to identify content and localize the content's events and to enable recognition triggered services at the listening devices.

Some use cases require recognition triggered services to be delivered to multiple listening device simultaneously. In this case, the devices are connected to the resolver service. The resolver service uses the timing marks detected by the different listening devices to build a tight estimate of the content timeline and to synchronize the delivery of the recognition triggered services to the listening devices.

Timeline Reconstruction Using Dynamic Path Estimation

This specification also presents technology for constructing a program timeline in real time based on in-line or ambient detection of watermarks in host audio-video content. Audio-video content comprises audio signals, video signals, and content with both audio and video signals, such as movies, TV and like audio-visual sequences with video frames and corresponding audio frames formatted and rendered to be output in synchronization with each other. The timeline construction applies to audio-video content where audio or video watermarks or fingerprints are detected and/or matched with a database of same to provide at least coarse program timing information.

In order for watermarks to survive degradation from transformations in distribution, watermark embedders redundantly encode a watermark signal (the watermark payload) over a space and time. This redundancy sacrifices time resolution for improved robustness. Though the embedder encodes a watermark payload at a fine time resolution, degradation can render instances of the payload undetectable. Yet over time, the detector aggregates detection results and provides a reliable output of the payload. However, the time resolution afforded by an individual instance is lost due to mis-detections and the need to aggregate detection over a longer time window.

To illustrate, consider an example in which a watermark payload of 64 bits is encoded in a duration of audio of 128 milliseconds. For ambient detection, the watermark must be reliably detectable, and thus, sufficiently robust to survive through digital to analog conversion, ambient transmission, detection by microphone, and analog to digital conversion. As such, the watermark payload is repeated over a longer duration of audio, such as three to six seconds. The parameters of payload size, repetition, and duration of audio vary with application requirements, yet this example illustrates that the redundant encoding of the payload provides robustness at the expense of timing resolution. The same is true for payloads redundantly encoded in a sequence of video frames.

One aspect of the invention is a method of timeline reconstruction. A dynamic path estimation method constructs a program timeline in real time from an incoming stream of audio or visual content in which watermark payloads are redundantly encoded. A receiving device buffers a portion of the incoming signal, executes watermark detection on the contents of the buffer, presents a detection result, and then advances the incoming signal in the buffer by a step (referred to as read frequency). Each detection result corresponds to different possible detection paths, as the detector does not reveal the precise position of the watermark payload. The detection paths, in turn, correspond to possible program times. The dynamic path estimation method operates on the detection results to determine a global cost function for each possible detection path. As the incoming audio advances through a detection buffer, the method updates cost values for the possible paths, determines a global cost for the paths, and outputs a program time based on the path of the lowest global cost. The method outputs a program time at each advance of the incoming signal in the buffer, and as such, provides program timeline granularity at finer resolution than the time length of the content segment in the buffer. Further, it provides this program timeline in real time, as the receiving device receives the incoming signal from ambient exposure or in-line reception. This performance capability enables applications that synchronize the rendering of auxiliary content with the incoming signal. It also enables real time tracking of the identity and duration of content that an audience or particular consumer is exposed to.

Further features will be described with reference to the following detailed description and accompanying drawings.

BRIEF DESCRIPTION OF THE DRAWINGS

FIG. 4 is a diagram illustrating a combined hardware and software system, with a watermark embedder plug in.

FIG. 31 illustrates an example of a process for updating cost of paths responsive to a detection result at each advance of the incoming signal.

DETAILED DESCRIPTION

Introduction

In this specification, we describe various technologies for managing encoding and decoding of watermark payloads, localizing watermarks, and options for layering or replacing identifiers embedded in audio visual content. These technologies are designed for applications in which the watermark must meet stringent survivability, subjective quality, reliability and performance requirements, in addition to enabling layering or ID replacement and fine-grain detection of watermark boundaries (and thus, boundaries for and duration or spatial extent of separately identified audiovisual content).

For background on watermark encoding and decoding, please see, for example, U.S. Pat. Nos. 6,614,914, 6,674,876 and 7,567,721, and above noted patents relating to watermark layering, all of which are hereby incorporated by reference. While the following discussion primarily illustrates audio signal examples, the following techniques also apply to video, and additional teaching regarding different signal types is provided in these patents.

Digital Audio Processing

In digital systems, audio is sampled at some sample rate (44.1 kHz for CD quality, 48 kHz, 96 kHz, 192 kHz for digital mastering and studios, or lower for lower quality applications). The audio is typically digitally sampled as a Pulse Code Modulated (PCM) signal. Each signal sample has some number of bits, typically between 16 to 24 bits.

In software/computer systems, to permit efficient processing, the stream of audio samples is broken into equal sized segments (typically of one of the sizes: 4096, 2048, 1024, 512, 256, 128, 64, 32 samples), with all the samples in that segment passed in a memory buffer.

When playing, capturing, or processing live audio, the audio data transported in these short frames of samples (e.g., from longer periods of 2048 samples down to as short as 64 samples) are passed at a regular interval to maintains the audio data sample rate. For example, 512 samples per buffer are transferred every 11.6099 ms for an audio stream sampled at 44.1 kHz.

Figure 1:
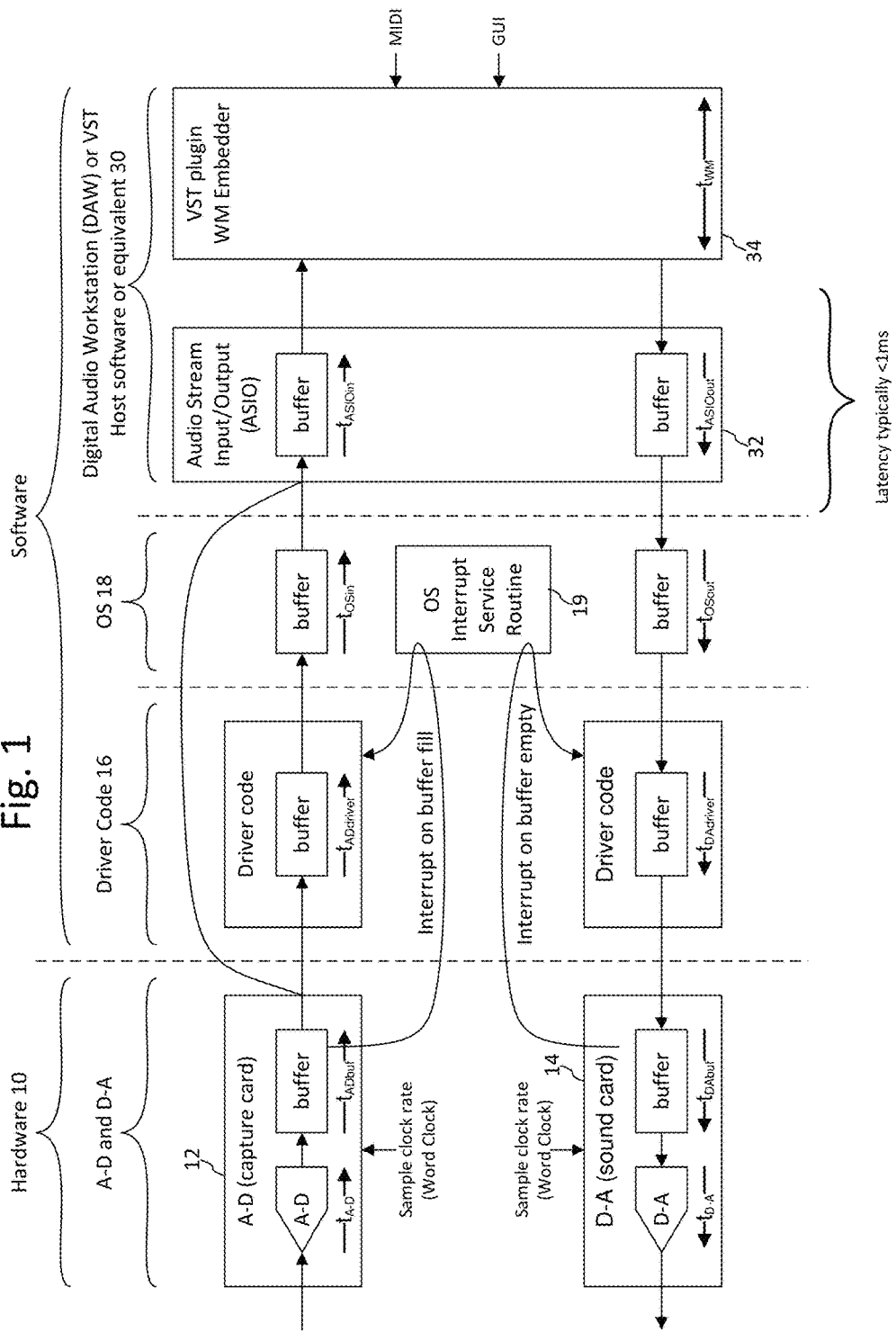
FIG. 1 is a diagram illustrating a combined hardware and software system for watermark embedding.

FIGS. 1-8 illustrate a variety of different software and hardware configurations of digital audio processing systems. FIG. 1 provides a generic depiction of computer-based, digital audio processing systems, which include hardware connected to a general purpose computer, and software running in the computer.

As shown in FIG. 1, the hardware 10 includes analog to digital (A-D) and (D-A) converters 12, 14 for input/output of analog audio signals and conversion of them to/from digital audio formats. This diagram provides examples of an A-D converter 12, e.g., a capture card, and D-A converter 204, a sound card. These hardware components typically include A-D/D-A circuitry and buffers, as shown. Sound card latencies are determined by sample rate and buffer depth. Latencies can be very low if the buffer is configured to be small. Smaller buffers require more interrupts, and thus, more driver and OS overhead. Faster sample rates provide lower latency and more interrupt overhead. A minimum buffer depth is determined by response time of Interrupt, OS and driver. Buffer lengths of 64 to 256 samples are typical. Buffer lengths are longer for non-interactive or non-live work, whereas buffer lengths may be shorter in some systems. The minimum buffer length of a particular application is typically dictated by system and driver performance and total computation workload.

The software portion of the configuration of FIG. 1 includes driver code 16, operating system (OS) 208, and Digital Audio Workstation (DAW) or Host Software equivalent 30. VST refers to Virtual Studio Technology, a type of interface for integrating software audio synthesizer and effect plugins with audio editors and hard-disk recording systems, available from Steinberg GmbH.

Driver code software 16 provides the interface between the sound card and the software executing in the computer. Driver latency depends on buffer depth and sample rate. Longer buffers mean more latency and less software overhead. Minimum buffer size is determined by system performance to avoid buffer under-run and sound glitches.

The operating system 18 provides a service for communicating audio data from the driver to the DAW or host software equivalent 30. This service is shown as the OS Interrupt Service Routine 19. OS latency is determined by any buffering internal to the OS, and sample rate. Some buffers may be set to zero depth.

The DAW 30 transfers audio in and out via in interface such as Audio Stream Input/Output 32. ASIO is a computer sound card driver protocol for digital audio specified by Steinberg, providing a low-latency and high fidelity interface between a software application and a computer's sound card. Whereas Microsoft's DirectSound is commonly used as an intermediary signal path for non-professional users, ASIO allows musicians and sound engineers to access external hardware directly. ASIO infrastructure is designed for low latency, but the DAW software will inevitable add some delay. Other mixer software and plugins add software overhead or cause delay equalization to be used.

A digital watermark embedder is shown as a plug-in software component 34 of the DAW 30. In an example shown in FIG. 2, the embedder plug-in is a VST plug-in containing a watermark embedder software application program. Latency is wholly determined by application code plus a little for a VST plug-in wrapper.

Figure 2:
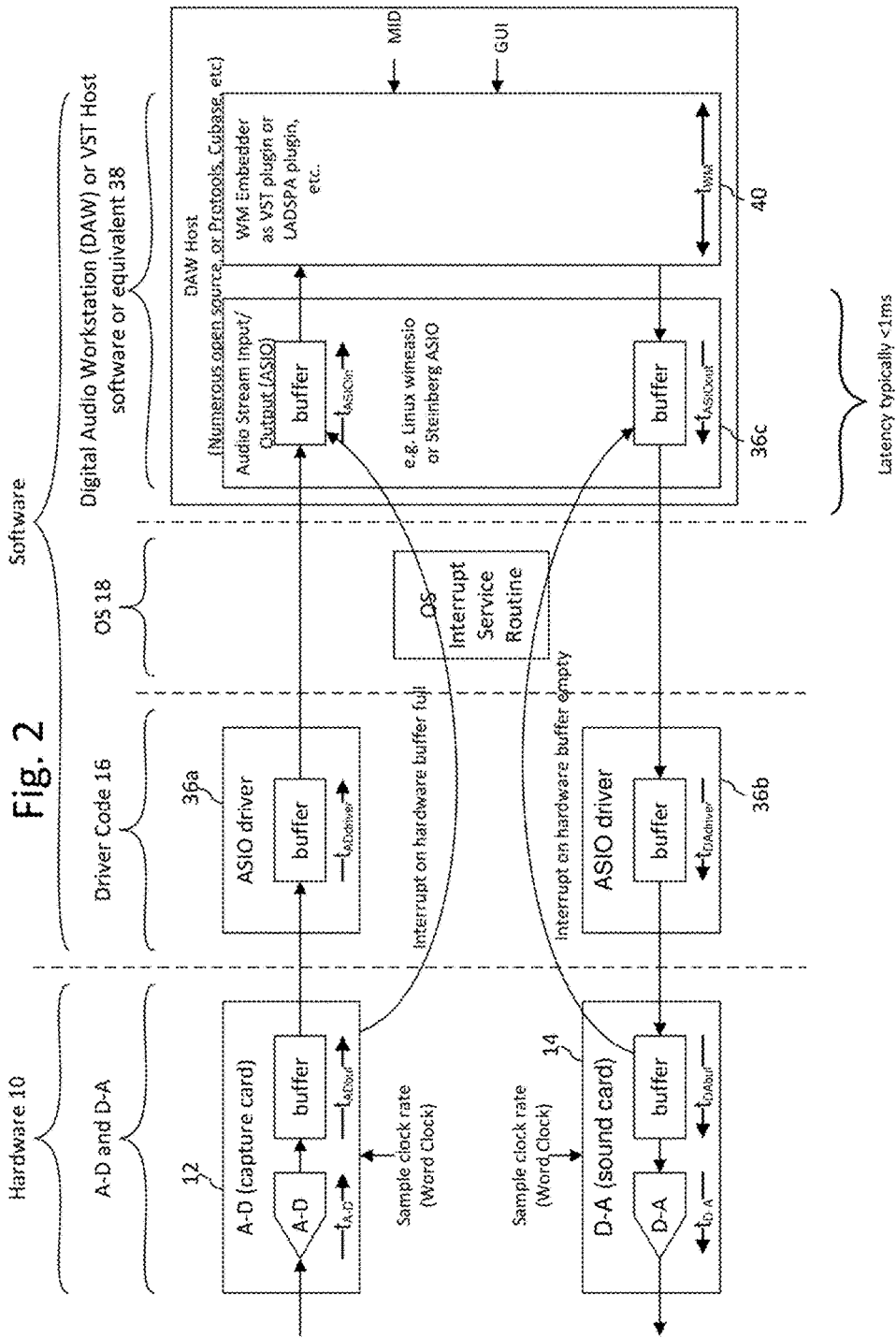
FIG. 2 is a diagram illustrating a combined hardware and software system for watermark embedding, using an Audio Stream Input/Output (ASIO) driver.

FIG. 2 is a diagram illustrating a combined hardware and software system for watermark embedding, using an Audio Stream Input/Output (ASIO) driver. The ASIO driver (36a, 36b, 36c) provides a bridge directly to a sound card, bypassing OS drivers. There is no data path latency because the ASIO layer talks directly to hardware. Driver code does not need buffers for ASIO. The infrastructure is designed for low data-path latency, but software will inevitably add some delay. Buffers are kept short or not used in this implementation. Other mixer software and plugins can add software overhead or cause delay equalization to be needed. OS drivers, like Microsoft's DirectSound, etc. use a driver and extra buffering per driver layer. Older Windows based implementations use WDM Kernel-Streaming. ASIO software from OpenSource project, ASIO4ALL, allows ASIO access to generic AC97 soundcards. In an ASIO implementation based on FIG. 2, a Win kernel layer can be bypassed with an ASIO driver, Linux wineasio.

FIG. 2 also provides examples of alternative DAW configurations (38). These include plug-ins 40 like Linux Audio Developers Simple Plugin (LADSPA) or LV2 on Linux wineasio. Other examples of DAW include Apple Inc.'s Audio Units, Digidesign's Real Time AudioSuite, Audiobus, Microsoft's DirectX plug-in, Steinberg's Virtual Studio Technology (VST) on ASIO, and Protocols (Avid) RTAS plug-ins.

Figure 3:
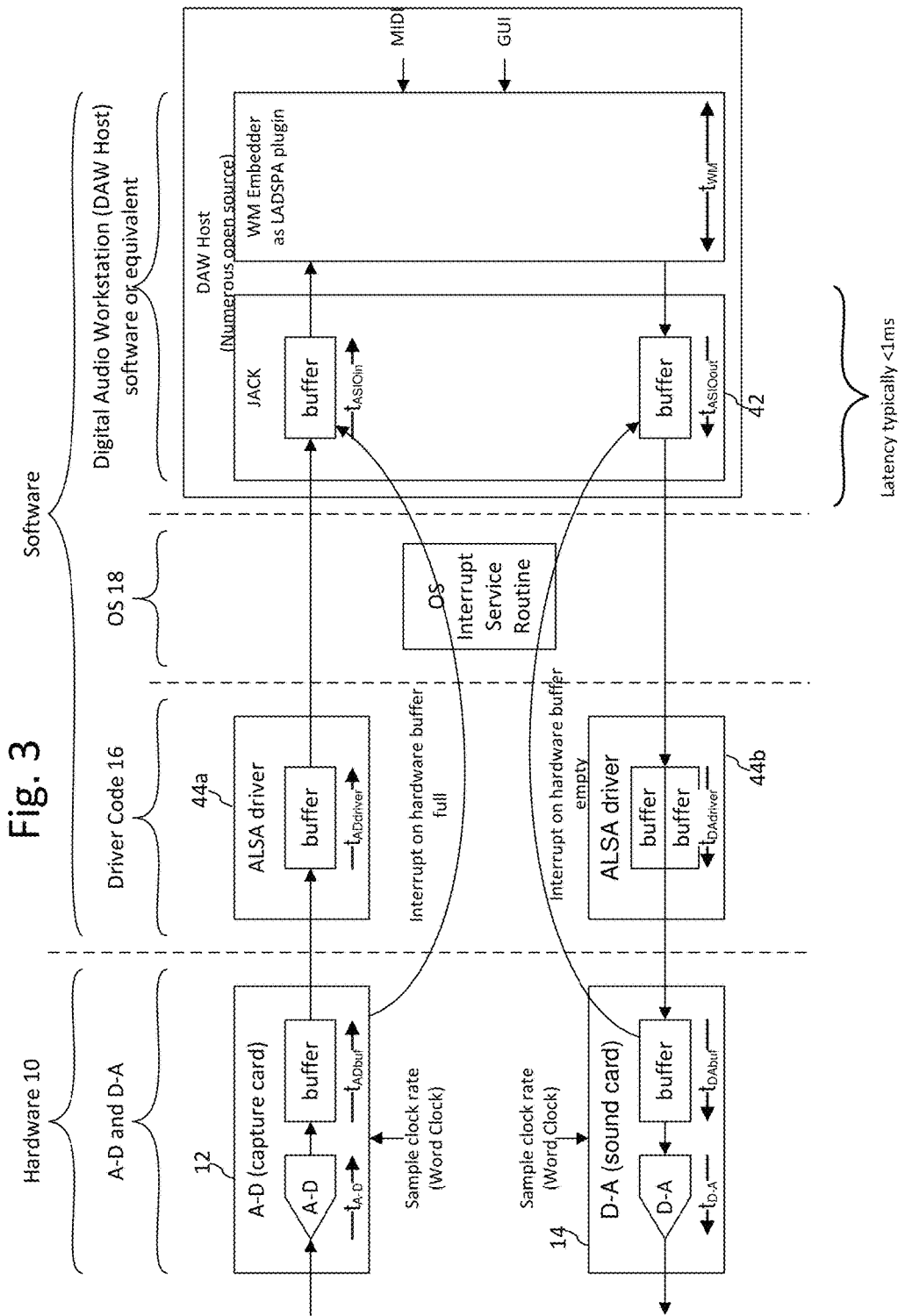
FIG. 3 is a diagram illustrating a combined hardware and software system for watermarking embedding, using the Jack Audio Connection Kit (JACK).

FIG. 3 is a diagram illustrating a combined hardware and software system for watermarking embedding, using the Jack Audio Connection Kit (JACK) 42. As depicted, the operation is similar to the configuration of FIG. 3, in that the ASIO interface enables the JACK embodiment to talk directly to the hardware. The drivers 44a, 44b are ALSA drivers. ALSA is Advanced Linux Sound Architecture, a free and open source software framework released under the GNU GPL and the GNU LGPL that provides an API for sound card device drivers. It is part of the Linux kernel.

Figure 4:
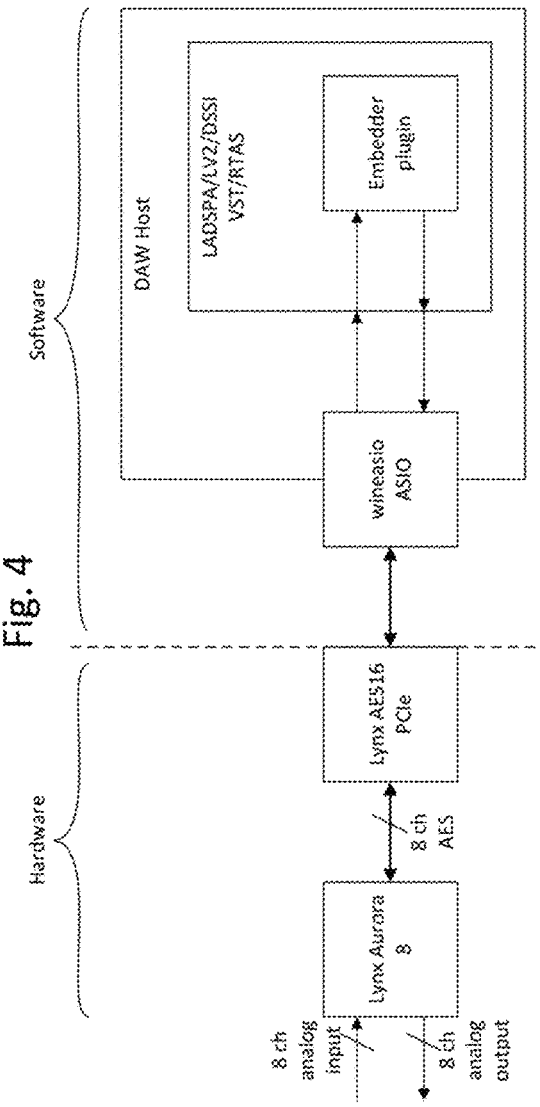

FIG. 4 is a diagram illustrating a combined hardware and software system, with a watermark embedder plug in. This diagram provides additional examples of A-D and D-A hardware. In this example, stand-alone D-A, A-D hardware is connected to the computer via an AES16 digital audio bus or PCI bus. WineASIO is an example of driver software. The DAW host uses a plug-in configuration, such as one of the examples listed (LADSPA, LV2, DSSI, VST, and RTAS).

Figure 5:
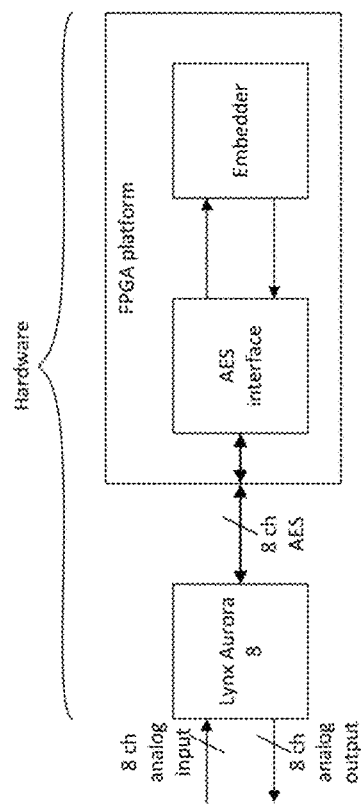
FIG. 5 is a diagram illustrating a hardware embedder.

FIG. 5 is a diagram illustrating a hardware embedder. In this configuration, there is D-A/A-D circuit connected to an embedder implemented in an FPGA, through a digital audio interface, e.g., AES. The embedder software code may be compiled to run in an audio-card DSP or in FPGA/DSP acceleration hardware (ProTools/Avid style). The embedder algorithms may be directly implemented in logic functions implemented on an ASIC or FPGA. In one embodiment, the entire watermark embedder (A-D, though FPGA to D-A) may be implemented as a stand-alone unit. In another embodiment, the watermark embedder may be implemented as software to run on a DSP within a DSP-based audio processing system. Various forms of interfaces may be used. Another example is a USB/FW interface to the A-D/D-A hardware.

Figure 6:
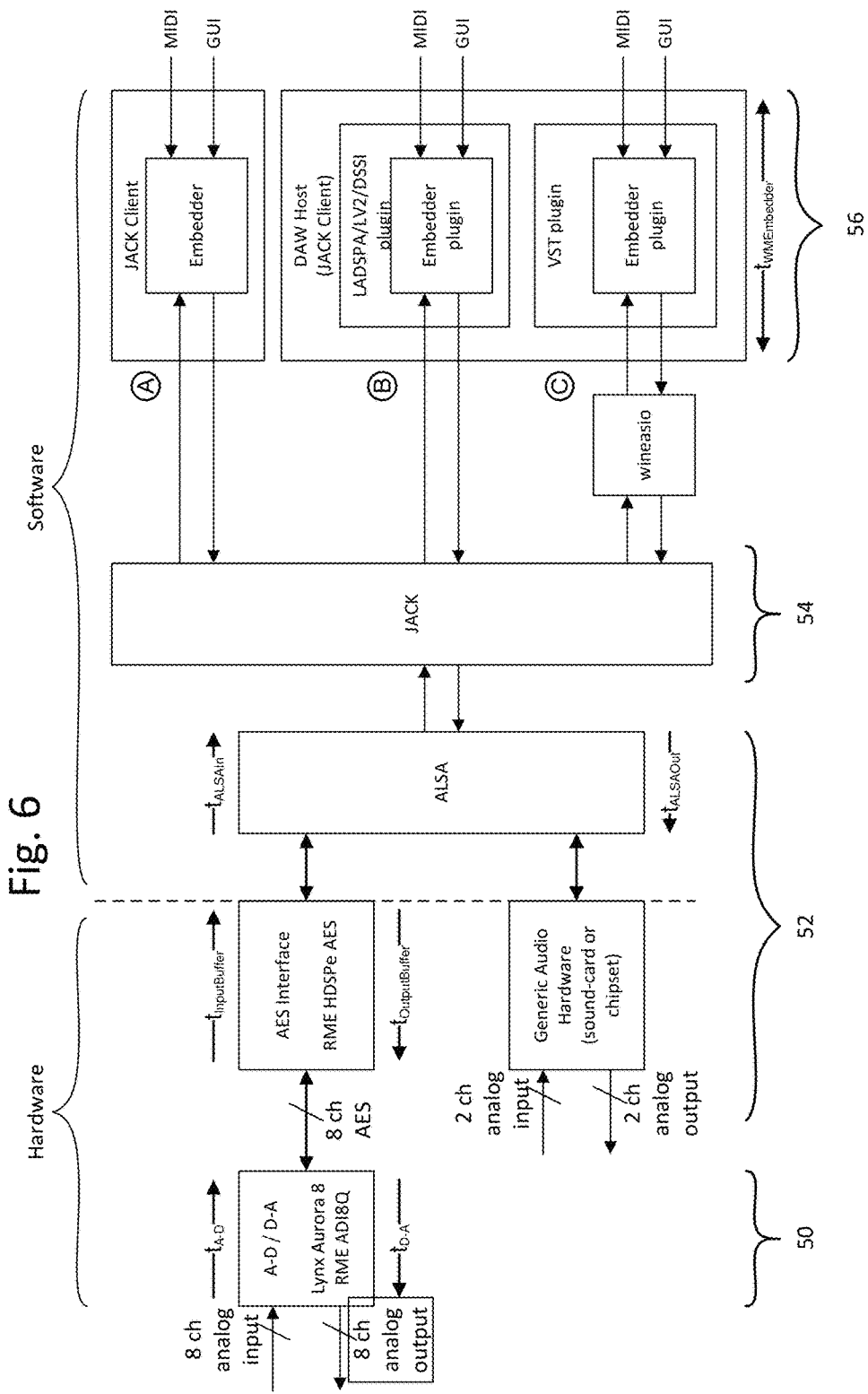
FIG. 6 is a diagram illustrating combined hardware and software systems, showing Linux hosted embedders.

FIG. 6 is a diagram illustrating combined hardware and software systems, showing Linux hosted embedders. The hardware section of FIG. 6 shows alternative embodiments, including one using higher quality, stand alone A-D/D-A converters connected to the computer via an AES interface (e.g., via the PCI bus of the computer), and one using more generic audio hardware, such as a sound card in the PC or standard PC audio chip set with audio input/output. The software section of FIG. 6 includes ALSA drivers that interface with various embedder configurations via the Jack Audio Connection Kit. Then, there are three alternative configurations, A-C, of embedders. In one, the embedder is a JACK client. In the other two configurations, the embedder is implemented as a plug-in of a DAW host. Latencies are determined by sample rate and buffer depth. They can be very low if the buffer is configured to be small (32 or 64 samples). Smaller buffers imply more interrupts, and thus, more software overhead (OS and application code). Faster sample rates imply lower latency and more interrupts and software overhead. Minimum buffer depth is determined by response time of software servicing hardware. Buffer lengths of 64 to 256 samples are typical, with longer for non-interactive or non-live work, and shorter possible in fast systems. Minimum length is typically dictated by system and driver performance and total computation workload. Typical latencies for stages labeled within the embodiments of FIG. 6 are as follows:

50: Typical latencies 1 or 2 samples.

52: Total Input Latency typically <1.5 ms, e.g., 1.45 ms @ 44.1 kHz & 64-sample buffer; Total Output Latency typically <3 ms, e.g., 2.9 ms @ 44.1 kHz & 2×64-sample buffers.

54: No practical latency introduced by JACK.

At stage 56, an embedder receives data in frames of samples, where frame length is equal to the ALSA/hardware input and output buffer lengths. Frame lengths are typically 32/64/128/256/512/1024 samples.

Figure 7:
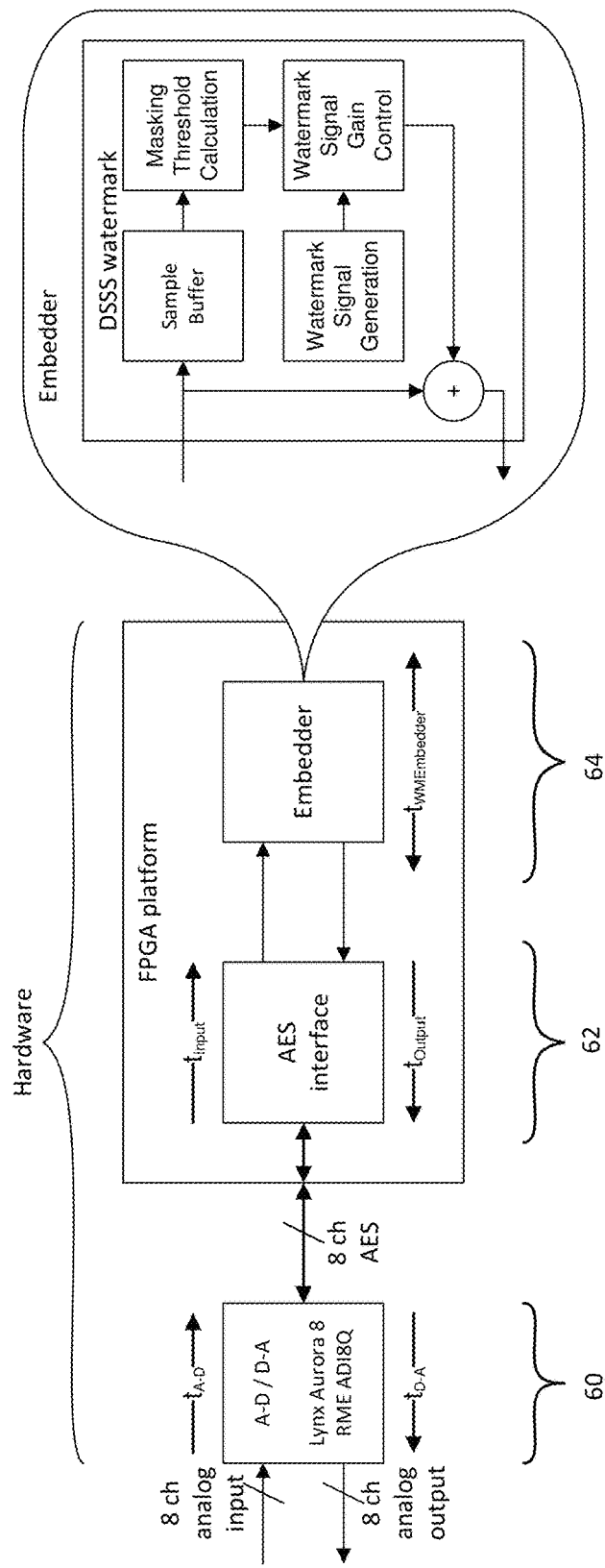
FIG. 7 is a diagram illustrating a hardware embedder with additional detail of a watermark embedder.

FIG. 7 is a diagram illustrating a hardware embedder with additional detail of a watermark embedder. In particular, FIG. 7 shows an expanded view of a watermark embedder in the configuration shown in FIG. 5. We provide additional description of a time domain Direct Sequence Spread Spectrum (DSSS) watermark embedder below, and in the patent documents incorporated by reference. In this embodiment, the latencies are determined by sample rate and total hardware sample pipeline length. They can be very low if total number of samples in pipeline is minimized to <10. Faster sample rates imply lower latency. Examples of the latencies per stage are as follows:

60: Typical latencies 1 or 2 samples.

62: Total Input Latency reduced to 1 or 2 samples; Total Output Latency reduced to 1 or 2 samples.

At 64, an embedder receives data as stream of individual samples. No buffering is required. Latencies in an audio stream can be minimized to 1 or 2 samples. The embedder may additionally store audio data internally to any depth for analysis.

Figure 8:
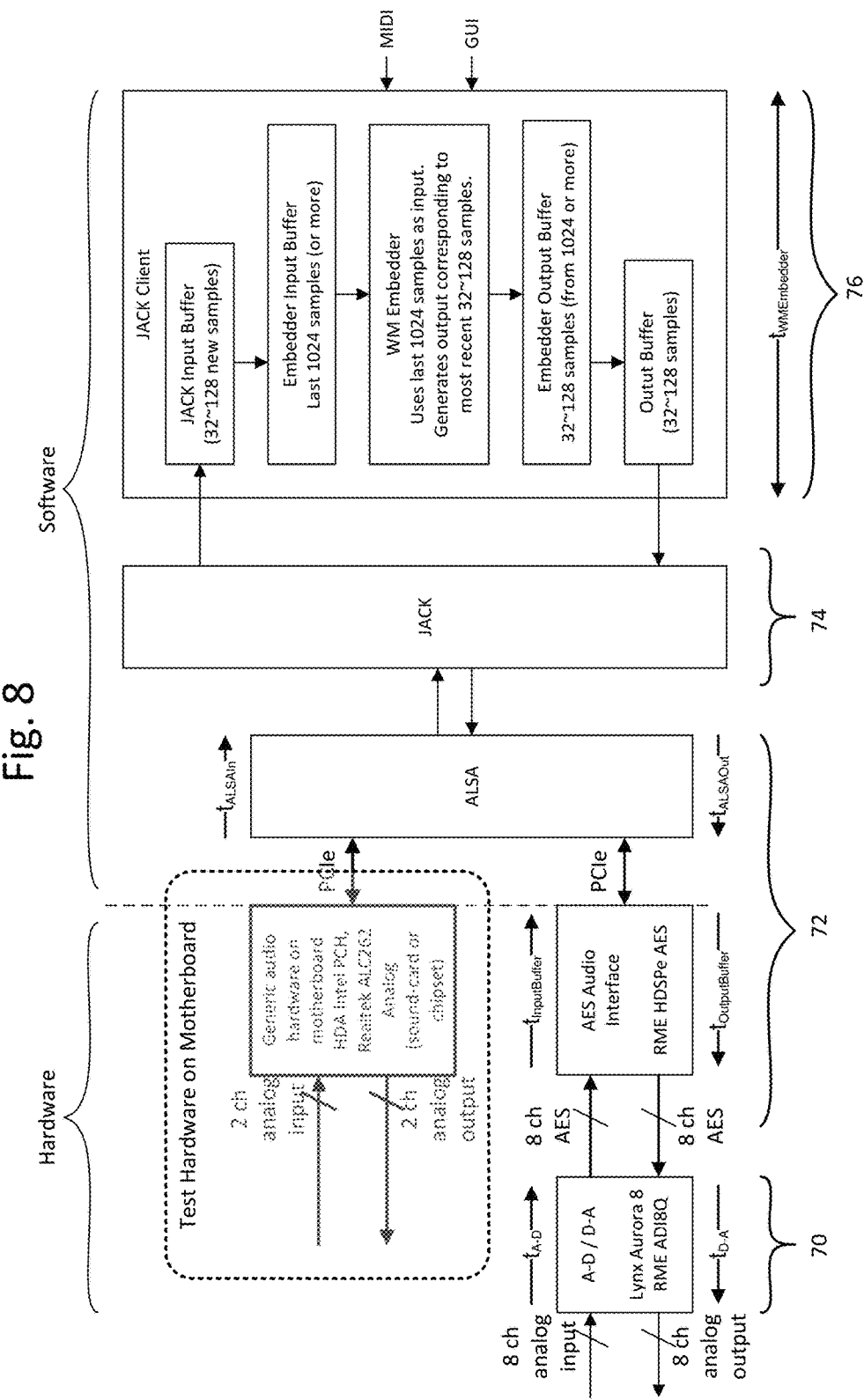
FIG. 8 is a diagram of yet another combined hardware and software system in which the embedder is implemented as a JACK client.

FIG. 8 is a diagram of yet another combined hardware and software system in which the embedder is implemented as a JACK client. The right side of the diagram provides an expanded view of an embedder for an implementation designed according to configuration A in FIG. 6. The embedder can be called less frequently than audio buffer transfer events to the JACK client containing the embedder. The Jack Client is called every time its input buffer is updated. The embedder could be called less frequently if necessary at the tradeoff of overall latency. Examples of latencies at stages in FIG. 8 are as follows:

70: Typical latencies 1 or 2 sample periods (20~40 μs @ 48 kHz).

72: Total Input Latency typically <1.5 ms, e.g., 1.33 ms @ 48 kHz & 64-sample buffer; Total Output Latency typically <3 ms, e.g., 2.33 ms @ 48 kHz & 2×64-sample buffers.

74: No practical latency introduced by JACK transport layer.

At 76, an embedder receives data in frames of samples, where frame length is equal to the ALSA/hardware input and output buffer lengths. Frame lengths are typically 32/64/128/256/512/1024 samples.

Typical computer implementations have a sound-card with an analog-to-digital converters to capture audio samples, and digital-to-analog converters to play back audio samples. The sound-card also works on audio samples transferred to/from the computer in short frames of samples.

When capturing audio, the sound-card captures a buffer-full of samples then signals to the computer that data is ready for collection. The sound-card hardware may also directly transfer the data to computer memory to a pre-allocated buffer space. The computer software will then take a small finite time to respond before it can further process this buffer-full of audio samples.

When playing back audio, the sound-card signals to the computer when it is ready for data, and the computer responds (when it is available to) by transferring a buffer-full of audio samples to the playback hardware. Typically, the playback hardware will make the request for the next buffer of data before the buffer being played back is empty, giving time for the computer to respond and transfer the next buffer of data, thus ensuring continuity of the audio data stream.

If there are delays in the computer or software (maybe another high priority process is taking place which prevents audio processing), then a whole frame of data may still be unavailable at the instant the next sample is required for playback or processing. This causes buffer under-runs which manifest as clicks and pops in the audio. Thus, additional buffers of data are kept queued up ready for playback in the sound-card hardware to ensure there is always a next sample ready to play back.

Additional queuing or buffering can be included in the hardware or software to give greater freedom for the system software and operating system in scheduling data transfers.

Where multiple channels or audio (e.g. stereo) are processed, each channel is captured independently and typically passed with its own buffers. Though some software systems can group multiple channels into one buffer, the audio data is still unique per channel.

In live audio processing, the managing software and system operating system are configured to ensure that the audio data processing and transfer to and from audio hardware is of highest priority.

To process live audio, there are two main issues:

1. Processing is fast enough to keep up with the audio data stream: the sample rate determines the total amount of data to process and the rate at which it must be processed; and
2. The buffer lengths used to transfer the audio data determine how frequently the computer must be interrupted to process the data: longer buffers mean less frequent interruptions and less computational overhead.

The overall delay (latency) between input and output audio—capturing a buffer of data before each processing step or playback causes a delay. The delay per buffer is equal to (number of samples in the buffer)/(sample rate). Latency can be reduced by reducing buffer lengths and increasing the sample rate, at the cost of higher computational workload due to a faster buffer processing rate. Reducing the number of buffers at each stage of the audio data path also reduces the latency.

Typically there are the following buffers (at a minimum) for each of the audio data path stages:
a) One for audio capture (typically late response by the computer is not critical here)
b) One in the audio transport layer for processing
c) Two in the audio playback (2nd buffer must be there in case computer responds late, otherwise a click is heard)

A software process that operates on the audio stream will be called at the second step (b) when segments of audio are available in buffers in computer memory. The computation must be complete within the timespan of the audio segment held in the buffer. If computation takes longer, the resulting audio segment will not be ready for playback, and cumulative processing delay causes subsequent segments of data to be later and later, breaking any real-time processing capability.

Figure 9:
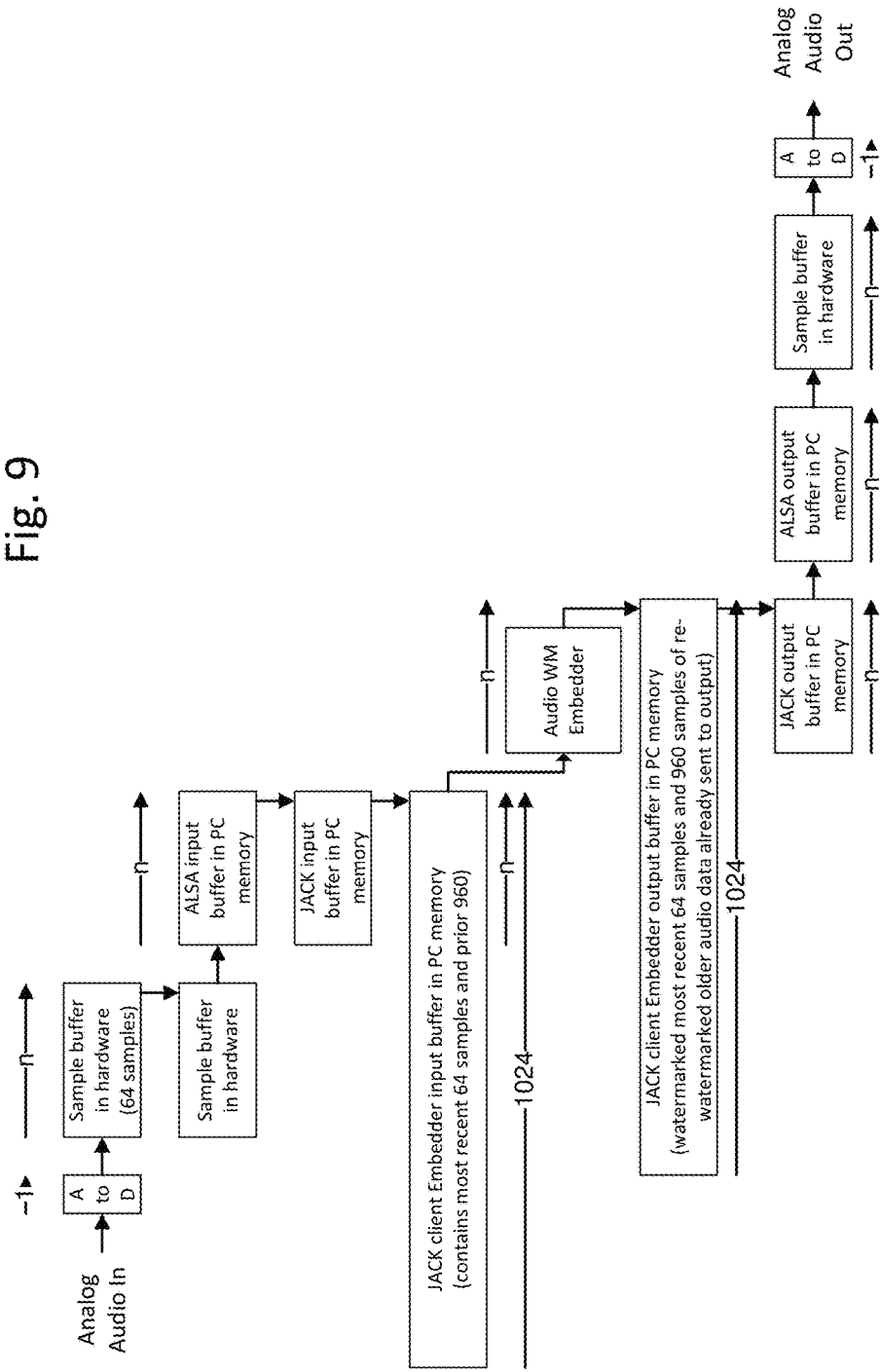
FIG. 9 is a diagram illustrating latencies associated with watermark embedding.

FIG. 9 is a diagram illustrating an example of the latencies associated with this digital audio processing. This particular example shows buffer configurations for an implementation with an ALSA/JACK interface between the hardware and embedder, like the one in FIG. 8. The buffer for watermark embedding has a length of 1024 samples, which is dictated based on the perceptual model, which uses this length of audio segment to compute the mask used to insert the watermark.

Live Event and Real Time Audio Watermarking

Within this environment, we now describe a process of embedding a watermark into live audio at low latency in software in a computer. We also provide a hardware embodiment.

Audio watermarking involves insertion of a human-imperceptible but machine readable auxiliary data signal (also referred to herein as a "watermark" or a "watermark signal") into an audio stream. This signal is inserted subject to masking rules defined to ensure the inserted signal is imperceptible to the listener.

The perceptibility masking is a function of current audio, previously played audio, and upcoming audio, and the spectral content of the watermark signal to be added. For more on perceptual masking for audio, please see U.S. patent application Ser. No. 15/213,335, filed Jul. 18, 2016, entitled HUMAN AUDITORY SYSTEM MODELING WITH MASKING ENERGY ADAPTATION, which is hereby incorporated by reference.

The watermark signal may be added to either the time-domain representation of the audio stream, or the frequency domain (e.g., within the human auditory range, or outside the human auditory range such as in the ultrasound frequency range). It will be appreciated that various combinations of any of these, and any other suitable or desired, types of watermark signals may be employed. For more background on such watermark signals, see U.S. Patent App. Pub. No. 2014/0108020 and application 2014/0142958, as well as U.S. Patent App. Pub. No. 2012/0214515, incorporated herein.

Frequency-domain insertion operates on longer segments of audio, which are usually overlapping in time. Issues of transitions between these longer segments are handled by windowing the signal content of the overlapping segments before re-combining them. The insertion method must avoid perceptible distortion or other artifacts at the transition from one frame to another (an audio equivalent of the block artifacts seen in over-compressed TV broadcasts, where the boundaries of compressed video blocks become noticeable to viewers.)

The audio stream is captured, processed (e.g., in an audio processing system at a venue), and played back to the audience at the venue as explained earlier. Watermarking is performed in the intermediate stage (processing stage), with processing performed at the time each new segment of audio becomes available. The watermark masking model calculation and watermark signal calculation use a much longer duration series of samples of audio data than are available in a single audio transport-layer segment. For example, the masking model uses a buffer of the most recent 1024 audio samples compiled from the most recent 8 segments of 128 samples, where when the next segment of 128 samples arrives, these are appended to the front of the buffer of 1024 and the oldest 128 discarded from the end; the masking model is computed again afresh each time. Refer, for example, back to FIG. 9, which shows this type of buffer arrangement.

Masking Model

The masking model uses history of sound to provide forward masking of watermark to be added. In live embedding, reverse masking cannot practically be done because future sounds are not available for deriving the masking from them. Waiting for future sounds to be captured causes a delay in being able to transmit the audio because these future sounds need to be captured and analyzed before the watermarked audio based on them is transmitted. Certainly, such reverse masking is possible where latency is not a concern, such as when embedding is not live, or where more latency is tolerable. In one of our embodiments for live embedding, the masking function only uses audio data from the current time frame (segment) and earlier ones.

The watermark masking process uses a longer duration sample of audio than is contained within a single segment passed through the software. This longer audio sample is needed to fully contain a broader range of audio frequencies than can be contained in a short few millisecond segment. Lower frequencies require at least a few hundred milliseconds of audio.

Each new segment of audio is added to the longer sample, in a rolling manner, such that the long sample contains the latest few segments comprising a few 100 ms of audio.

The masking model analyzes this whole audio buffer, which contains historical audio samples in addition to audio samples for the current segment being watermarked. All of this data is used for computation of the masking model needed for inserting watermark signal data into the current audio segment.

The buffer may also contain data for audio that is to follow on after the currently processed segment, permitting a more complete masking model calculation. Inclusion of data that follows after the currently processed segment requires either prior access to this audio data, since it has not yet been generated by the audio source, or the processing is delayed between input, processing and output, such that knowledge of the following audio can be found during this delay period. Or, as another alternative, access to audio data following the current segment may be obtained if watermarking is performed on audio data stored in files, where the whole audio file is available for examination from the perspective of any instant in time within the audio stream. This is possible where there are pre-recorded audio files that are watermarked at an event.

Some masking model computations are performed in the frequency domain. To get sufficient spectral resolution at lower frequencies, a longer segment of audio samples is required. Using longer segments of samples, though, result in poorer temporal localization of audio masking effects. Ideally, watermark insertion is exactly tuned to the frequency content of the audio signal at every instant in time. For more on audio watermark masking, including frequency domain masking and time domain masking, see U.S. Patent App. Pub. No. 2014/0108020 and application 2014/0142958, as well as U.S. Patent App. Pub. No. 2012/0214515, incorporated herein. Please also see U.S. patent application Ser. No. 15/213,335, filed Jul. 18, 2016, entitled HUMAN AUDITORY SYSTEM MODELING WITH MASKING ENERGY ADAPTATION, which is also incorporated by reference.

Time-Domain Watermark Insertion

In a form of watermarking called time domain insertion, the watermark signal is inserted directly sample-by-sample to the audio stream in the time domain. A process for time domain watermarking is:

1) A buffer of audio is collected, converted to a frequency domain, and that frequency domain representation of the audio segment is examined to determine the masking function.

2) Simultaneously, a segment of convolution-coded watermark payload data is taken and converted to the frequency domain.

3) The masking function is applied to the frequency-domain representation of the watermark signal.

4) The combined frequency-domain watermark is converted back into the temporal domain and added to the audio sample stream. Only the short segment of watermark corresponding to the current most recent segment of audio is added.

One example of time domain watermarking that may be applied using this method is called Direct Sequence Spread Spectrum (DSSS) embedding in U.S. Patent App. Pub. No. 2014/0108020 and application 2014/0142958, and time domain methods are also described in U.S. Patent App. Pub. No. 2012/0214515, incorporated herein.

Before embedding starts, the watermark data sequence is pre-calculated for the watermark identifying information (e.g., watermark ID) to be inserted. The embedded watermark sequence is repeated continually, or until the watermark information is changed, whereupon the sequence is re-calculated for the new watermark information. The sequence length may be as much as a couple of seconds.

For time-domain watermark embedding, a segment of this payload will be added to each segment of audio, with the data segment modified as a function of the masking model for the audio at that time.

The masking model can potentially be calculated afresh after each new audio sample, using the past N samples. This will give a better fitting of the masking model to the audio stream. This re-calculation with each sample can be achieved where the watermark embedder is implemented as a digital circuit on FPGA or ASIC (e.g., See FIG. 7).

Frequency-Domain Watermark Insertion

Frequency domain watermark insertion tends to be more difficult for real-time low-latency watermark insertion using certain embedding techniques for reasons explained below.

A process for frequency domain watermarking is:

1) A buffer of audio is collected, converted to frequency domain, and examined to determine the masking function.

2) Simultaneously, a segment of error correction coded (e.g., convolutional coded) watermark payload data is taken and converted to the frequency domain.

3) The masking function is applied to the frequency-domain representation of the watermark signal which is then added to the frequency representation of the audio signal.

4) The combined frequency-domain audio plus watermark is converted back into the temporal domain and sent out as audio samples.

Overlapping the periods of data which are being watermarked is beneficial for minimizing audible artifacts. Audio data and watermark payload data are appropriately windowed prior to conversion to the frequency domain. Thus, when the final time-domain watermarked segments of audio are combined the transition from segment to segment is smooth.

A drawback of working with overlapping buffers is that the amount of overlap adds a further corresponding delay (latency) to the audio path (e.g., a half period overlap of 512 samples for 1024 sample segments being embedded will mean an additional 512 sample delay in the output audio, or about 10 ms at a 48 kHz sample rate.)

There is additional latency due to masking insertion of data into the frequency-domain, where the audio segment being transformed into the frequency domain is longer than the audio transport layer segments. This means audio data cannot be sent out until enough has been collected to process.

Some frequency domain techniques can pose additional challenges for live embedding. In one scheme described in U.S. Patent App. Pub. No. 2014/0108020 and application 2014/0142958, the same static watermark signal is added to frames of data for a longer duration, before changing to a complementary data pattern for the next period of time. In the next period, the complementary data pattern is reversed, which provides benefits in the detector by enabling the host signal to be cancelled and the watermark signal boosted by taking the difference of the signals in these two time periods.

Potentially, the watermark signal can be added incrementally in time, with significantly more computation.

The sampled audio signal is transformed to the frequency domain using an FFT, the watermark signal is added to each frequency bin, and then the frequency-domain representation is transformed back to the temporal domain, by an inverse FFT, resulting in a watermarked audio stream in the time domain.

Real-Time Low-Latency Specific Issues

The masking model and watermark insertion can be computed more frequently, to allow supporting shorter audio transport buffer lengths. But this can be done only up to a point where the computation can be performed in the time available before the next buffer of audio data becomes available.

Accumulating overlapping watermarked segments may be unnecessary if computation is performed every new sample with fast hardware. In this case the latency can be dropped to one or two samples (in the order of a few tens of microseconds). The masking model will still use the most-recent N samples (e.g. 1024 samples).

Watermark Layering

Generally, audio content output at an event can be embedded with auxiliary data via one or more digital watermark embedding processes. Thus, audio content can be embedded with one or more "layers" of watermarks.

In one embodiment, embedding processes used to embed plural watermark layers into a common item of audio content may be carried out by a single entity or multiple, different entities. For example, a first watermark layer may be embedded into an item of audio-visual content (e.g., a song, TV show, movie, advertisement) by a first entity (e.g., a record company or studio that recorded or produced the song, marketed the song, promoted the song, distributed sound recordings/music videos associated with the song, etc.), thereby generating a pre-embedded audio content item. This pre-embedded audio content item can then be output at the event (e.g., as discussed above with respect to mixing process, either by itself or mixed with other audio). Alternatively, a second watermark layer can be embedded into this pre-embedded audio content item (e.g., either by the first entity, or by another entity) at an event or subsequent point in signal distribution.

Generally, auxiliary data conveyed within different watermark layers will be different (although it will be appreciated that different watermark layers can convey the same auxiliary data). For example, and to continue with the examples given in the paragraph above, auxiliary data conveyed by the first watermark layer may include a first item of identifying information (e.g., a first watermark ID), a first item of synchronization information (e.g., one or more time codes, etc.), or any other information or metadata as described herein, or the like or any combination thereof. Likewise, the auxiliary data conveyed by the second watermark layer may, for example, include a second item of identifying information (e.g., a second watermark ID), a second item of synchronization information (e.g., one or more timestamps, etc.), or any other information or metadata as described herein, or the like or any combination thereof. It will be appreciated that the second watermark ID may be omitted if, for example, the entity for which the embedding process is performed is the same as (or otherwise associated with or related to) the entity for which the first watermark layer was pre-embedded into the audio content item.

Generally, watermark embedding techniques used to embed different watermark layers may be of the same type (e.g., including time-domain watermark embedding, frequency-domain watermark embedding in the human auditory range, frequency-domain watermark embedding in the ultrasonic range, etc.), or may be of types that are orthogonal to (or otherwise different from) one another. For more background on such watermark embedding techniques, see U.S. Patent App. Pub. No. 2014/0108020 and application 2014/0142958, as well as U.S. Patent App. Pub. No. 2012/0214515, incorporated herein.

Different watermark layers may be discerned from a commonly embedded audio content item by employing different types of watermark embedded techniques to embed different watermark layers, by employing time-division multiplexing with one or more watermark embedding techniques, by employing frequency-division multiplexing with one or more frequency-domain watermark embedding techniques, or by employing any other timing/encoding technique. Before embedding a watermark, an item of audio content can be processed using a suitably configured detector to detect the presence of any pre-embedded watermarks in the audio content item. If any pre-embedded watermarks are detected, a watermark to be embedded into the audio content item can be synchronized with the pre-embedded watermark and, once synchronized, embedded into the audio content item.

Watermark Embedding

Figure 10:
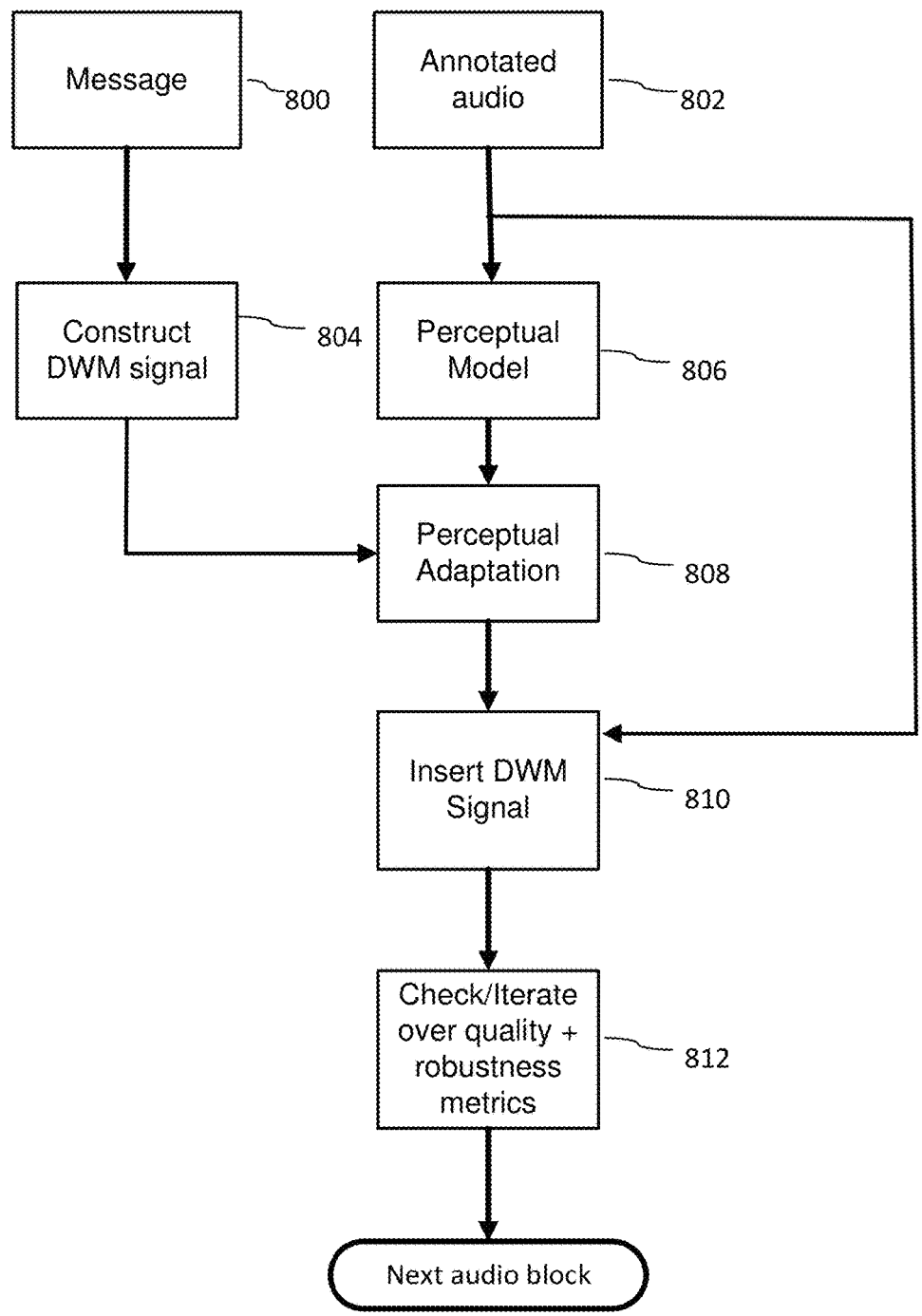
FIG. 10 is a diagram illustrating a watermark embedding process.

FIG. 10 is a diagram illustrating a process for embedding auxiliary data into audio. This diagram is taken from U.S. Patent App. Pub. No. 2014/0108020 and application Ser. No. 14/054,492, in which a pre-classification occurred prior to the process of FIG. 10. For real-time applications, pre-classification may be skipped to avoid introducing additional latency. Alternatively, classes or profiles of different types of audio signals (e.g., instruments/classical, male speech, female speech, etc.) may be pre-classified based on audio features and the mapping between these features may be coded into look up tables for efficient classification at run-time of the embedder. Metadata provided with the audio signal may be used to provide audio classification parameters to facilitate embedding.

The input to the embedding system of FIG. 10 includes the message payload 800 to be embedded in an audio segment, the audio segment, and metadata about the audio segment (802) obtained from classifier modules, to the extent available.

The perceptual model 806 is a module that takes the audio segment, and parameters of it from the classifiers, and computes a masking envelope that is adapted to the watermark type, protocol and insertion method. See U.S. Patent App. Pub. No. 2014/0108020 and 2014/0142958 for more examples of watermark types, protocols, insertion methods, and corresponding perceptual models that apply to them.

The embedder uses the watermark type and protocol to transform the message into a watermark signal for insertion into the host audio segment. The DWM signal constructor module 804 performs this transformation of a message. The message may include a fixed and variable portion, as well as error detection portion generated from the variable portion. It may include an explicit synchronization component, or synchronization may be obtained through other aspects of the watermark signal pattern or inherent features of the audio, such as an anchor point or event, which provides a reference for synchronization. As detailed further below, the message is error correction encoded, repeated, and spread over a carrier. We have used convolutional coding, with tail biting codes, 1/3 rate to construct an error correction coded signal. This signal uses binary antipodal signaling, and each binary antipodal element is spread spectrum modulated over a corresponding m-sequence carrier. The parameters of these operations depend on the watermark type and protocol. For example, frequency domain and time domain watermarks use some techniques in common, but the repetition and mapping to time and frequency domain locations, is of course, different. The resulting watermark signal elements are mapped (e.g., according to a scattering function, and/or differential encoding configuration) to corresponding host signal elements based on the watermark type and protocol. Time domain watermark elements are each mapped to a region of time domain samples, to which a shaped bump modification is applied.

The perceptual adaptation module 808 is a function that transforms the watermark signal elements to changes to corresponding features of the host audio segment according to the perceptual masking envelope. The envelope specifies limits on a change in terms of magnitude, time and frequency dimensions. Perceptual adaptation takes into account these limits, the value of the watermark element, and host feature values to compute a detail gain factor that adjust watermark signal strength for a watermark signal element (e.g., a bump) while staying within the envelope. A global gain factor may also be used to scale the energy up or down, e.g., depending on feedback from iterative embedding, or user adjustable watermark settings.

Insertion function 810 makes the changes to embed a watermark signal element determined by perceptual adaptation. These can be a combination of changes in multiple domains (e.g., time and frequency). Equivalent changes from one domain can be transformed to another domain, where they are combined and applied to the host signal. An example is where parameters for frequency domain based feature masking are computed in the frequency domain and converted to the time domain for application of additional temporal masking (e.g., removal of pre-echoes) and insertion of a time domain change.

Iterative embedding control module 812 is a function that implements the evaluations that control whether iterative embedding is applied, and if so, with which parameters being updated. This is not applied for low latency or real-time embedding, but may be useful for embedding of pre-recorded content.

Processing of these modules repeats with the next audio block. The same watermark may be repeated (e.g., tiled), may be time multiplexed with other watermarks, and have a mix of redundant and time varying elements.

As used herein, a "tile" is a watermark signal that has been mapped to a block of audio signal, and "tiling" is a method of repeating this watermark signal in adjacent blocks of audio. As such, each audio block carries a watermark tile, and the size of a watermark tile (also referred to as a "tile size" of a watermark tile) corresponds to the minimum duration of an audio block required to carry a watermark tile.

Watermark Decoding

Figure 11:
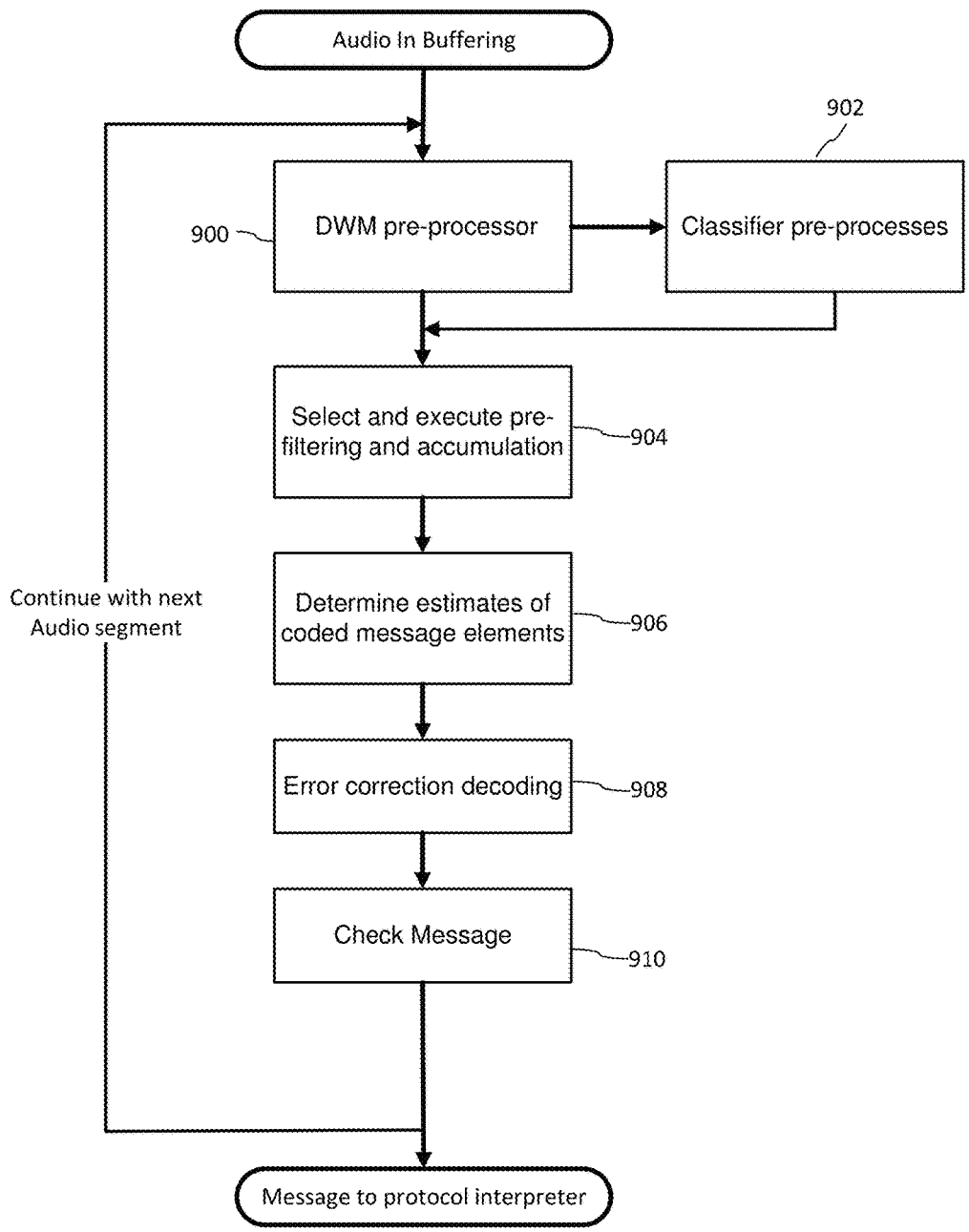
FIG. 11 is a diagram illustrating a watermark detecting process.

FIG. 11 is flow diagram illustrating a process for decoding auxiliary data from audio. For more details on implementation of low power decoder embodiments, please see our co-pending application, Methods and System for Cue Detection from Audio Input, Low-Power Data Processing and Related Arrangements, PCT/US14/72397, which is hereby incorporated by reference.

We have used the terms "detect" and "detector" to refer generally to the act and device, respectively, for detecting an embedded watermark in a host signal. The device is either a programmed computer, or special purpose digital logic, or a combination of both. Acts of detecting encompass determining presence of an embedded signal or signals, as well as ascertaining information about that embedded signal, such as its position and time scale (e.g., referred to as "synchronization"), and the auxiliary information that it conveys, such as variable message symbols, fixed symbols, etc. Detecting a watermark signal or a component of a signal that conveys auxiliary information is a method of extracting information conveyed by the watermark signal. The act of watermark decoding also refers to a process of extracting information conveyed in a watermark signal. As such, watermark decoding and detecting are sometimes used interchangeably. In the following discussion, we provide additional detail of various stages of obtaining a watermark from a watermarked host signal.

FIG. 11 illustrates stages of a multi-stage watermark detector. This detector configuration is designed to be sufficiently general and modular so that it can detect different watermark types. There is some initial processing to prepare the audio for detecting these different watermarks, and for efficiently identifying which, if any, watermarks are present. For the sake of illustration, we describe an implementation that detects both time domain and frequency domain watermarks (including peak based and distributed bumps), each having variable protocols. From this general implementation framework, a variety of detector implementations can be made, including ones that are limited in watermark type, and those that support multiple types.

The detector operates on an incoming audio signal, which is digitally sampled and buffered in a memory device. Its basic mode is to apply a set of processing stages to each of several time segments (possibly overlapping by some time delay). The stages are configured to re-use operations and avoid unnecessary processing, where possible (e.g., exit detection where a watermark is not initially detected or skip a stage where execution of the stage for a previous segment can be re-used).

As shown in FIG. 11, the detector starts by executing a preprocessor 900 on digital audio data stored in a buffer. The preprocessor samples the audio data to the time resolution used by subsequent stages of the detector. It also spawns execution of initial pre-processing modules 902 to classify the audio and determine watermark type.

This pre-processing has utility independent of any subsequent content identification or recognition step (watermark detecting, fingerprint extraction, etc.) in that it also defines the audio context for various applications. For example, the audio classifier detects audio characteristics associated with a particular environment of the user, such as characteristics indicating a relatively noise free environment, or noisy environments with identifiable noise features, like car noise, or noises typical in public places, city streets, etc. These characteristics are mapped by the classifier to a contextual statement that predicts the environment.

Examples of these pre-processing threads include a classifier to determine audio features that correspond to particular watermark types. Pre-processing for watermark detection and classifying content share common operations, like computing the audio spectrum for overlapping blocks of audio content. Similar analyses as employed in the embedder provide signal characteristics in the time and frequency domains such as signal energy, spectral characteristics, statistical features, tonal properties and harmonics that predict watermark type (e.g., which time or frequency domain watermark arrangement). Even if they do not provide a means to predict watermark type, these pre-processing stages transform the audio blocks to a state for further watermark detection.

As explained in the context of embedding, perceptual modeling and audio classifying processes also share operations. The process of applying an auditory system model to the audio signal extracts its perceptual attributes, which includes its masking parameters. At the detector, a compatible version of the ear model indicates the corresponding attributes of the received signal, which informs the type of watermark applied and/or the features of the signal where watermark signal energy is likely to be greater. The type of watermark may be predicted based on a known mapping between perceptual attributes and watermark type. The perceptual masking model for that watermark type is also predicted. From this prediction, the detector adapts detector operations by weighting attributes expected to have greater signal energy with greater weight.

Audio fingerprint recognition can also be triggered to seek a general classification of audio type or particular identification of the content that can be used to assist in watermark decoding. Fingerprints computed for the frame are matched with a database of reference fingerprints to find a match. The matching entry is linked to data about the audio signal in a metadata database. The detector retrieves pertinent data about the audio segment, such as its audio signal attributes (audio classification), and even particular masking attributes and/or an original version of the audio segment if positive matching can be found, from metadata database. See, for example, U.S. Patent Publications 20100322469 (by Sharma, entitled Combined Watermarking and Fingerprinting) and 20130308818 (U.S. Pat. No. 9,292,894), which are hereby incorporated by reference.

An alternative to using classifiers to predict watermark type is to use simplified watermark detector to detect the protocol conveyed in a watermark as described herein. Another alternative is to spawn separate watermark detection threads in parallel or in predetermined sequence to detect watermarks of different type. A resource management kernel can be used to limit un-necessary processing, once a watermark protocol is identified.

The subsequent processing modules of the detector shown in FIG. 11 represent functions that are generally present for each watermark type. Of course, certain types of operations need not be included for all applications, or for each configuration of the detector initiated by the pre-processor. For example, simplified versions of the detector processing modules may be used where there are fewer robustness concerns, or to do initial watermark synchronization or protocol identification. Conversely, techniques used to enhance detection by countering distortions in ambient detection (multipath mitigation) and by enhancing synchronization in the presence of time shifts and time scale distortions (e.g., linear and pitch invariant time scaling of the audio after embedding) are included where necessary.

The detector for each watermark type applies one or more pre-filters and signal accumulation functions that are tuned for that watermark type. Both of these operations are designed to improve the watermark signal to noise ratio. Pre-filters emphasize the watermark signal and/or de-emphasize the remainder of the signal. Accumulation takes advantage of redundancy of the watermark signal by combining like watermark signal elements at distinct embedding locations. As the remainder of the signal is not similarly correlated, this accumulation enhances the watermark signal elements while reducing the non-watermark residual signal component. For reverse frame embedding, this form of watermark signal gain is achieved relative to the host signal by taking advantage of the reverse polarity of the watermark signal elements. For example, 20 frames are combined, with the sign of the frames reversing consistent with the reversing polarity of the watermark in adjacent frames.

The output of this configuration of filter and accumulator stages provides estimates of the watermark signal elements at corresponding embedding locations, or values from which the watermark signal can be further detected. At this level of detecting, the estimates are determined based on the insertion function for the watermark type. For insertion functions that make bump adjustments, the bump adjustments relative to neighboring signal values or corresponding pairs of bump adjustments (for pairwise protocols) are determined by predicting the bump adjustment (which can be a predictive filter, for example). For peak based structures, pre-filtering enhances the peaks, allowing subsequent stages to detect arrangements of peaks in the filtered output. Pre-filtering can also restrict the contribution of each peak so that spurious peaks do not adversely affect the detection outcome. For quantized feature embedding, the quantization level is determined for features at embedding locations. For echo insertion, the echo property is detected for each echo (e.g., an echo protocol may have multiple echoes inserted at different frequency bands and time locations). In addition, pre-filtering provides normalization to audio dynamic range (volume) changes.

The embedding locations for coded message elements are known based on the mapping specified in the watermark protocol. In the case where the watermark signal communicates the protocol, the detector is programmed to detect the watermark signal component conveying the protocol based on a predetermined watermark structure and mapping of that component. For example, an embedded code signal (e.g., Hadamard code) is detected that identifies the protocol, or a protocol portion of the extensible watermark payload is decoded quickly to ascertain the protocol encoded in its payload.

Returning to FIG. 11, the next step of the detector is to aggregate estimates of the watermark signal elements. This process is, of course, also dependent on watermark type and mapping. For a watermark structure comprised of peaks, this includes determining and summing the signal energy at expected peak locations in the filtered and accumulated output of the previous stage. For a watermark structure comprised of bumps, this includes aggregating the bump estimates at the bump locations based on a code symbol mapping to embedding locations. In both cases, the estimates of watermark signal elements are aggregated across embedding locations.

In our time domain Direct Sequence Spread Spectrum (DSSS) implementation, this detection process can be implemented as a correlation with the carrier signal (e.g., m-sequences) after the pre-processing stages. The pre-processing stages apply a pre-filtering to an approximately 9 second audio frame and accumulate redundant watermark tiles by averaging the filter output of the tiles within that audio frame. Non-linear filtering (e.g., extended dual axis or differentiation followed by quad axis) produces estimates of bumps at bump locations within an accumulated tile. The output of the filtering and accumulation stage provides estimates of the watermark signal elements at the chip level (e.g., the weighted estimate and polarity of binary antipodal signal elements provides input for soft decision, Viterbi decoding). These chip estimates are aggregated per error correction encoded symbol to give a weighted estimate of that symbol. Robustness to translational shifts is improved by correlating with all cyclical shift states of the m-sequence. For example, if the m-sequence is 31 bits, there are 31 cyclical shifts. For each error correction encoded message element, this provides an estimate of that element (e.g., a weighted estimate).

In the counterpart frequency domain DSSS implementation, the detector likewise aggregates the chips for each error correction encoded message element from the bump locations in the frequency domain. The bumps are in the frequency magnitude, which provides robustness to translation shifts.

Next, for these implementations, the weighted estimates of each error correction coded message element are input to a convolutional decoding process. This decoding process is a Viterbi decoder. It produces error corrected message symbols of the watermark message payload. A portion of the payload carries error detection bits, which are a function of other message payload bits.

To check the validity of the payload, the error detection function is computed from the message payload bits and compared to the error detection bits. If they match, the message is deemed valid. In some implementations, the error detection function is a CRC. Other functions may also serve a similar error detection function, such as a hash of other payload bits.

Coping with Distortions

For applications where distortions to the audio signal are anticipated, a configuration of detector stages is included within the general detection framework explained above with reference to FIG. 11.

Fast Detect Operations and Synchronization

One strategy for dealing with distortions is to include a fast version of the detector that can quickly detect at least a component of the watermark to give an initial indicator of the presence, position, and time scale of the watermark tile. One example, explained above, is a detector designed solely to detect a code signal component (e.g., a detector of a Hadamard code to indicate protocol), which then dictates how the detector proceeds to decode additional watermark information.

In the time domain DSSS watermark implementation, another example is to compute a partially decoded signal and then correlate the partially decoded signal with a fixed coded portion of the watermark payload. For each of the cyclically shifted versions of the carrier, a correlation metric is computed that aggregates the bump estimates into estimates of the fixed coded portion. This estimate is then correlated with the known pattern of this same fixed coded portion at each cyclic shift position. The cyclic shift that has the largest correlation is deemed the correct translational shift position of the watermark tile within the frame. Watermark decoding for that shift position then ensues from this point.

In the frequency domain DSSS implementation, initial detection of the watermark to provide synchronization proceeds in a similar fashion as described above. The basic detector operations are repeated each time for a series of frames (e.g., 20) with different amounts of frame delay (e.g., 0, ¼, ½, and ¾ frame delay). The chip estimates are aggregated and the frames are summed to produce a measure of watermark signal present in the host signal segment (e.g., 20 frames long). The set of frames with the initial coarse frame delay (e.g., 0, ¼, ½, and ¾ frame delay) that has the greatest measure of watermark signal is then refined with further correlation to provide a refined measure of frame delay. Watermark detection then proceeds as described using audio frames with the delay that has been determined with this synchronization approach. As the initial detection stages for synchronization have the same operations used for later detection, the computations can be re-used, and/or stages used for synchronization and watermark data extraction can be re-used.

These approaches provide synchronization adequate for a variety of applications. However, in some applications, there is a need for greater robustness to time scale changes, such as linear time scale changes, or pitch invariant time scale changes, which are often used to shrink audio programs for ad insertion, etc. in entertainment content broadcasting.

Time scale changes are countered by using the watermark to determine changes in scale and compensate for them prior to additional detection stages.

One such method is to exploit the pattern of the watermark to determine linear time scale changes. Watermark structures that have a repeated structure, such as repeated tiles as described above, exhibit peaks in the autocorrelation of the watermarked signal. The spacing of the peaks corresponds to spacing of the tiles, and thus, provides a measure of the time scale. Preferably, the watermarked signal is sampled and filtered first, to boost the watermark signal content. Then the autocorrelation is computed for the filtered signal. Next, peaks are identified corresponding to watermark tiles, and the spacing of the peaks measured to determine time scale change. The signal can then be re-scaled, or detection operations re-calibrated such that the watermark signal embedding locations correspond to the detected time scale.

Another method is to detect a watermark structure after transforming the host signal content (e.g., post filtered audio) into a log scale. This converts the expansion or shrinking of the time scale into shifts, which are more readily detected, e.g., with a sliding correlation operation. This can be applied to frequency domain watermark (e.g., peak based watermarks). For instance, the detector transforms the watermarked signal to the frequency domain, with a log scale. The peaks or other features of the watermark structure are then detected in that domain.

For the case of the frequency domain reverse embedding scheme described above, linear time scale (LTS) and pitch invariant time scale (PITS) changes distort the spacing of frames in the frequency domain. This distortion should be detected and corrected before accumulating the watermark signal from the frames. In particular, to achieve maximum gain by taking the difference of frames with reverse polarity watermarks, the frame boundaries need to be determined correctly. One strategy for countering time scale changes is to apply the detector operations (e.g., synchronization, or partial decode) for each of several candidate frame shifts according to a pattern of frame shifts that would occur for increments of LTS or PITS changes. For each candidate, the detector executes the synchronization process described above and determines the frame arrangement with highest detection metric (e.g., the correlation metric used for synchronization). This frame arrangement is then used for subsequent operations to extract embedded watermark data from the frames with a correction for the LTS/PITS change.

Another method for addressing time scale changes is to include a fixed pattern in the watermark that is shifted to baseband during detection for efficient determination of time scaling. Consider, for example, an implementation where a frequency domain watermark encoded into several frequency bands includes one band (e.g., a mid-range frequency band) with a watermark component that is used for determining time scale. After executing similar pre-filtering and accumulation, the resulting signal is shifted to baseband (i.e. with a tuner centered at the frequency of the mid-range band where the component is embedded). The signal may be down-sampled or low pass filtered to reduce the complexity of the processing further. The detector then searches for the watermark component at candidate time scales as above to determine the LTS or PITS. This may be implemented as computing a correlation with a fixed watermark component, or with a set of patterns, such as Hadamard codes. The latter option enables the watermark component to serve as a means to determine time scale efficiently and convey the protocol version. An advantage of this approach is that the computational complexity of determining time scale is reduced by virtue of the simplicity of the signal that is shifted to baseband.

Another approach for determining time scale is to determine detection metrics at candidate time scales for a portion of the watermark dedicated to conveying the protocol (e.g., the portion of the watermark in an extensible protocol that is dedicated to indicating the protocol). This portion may be spread over multiple bands, like other portions of the watermark, yet it represents only a fraction of the watermark information (e.g., 10% or less). It is, thus, a sparse signal, with fewer elements to detect for each candidate time scale. In addition to providing time scale, it also indicates the protocol to be used in decoding the remaining watermark information.

In the time domain DSSS implementation, the carrier signal (e.g., m-sequence) is used to determine whether the audio has been time scaled using LTS or PITS. In LTS, the time axis is either stretched or squeezed using resampled time domain audio data (consequently causing the opposite action in the frequency domain). In PITS, the frequency axis is preserved while shortening or lengthening the time axis (thus causing a change in tempo). Conceptually PITS is achieved through a resampling of the audio signal in the time-frequency space. To determine the type of scaling, a correlation vector containing the correlation of the carrier signal with the received audio signal is computed over a window equal to the length of the carrier signal. These correlation vectors are then stacked over time such that they form the columns of a matrix. This matrix is then viewed or analyzed as an image. In audio which has no PITS, there will be a prominent, straight, horizontal line in the image corresponding to the matrix. This line corresponds to the peaks of the correlation with the carrier signal. When the audio signal has undergone LTS, the image will still have a prominent line, but it will be slanted. The slope of the slant is proportional to the amount of LTS. When the audio signal has undergone PITS, the line will appear broken, but will be piecewise linear. The amount of PITS can be inferred from the proportion of broken segments in the image.

Ambient Detection

Ambient detection refers to detection of an audio watermark from audio captured from the ambient environment through a sensor (i.e. microphone). In addition to distortions that occur in electromagnetic wave transmission of the watermarked audio over a wire or wireless (e.g., RF signaling) transmission, the ambient audio is converted to sound waves via a loudspeaker into a space, where it can be reflected from surfaces, attenuated and mixed with background noise. It is then sampled via a microphone, converted to electronic form, digitized and then processed for watermark detection. This form of detection introduces other sources of noise and distortion not present when the watermark is detected from an electronic signal that is electronically sampled 'in-line' with signal reception circuitry, such as a signal received via a receiver. One such noise source is multipath reflection or echoes. For these applications, we have developed strategies to detect the watermark in the presence of distortion from the ambient environment.

One embodiment takes advantages of audio reflections through a rake receiver arrangement. The rake receiver is designed to detect reflections, which are delayed and (usually) attenuated versions of the watermark signal in the host audio captured through the microphone. The rake receiver has set of detectors, called "fingers," each for detecting a different multipath component of the watermark. For the time domain DSSS implementation, a rake detector finds the top N reflections of the watermark, as determined by the correlation metric. Intermediate detection results (e.g., aggregate estimates of chips) from different reflections are then combined to increase the signal to noise ratio of the watermark as described above in stages of signal accumulation, spread spectrum demodulation, and soft decision weighting.

The challenging aspects of the rake receiver design are that the number of reflections are not known (i.e., the number of rake fingers must be estimated), the individual delays of the reflections are not known (i.e., location of the fingers must be estimated), and the attenuation factors for the reflections are not known (i.e., these must be estimated as well). The number of fingers and their locations are estimated by analyzing the correlation outcome of filtered audio data with the watermark carrier signal, and then, observing the correlation for each delay over a given segment (for a long audio segment, e.g., 9 seconds, the delays are modulo the size of the carrier signal). A large variance of the correlation for a particular delay indicates a reflection path (since the variation is caused by noise and the oscillation of watermark coded bits modulated by the carrier signal). The attenuation factors are estimated using a maximum likelihood estimation technique.

Generally, the technical problem can be summarized as follows: the received signal contains several copies of the transmitted signal, each delayed by some unknown time and attenuated by some unknown constant. Attenuation constant can even be negative. This s caused by multiple physical paths in the ambient channel. The lager the environment (room), the larger the delays can be.

In this embodiment, the watermark signal consists of finite sequence of [+C −C +C −C . . . ], where C is chip-sequence of a given length (usually bipolar signal of length $2^k-1$) and each sign corresponds to coded bit we want to send. If no multipath is present, correlating the filtered audio with the original chip sequence C results in a noisy set of +−peaks with delay equal to the chip sequence length. If multipath is present, the set of correlation peaks also contains other +−1 attenuated peaks shifted by some delay. The delay delta and attenuation factor, A, of the multipath channel, can be expressed as:

Output of multipath=input($i$)+$A$*input($i$+delta),

Using the above expression, the optimal detector should correlate the filtered audio with modified chip sequence (this is the matched filter):

Matched filter($i$)=$C(i)$+$A$*$C(i$+delta).

This is known as the rake receiver because each tap (there can be more than 2) combines the received data into final metric used for synchronization/message demodulation.

In practice, we do not know (P1) the number of rake fingers (# of paths), (P2) individual delays, (P3) individual attenuation factors.

Solution: Let $Z=(Z\_1, \ldots, Z\_n)$ be the correlation of filtered (and Linear Time Shift corrected) audio with the original chip sequence $C=(C\_1, \ldots, C\_m)$. Problems P1 and P2 can be solved by looking at vector $V=(V\_1, \ldots, V\_m)$ $V\_i=Z\_i^2+Z\_(i+m)^2+Z\_(i+2m)^2+\ldots$.

V_i is essentially variance of the correlation. It is large if there is any path associated with the delay i (delays are modulo size of chip sequence) and it is relatively small if there is not any path since the variance is only caused by noise. If the path is present, the variance is due to the noise AND due to the oscillating coded bits modulated on top of C.

A pre-processor in the detector seeks to determine the number of rake fingers, the individual delays, and the attenuation factors. To determine the number of rake fingers, the pre-processor in the detector starts with the assumption of a fixed number of rake fingers (e.g., 40). If there are, for example, 2 paths present, all fingers but these two have attenuation factors near zero. The individual delays are determined by measuring the delay between correlation peaks. The pre-processor determines the largest peak and it is assigned to be the first finger. Other rake fingers are estimated relative to the largest peak. The distance between the first and second peak is the second finger, and so on (distance between first and third is the third finger).

To solve for individual attenuation factors, the pre-processor estimates the attenuation factor A with respect to the strongest peak in V. The attenuation factor is obtained using a Maximum Likelihood estimator. Once we have estimated the rake receiver parameters, a rake receiver arrangement is formed with those parameters.

Using a rake receiver, the pre-processor estimates and inverts the effect of the multipath. This approach relies on the fact that the watermark is generated with a known carrier (e.g., the signal is modulated with a known chip sequence) and that the detector is able to leverage the known carrier to ascertain the rake receiver parameters.

Since the reflections can change as a user carries a mobile device around a room (e.g., a mobile phone or tablet around a room near different loudspeakers and objects), the rake receiver can be adapted over time (e.g., periodically, or when device movement is detected from other motion or location sensors within a mobile phone). An adaptive rake is a rake receiver where the detector first estimates the fingers using a portion of the watermark signal, and then proceeds as above with the adapted fingers. At different points in time, the detector checks the time delays of detections of the watermark to determine whether the rake fingers should be updated. Alternatively, this check may be done in response to other context information derived from the mobile device in which the detector is executing. This includes motion sensor data (e.g., accelerometer, inertia sensor, magnetometer, GPS, etc.) that is accessible to the detector through the programming interface of the mobile operating system executing in the mobile device.

Ambient detection can also aid in the discovery of certain impediments that can prevent reliable audio watermark detection. For example, in venues such as stores, parks, airports, etc., or any other space (indoor or outdoor), where some identifiable sound is played by a set of audio output devices such as loudspeakers, detection of audio watermarks by a detector (e.g., integrated as part of a receiving device such as a microphone-equipped smartphone, tablet computer, laptop computer, or other portable or wearable electronic device, including personal navigation device, vehicle-based computer, etc.) can be made difficult due to the presence of detection "dead zones" within the venue. As used herein, a detection dead zone is an area where audio watermark detection is either not possible or not reliable (e.g., because an obstruction such as a pillar, furniture or a tree exists in the space between the receiving device and a speaker, because the receiving device is physically distant from speakers, etc.). To eliminate or otherwise reduce the size of such detection dead zones, the same audio watermark signal is "swept" across different speakers within the set. In one aspect the audio watermark signal can be swept by driving different speakers within the set, at different times, to output the audio watermark signal. The phase or delay difference of the audio watermark signal applied to speakers within the set can be varied randomly, periodically, or according to any suitable space-time block coding technique (e.g., Alamouti's code, etc.) to sweep the audio watermark signal across speakers within the set. In one aspect, and depending on the relative arrangement of the speakers within the set, the audio watermark signal is swept according to known beam steering techniques to direct the audio watermark signal in a spatially-controlled manner. In one embodiment, a system such as the system described in the above-incorporated US Patent Publications 20120214544 and 20120214515, in which an audio output control device (e.g., controller 122, as described in US Patent Publications 20120214544 and 20120214515) can control output of the same audio watermark signal by each speaker so as to sweep the audio watermark signal across speakers within the set. Generally, the speakers are driven such that the audio watermark signal is swept while the identifiable sound is played. In addition to reducing or eliminating detection dead zones, sweeping the audio watermark signal can also reduce detection sensitivity to speaker orientation and echo characteristics, and may also reduce the audibility of the audio watermark signal.

Frequency Domain Autocorrelation Method

The autocorrelation method mentioned above to recover LTS can also be implemented by computing the autocorrelation in the frequency domain. This frequency domain computation is advantageous when the amount of LTS present is extremely small (e.g. 0.05% LTS) since it readily allows an oversampled correlation calculation to obtain subsample delays (i.e., fractional scaling). The steps in this implementation are:

1. Pre-filter the received audio
2. Do FFT of a segment of the received audio. The segment should contain at least two, preferably more, tiles of the watermark signal (our time domain DSSS implementation uses both 6 second and 9 second segments)
3. Multiply the FFT coefficients with themselves (i.e., square for autocorrelation)
4. Zero pad (to achieve oversampling the resulting autocorrelation) and compute inverse FFT to obtain the autocorrelation. In our implementation, the inverse FFT is 8× larger than the forward FFT of Step 2, achieving 8× oversampling of the autocorrelation.
5. Find peak in the autocorrelation The location of the peak in the autocorrelation provides an estimate of the amount of LTS. To correct for LTS, the received audio signal must be resampled by a factor that is inverse of the estimated LTS. This resampling can be performed in the time domain. However, when the LTS factors are small and the precision required for the DSSS approach is high, a simple time domain resampling may not provide the required accuracy in a computationally efficient manner (particularly when attempting to resample the pre-filtered audio). To address this issue, our implementation uses a frequency domain interpolation technique. This is achieved by computing the FFT of the received audio, interpolating in the frequency domain using bilinear complex interpolation (i.e., phase estimation technique) and then computing an inverse FFT. For a description of a phase estimation technique, please see U.S. Patent Publication 2012-0082398, SIGNAL PROCESSORS AND METHODS FOR ESTIMATING TRANSFORMATIONS BETWEEN SIGNALS WITH PHASE ESTIMATION, which is hereby incorporated by reference.

Step 4 can be computationally prohibitive since the IFFT would need to be very large. There are simpler methods for computing autocorrelation when only a portion of the autocorrelation is of interest. Our implementation uses a technique proposed by Rader in 1970 (C. M. Rader, "An improved algorithm for high speed autocorrelation with applications to spectral estimation", IEEE Transactions on Acoustics and Electroacoustics, December 1970).

Example Workflows

Having described the embodiments above, an exemplary implementation of an embedding process, based on the above-described embodiments, will now be described with reference to FIG. 12. Similarly, an exemplary implementation of a decoding process, based on the above-described embodiments, is described with reference to FIG. 13. These diagrams are taken from US Patent Application Publication 20150016661, which is hereby incorporated by reference.

Figure 12:
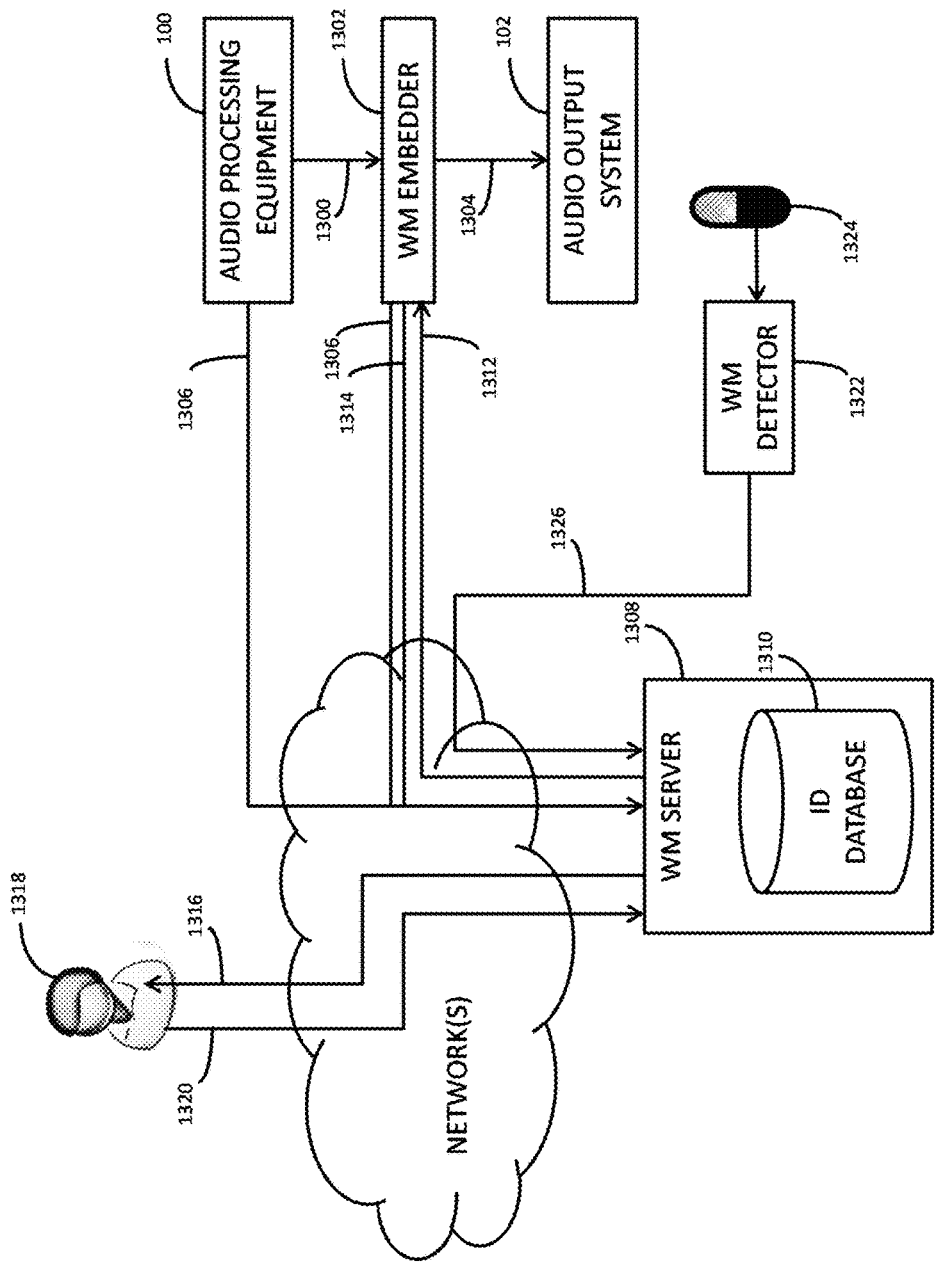
FIG. 12 illustrates examples of watermark embedding workflows.

Referring to FIG. 12, audio or audiovisual (AV) content 1300 is produced by audio processing system. Audio or audiovisual (AV) content is produced in an audio processing system and output via an audio output system 102. The audio processing system may include an audio mixer, an audio CODEC, an audio digital signal processor (DSP), a sequencer, a digital audio workstation (DAW), or the like or any combination thereof. The audio output system 102 may include one or more audio amplifiers, one or more loudspeakers (e.g., studio monitors, stage monitors, loudspeakers as may be incorporated within—or used in conjunction with—electronic devices such as mobile phones, smartphones, tablet computers, laptop computers, desktop computers, personal media players, speaker phones, etc.).

The output content may include live audio captured and mixed in the audio processing system, playback of one or more pre-recorded content streams, or a mixture of live and pre-recorded audio content streams. The output content may also include the production of computer-synthesized speech (e.g., corresponding to one or more textual inputs such as research articles, news articles, commentaries, reviews, press-releases, transcripts, messages, alerts, etc.), synthesized music or sound-effect (e.g., via a sound synthesizer), etc., which may be performed with or without human intervention.

It will be appreciated that the produced content need not necessarily be output via the audio output system 102. For example the produced content can be recorded or otherwise stored in some data structure conveyed by a tangible media (e.g., incorporated within the audio processing system 100 or otherwise coupled to the audio processing system 100 via one or more wired or wireless connections) that may include semiconductor memory (e.g., a volatile memory SRAM, DRAM, or the like or any combination thereof, a non-volatile memory such as PROM, EPROM, EEPROM, NVRAM (also known as "flash memory", etc.), magnetic memory (e.g., a floppy disk, hard-disk drive, magnetic tape, etc.), optical memory (e.g., CD-ROM, CD-R, CD-RW, DVD, Holographic Versatile Disk (HVD), Layer-Selection-Type Recordable Optical Disk (LS-R), etc.), or the like or any combination thereof. In other examples, content produced by the audio processing system (100 in US Publication 20150016661) can be broadcasted (e.g., via one or more suitable over-the-air RF communication channels associated with broadcast radio, via one or more suitable over-the-air or coaxial cable RF communication channels or fiber-optic communication channels associated with television communications, etc.), streamed (e.g., over the Internet, via one or more content delivery networks), etc.

A digital watermark embedder (labelled here as "WM EMBEDDER" at 1302) embeds identifying information (e.g., including a watermark ID, etc.) into the produced content 1300 via a digital watermark embedding process, as described above, thereby producing watermarked content 1304. Although the embedder 1302 is illustrated here as separate from the audio processing system 100, it will be appreciated that the embedder 1302 may be configured in any suitable manner, including the configurations exemplarily described with respect to any of FIGS. 1 to 8. The watermarked content 1304 is then output (e.g., to audience members attending an event or transmitted by various means) via audio output system 102.

Identifying information to embed into the produced content 1300 may be obtained in a variety of ways. In one example, the audio processing system 100 and/or the embedder 1302 may be pre-loaded with one or more watermark IDs. In another example, the audio processing system 100 or the embedder 1302 can generate a request 1306 to be transmitted to the watermark server (labelled here as "WM SERVER" at 1308). The request 1306 can be generated automatically (e.g., every time a track of produced content 1300 changes, every time an artist associated with the produced content 1300 changes, every time an artist associated with the produced content 1300 changes, every time a theatrical act or scene changes, after a user-determined or default period of time has elapsed, etc.), manually (e.g., by AV/Sound/Lighting engineer, DJ, studio engineer, etc., associated with the produced content 1300), or the like any combination thereof.

The request 1306 can include a query for one watermark ID or for multiple watermark IDs. The request 1306 can also include information describing the type of watermark ID desired (e.g., a constant watermark ID, a continuously- or periodically-incrementing time-stamp watermark ID, etc.), the desired signal strength at which the identifying information is to be embedded into the produced content 1300, the desired spectral profile with which the identifying information is to be embedded into the produced content 1300, etc., or any other desired or suitable metadata to be embedded into the produced content 1300 or otherwise associated with the identifying information as explained previously. It will be appreciated, however, that the metadata to be embedded into the produced content 1300 (or otherwise associated with the identifying information) can be provided separately from the request 1306. In such case, communications from the audio processing system 100 or embedder 1302 can be appended with a system identifier (e.g., an ID number unique to the audio processing system 100 or embedder 1302) that facilitates matching of requests 1306 with information contained in other communications at the watermark server 1308.

The watermark server 1308 may, for example, manage operations associated with the watermark ID database (labelled here as "ID DATABASE" at 1310). Information contained within the transmitted request 1306, or any other communication from the audio processing system 100 or embedder 1302 is stored in the watermark ID database 1310. Upon receiving the request 1306, the watermark server 1308 generates and transmits a response 1312 to the embedder 1302, which includes the requested identifying information (e.g., including one or more watermark IDs), along with any requested metadata or instructions (e.g., to cause the embedder 1302 to embed a constant watermark ID, an incrementing watermark ID, etc., at a particular signal strength or within a particular signal strength range, at a particular spectral profile or within a particular spectral profile range, etc.). The watermark server 1308 also associates, within the watermark ID database 1310, the generated watermark ID(s) with any other information transmitted by the audio processing system 100 or embedder 1302 (e.g., to facilitate the correlation of produced content 1300 and metadata associated with events, artists, tracks, venues, locations, DJs, date and times, etc., to facilitate tracking of downloads, views, etc., of the produced content from content hosting services, to facilitate sharing of produced content via social networks, to facilitate the maintenance/generation of extended social network(s) encompassing relationships among artists, DJs, producers, content venue owners, distributors, event coordinators/promoters, etc., to facilitate the data-mining of such extended social networks, etc.).

Upon receiving the response 1312, the embedder 1302 embeds one or more items of identifying information and any other relevant or desired information (either contained in the response 1312 or otherwise obtained from any suitable user interface) into the produced content 1300, thereby creating watermarked content 1304. In one embodiment, the embedder 1302 may transmit an acknowledgement 1314 (e.g., containing the watermark ID(s) in the response 1312, metadata in the request 1306, the system identifier, a job ID, etc.) to the watermark server 1308, indicating that the response 1312 was successfully received. In one embodiment, the embedder 1302 transmits an acknowledgement 1314 whenever one or more watermark IDs are embedded (as may be applicable in cases where watermark IDs were requested and queued pending use). In another embodiment, the acknowledgement 1314 can also indicate the actual time, date and/or duration over which each watermark ID was inserted into the produced content 1300, in addition to any other metadata gathered at time of use by the embedder 1302 (e.g., including any information entered by a DJ relating to the mix/track being played, etc.).

After the response 1312 is transmitted (e.g., after the acknowledgement 1314 is received by the watermark server 1308, after the event is over, etc.), the watermark server 1308 can transmit a message 1316 to one or more different parties, such as party 1318 (e.g., an artist, DJ, producer, originator, venue owner, distributor, event coordinator/promoter, etc.), associated with the event, the venue, the produced content 1300, etc. The message 1316 may be transmitted to the party 1318 via email, text message, tweet, phone, push notification, posting to social network page, etc., via any suitable computer or telecommunications network. The message 1316 can include any information received at, or sent from, the watermark server 1308 during, or otherwise in connection with, the event (or, alternatively, may include one or more links to such information). As will be discussed in greater detail below, a message 1316 may also be transmitted upon uploading of captured watermarked content. The message 1316 may further include a web link, access code, etc., enabling the party to post metadata 1320 (e.g., related to the event) to the watermark server 1308, to a content hosting system 106, to a social networking system 108, etc. The watermark server 1308 then associates, within the watermark ID database 1310, the posted metadata 1320 with the watermark ID(s) generated in connection with the event (e.g., to facilitate the subsequent correlation of produced content 1300 and metadata associated with events, artists, tracks, venues, locations, DJs, dates, times, etc., to facilitate tracking of downloads, views, etc., of the produced content from content hosting services, to facilitate sharing of produced content via social networks, to facilitate the maintenance/generation of extended social network(s) encompassing relationships among artists, DJs, producers, audience members, fans/enthusiasts of the content, venue owners, distributors, event coordinators/promoters, etc., to facilitate the data-mining of such extended social networks, etc.).

Referring still to FIG. 12, a watermark detector 1322 may optionally be provided to detect the presence of a watermark in watermarked content 1304. In one embodiment, the watermark detector 1322 may additionally be configured to read a watermark embedded in watermarked content 1304. To facilitate watermark detection and/or reading, one or more microphones (e.g., microphone 1324) may be provided to capture audio content output by the audio output system 102 and generate one or more corresponding captured audio signals.

The watermark detector 1322 processes the captured audio signals generated by the microphone 1324 to implement a watermark detection process such as that described above with respect to FIG. 12. If the watermark detection process indicates the presence of a watermark, the watermark detector 1322 can further process the captured audio signal(s) to extract the identifying information embedded within the watermarked content 1304 and transmit the extracted identifying information (e.g., in a confirmation report 1326) to be transmitted to the watermark server 1308. In such a case, the report 1326 can indicate the identifying information that was embedded within the watermarked content 1304, the date/time at which the identifying information that was extracted, the location where the identifying information extracted, etc. The watermark server 1308 can append a corresponding record stored in the watermark ID database 1310 with the information contained in reports 1326 received from the watermark detector 1322.

In one embodiment, the watermark detector 1322 can process the captured audio signals to determine one or more characteristics (e.g., watermark signal strength) of any watermark embedded within the captured audio content. Once determined, the characteristics can be transmitted (e.g., in a report 1326) to the watermark server 1308, stored in the watermark ID database 1310 (e.g., as described above), and used to create a log of actual watermark signal strength. The log could then be accessed by the watermark server 1308 to generate instructions that can be implemented at the watermark embedder to fine-tune the watermark signal strength in subsequently-generated watermarked content 1304.

In another embodiment (and although not illustrated), the watermark detector 1322 may be coupled to an input of the watermark embedder 1302 and be configured to receive the produced content 1300 and process the produced content 1300 to determine whether the produced content 1300 contains any pre-embedded watermarks. If any pre-embedded watermarks are detected, the detector 1322 may transmit an alert to the watermark embedder 1302 (e.g., indicating the presence of a pre-embedded watermark, indicating the type of watermark that was pre-embedded—e.g., time-domain, frequency-domain, etc., indicating the presence of any pre-embedded identifying information, synchronization information, embedding policy information, etc., or the like or any combination thereof). Based on the indication(s) provided by the alert, the watermark embedder 1302 can adjust or otherwise adapt the process by which information is embedded into the produced content 1300 using any suitable or desired technique to create the watermarked content 1304 in a manner that ensures sufficiently reliable detection and/or reading of information embedded within the watermarked content 1304, in a manner that minimizes or otherwise reduces the perceptibility of the embedded watermark, in a manner that is in accordance with any embedding policy information indicated by the alert, or the like or any combination thereof.

Upon detecting a pre-embedded watermark, the embedder 1302 can, optionally, transmit a request 1306 to the watermark server 1308 (e.g., containing information indicating the presence of a pre-embedded watermark in the produced content 1300, indicating the type of watermark that was pre-embedded, indicating the presence of any pre-embedded identifying information, synchronization information, embedding policy information, etc., or the like or any combination thereof). Responsive to the request 1306, the watermark server 1308 generates and transmits a response 1312 to the embedder 1302 that includes, among other things, instructions (e.g., to cause the embedder 1302 to embed information in a manner that ensures sufficiently reliable detection and/or reading of information embedded within the watermarked content 1304, in a manner that minimizes or otherwise reduces the perceptibility of the embedded watermark, in a manner that is in accordance with any embedding policy information indicated by the alert, or the like or any combination thereof). Optionally, information contained in this request 1306 can be stored in the ID database 1310 (e.g., in association with information that was (or was to be) embedded into the produced content 1300 before the alert was received). Information associated with the pre-embedded watermark can be stored within the ID database 1310 and, in such an embodiment, information that was (or was to be) embedded into the produced content 1300 before the alert was received can be stored in the ID database 1310 (e.g., in association with the pre-embedded watermark).

Figure 13:
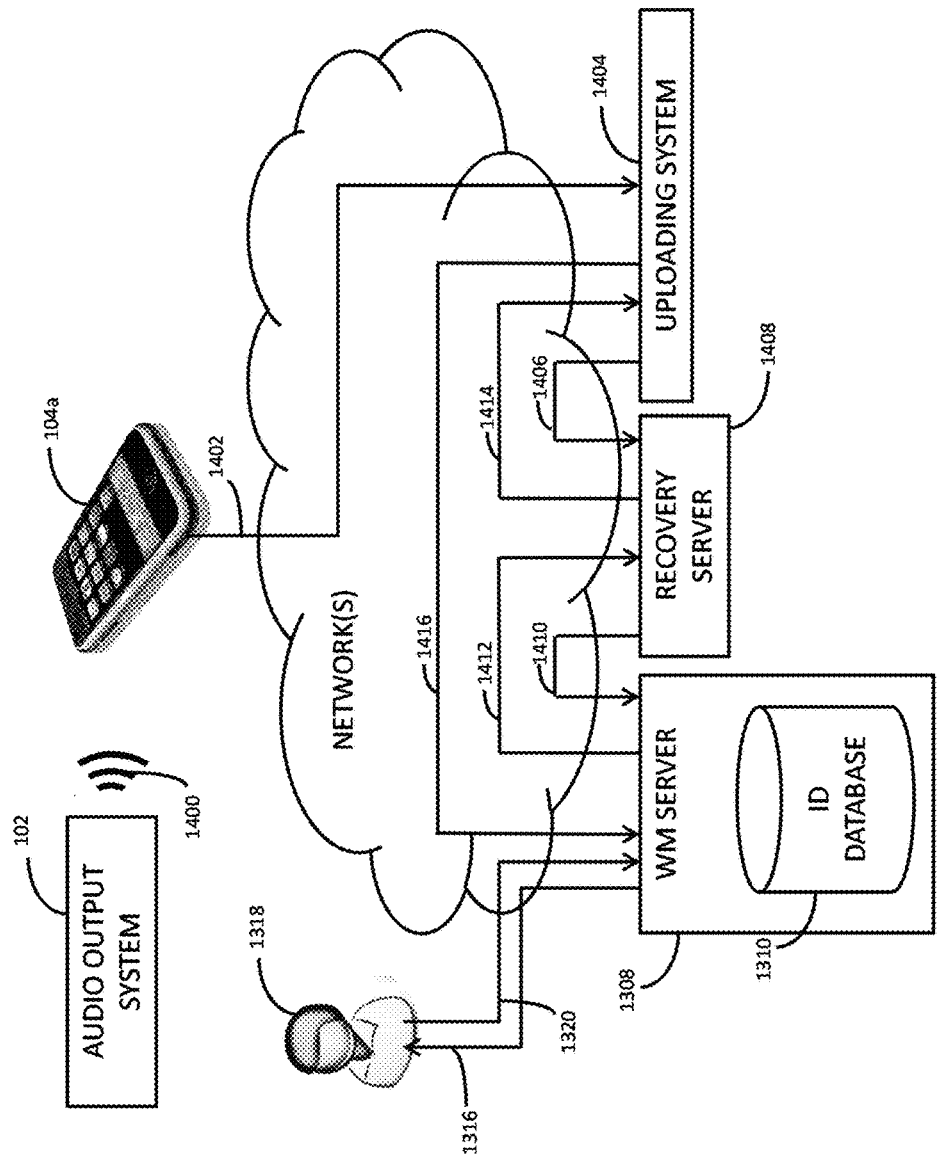
FIG. 13 illustrates examples of watermark decoding and content recognition workflows.

Referring to FIG. 13, audio or audiovisual (AV) content 1400 is captured by a device such as the mobile device. In this exemplary workflow, the captured content 1400 includes watermarked content (e.g., the watermarked content 1304 discussed above). The captured content 1400 is then transferred, uploaded or posted (1402) from the mobile device to one or more uploading systems 1404 (e.g., a content hosting system, a cloud storage system, a social networking system, or the like, or any combination thereof). The uploaded content 1402 may be accompanied by one or more items of upload metadata, which may be collected by the uploading system 1404.

Information (e.g., identifying information) may then be extracted or otherwise recovered from the uploaded content 1402. In one example, the uploading system 1404 can transmit a link to the uploaded content 1402 (or transmit a computer file in which the uploaded content 1402 is stored) to a watermark recovery system 1406, where a process to extract or otherwise recover information (e.g., including a watermark ID, a timestamp, etc.) from the uploaded content 1402 can be executed (e.g., as discussed above). In another example, the uploading system 1404 can record a pointer to the uploaded content 1402 and transmit the pointer to the recovery system 1406, which then fetches the uploaded content 1402 using the pointer and executes a process to extract or otherwise recover information from the uploaded content 1402. Any extracted or recovered information can optionally be written back to a database associated with the uploading system 1404, or to a database associated with another system (e.g., where it can be accessed by the uploading system 1404, or by one or more other systems that access the uploaded content 1402). Thereafter, by reference to the extracted or recovered information, the uploading system 1404 can perform one or more correlation processes and/or a data aggregation processes, e.g., as described above. Optionally, the uploading system 1404 can associate the extracted or recovered information with any suitable or desired upload metadata accompanying the uploaded content 1402. Generally, the recovery system 1406 and the uploading system 1404 are communicatively coupled to one another via one or more wired or wireless networks such as a WiFi network, a Bluetooth network, a Bluetooth Low Energy network, a cellular network, an Ethernet network, an intranet, an extranet, the Internet, or the like or any combination thereof.

As an alternative to the recovery process being executed completely at the recovery system 1406, the extraction or recovery process may be at least partially executed locally (e.g., at the mobile device 104*a*). Indeed, watermark recovery on the user's device or local device sensing content is preferred in a variety of media synchronization and measurement applications discussed further below. The watermark server 1308 in this case is configured to operate the resolver service introduced above and discussed in more detail below.

In the event that the extraction or recovery process is at least partially executed locally, any extracted or recovered information can be appended to the captured content 1400, and the appended captured content may then be transmitted (i.e., as the uploaded content 1402), to the uploading system 1404. The appended information can then be made accessible to the recovery system 1406 for use in extracting or otherwise recovering the embedded information. Optionally, one or more items of information (e.g., watermark ID, timestamp, etc.) extracted as a result of a locally-executed recovery process can be transmitted (e.g., from the mobile device 104*a*) to the watermark server 1308, where they can be stored in the ID database 1310 and/or or be used (e.g., by the watermark server 1308) to query the watermark ID database 1310 to find one or more items of the aforementioned metadata associated with the transmitted item(s) of recovered information. The found item(s) of metadata can be transmitted (e.g., from the watermark server 1308) to the mobile device 104*a*, or one or more pointers or links to the found item(s) of metadata can be transmitted to the mobile device 104*a*. Generally, the watermark server 1308 and the mobile device 104*a* can be communicatively coupled to one another via one or more wired or wireless networks such as a WiFi network, a Bluetooth network, a Bluetooth Low Energy network, a cellular network, an Ethernet network, an intranet, an extranet, the Internet, or the like or any combination thereof. The found item(s) of metadata (or links thereto) received at the mobile device 104*a* can thereafter be appended to the captured content 1400, and the appended captured content may then be transmitted (e.g., as the uploaded content 1402) to the uploading system 1404. Alternatively, the found item(s) of metadata may be transmitted to the uploading system 1404 in conjunction with the uploaded content 1402.

The uploaded content 1402 can optionally be subjected to one or more pre-processing steps (e.g., at the uploading system 1404 and/or at the recovery system 1406) before the information is recovered. For example, the uploaded content 1402 may be transcoded to another format with a tool such as FFmpeg, and the audio component may be extracted from the uploaded content 1402 before recovering the identifying information. Format conversion may take place before the uploaded content 1402 is stored (e.g., within a database associated with the uploading system 1404), thus the recovery may operate on a format-converted copy of the original uploaded content 1402. Alternatively, the raw uploaded content data may be examined by the recovery process immediately as it is uploaded.

One or more items of information (e.g., watermark ID, timestamp, etc.) extracted or otherwise recovered from the uploaded content are transmitted (e.g., from the recovery system 1406) to the watermark server 1308, where they can be stored in the ID database 1310 and/or be used (e.g., by the watermark server 1308) to query the watermark ID database 1310 to find one or more items of the aforementioned metadata associated with the transmitted item(s) of recovered information. Found items of metadata can be transmitted (e.g., from the watermark server 1308) to the recovery system 1406, or one or more pointers or links to the found item(s) of metadata can be transmitted to the recovery system 1406 (e.g., to facilitate access to the found item(s) of metadata by the recovery system 1406). Generally, the watermark server 1308 and the recovery system 1406 can be communicatively coupled to one another via one or more wired or wireless networks such as a WiFi network, a Bluetooth network, a Bluetooth Low Energy network, a cellular network, an Ethernet network, an intranet, an extranet, the Internet, or the like or any combination thereof.

The recovery system 1406 can transmit the found item(s) of metadata (or links thereto) to the uploading system 1404, which the uploading system 1404 can associate with the uploaded content 1402. Thereafter, by reference to the found item(s) of metadata (or links thereto), the uploading system 1404 can perform one or more correlation processes and/or data aggregation processes, e.g., as described above. Optionally, the uploading system 1404 can associate the found item(s) of metadata with any suitable or desired upload metadata accompanying the uploaded content 1402.

The recovery system 1406 can also generate an identifier associated with one or more items of the recovered information and the found item(s) of metadata. For example, the identifier can be generated by combining (e.g., hashing) one or more items of the recovered information and the found item(s) to create a globally-unique identifier (GUID). The recovery system 1406 can then transmit the generated identifier to the uploading system 1404 (e.g., in association with any of the recovered or aggregated information, or any link to the found item(s) of metadata). Alternatively, the uploading system 1404 may generate the identifier as discussed above. Optionally, the uploading system 1404 can associate the identifier with any suitable or desired upload metadata accompanying the uploaded content 1402.

Upon receiving or generating the identifier, the uploading system 1404 can instantiate the identifier (or any upload metadata, or recovered information or found item(s) of metadata (or any link thereto), associated with the identifier, etc.) as a tag (e.g., a searchable tag) associated with the uploaded content 1402, as link to other uploaded content or information associated with any of the recovered information or found item(s) of metadata (or any link thereto), or the like or any combination thereof. The uploading system 1404 may also collect information (e.g., other than the upload metadata) that is associated with the uploaded content 1402, such as posted links to the uploaded content 1402, posted links to content or information other than the uploaded content 1402, user names or IDs of system users who watch, listen, play or view the uploaded content 1402, user names or IDs of system users who post a comment on (or link to) the uploaded content 1402 or otherwise share the uploaded content 1402, or the like or any combination thereof. Such collected information may also be associated with (e.g., either directly or indirectly) the aforementioned identifier (e.g., the GUID).

Optionally, the GUID can be transmitted to the watermark server 1308 (e.g., by the recovery system 1406 or the uploading system 1404), where it can be associated, within the ID database 1310, with one or more items of the recovered information. In such an embodiment, any information or metadata associated with the GUID can be transmitted back to the watermark server 1308 and stored, as metadata, in the watermark ID database 1310 (e.g., in association with one or more items of the recovered information).

In one embodiment, the found item(s) of metadata (or link(s) thereto) includes one or more items of the aforementioned content policy information. Accordingly, by reference to the content policy information, the uploading system 1404 can tailor the manner in which the uploaded content is processed, formatted, tracked, made available for viewing, sharing, etc., associated with advertisements and other information, or the like or any combination thereof.

In another embodiment, the found item(s) of metadata (or link(s) thereto) includes one or more items of the aforementioned metadata update information. Accordingly, by reference to the period of time or date specified in the included metadata update information, the uploading system 1404 can transmit the metadata update information to the watermark server 1308 to query the ID database 1310 and find one or more items of the provided, revised or otherwise updated metadata indicated by the metadata update information. In one embodiment, the watermark server 1308 can transmit a message (e.g., the aforementioned message 1316 described above with respect to FIG. 13) to one or more different parties, such as party 1318 (e.g., an artist, DJ, producer, originator, venue owner, distributor, event coordinator/promoter, user, etc.), associated with the event, the venue, the captured content 1400, the uploaded content 1402, etc. In this embodiment, the message can be transmitted upon receiving the recovered information or the GUID from the recovery system 1406, upon receiving any collected information from the uploading system 1404, or the like or any combination thereof. In this embodiment, the message can include any information received at, or sent from, the watermark server 1308 during, or otherwise in connection with, the event the captured content 1400, the uploaded content 1402, or the like or any combination thereof (or, alternatively, may include one or more links to such information).

By transmitting messages as discussed above, patterns, trends, etc. (e.g., in terms of views, comments posted, number of times shared, websites where shared, etc.) associated with instances of uploaded content (e.g., including the identification of other content associated with the uploaded content—e.g., by reference to metadata commonly associated with the other content and the uploaded content, as well as including the identification of other content associated with the same identifying information associated with the uploaded content, etc.) can be discovered. Information relating to views, comments posted, re-sharing of content can be counted as an aggregate, or statistically analyzed in greater depth for any suitable or desired purpose. For example, currently it's hard for an event organizer to garner their following on YouTube based on views of their uploaded post-event media. Audience uploads for the same event (or for related or associated events) are hard to aggregate together due to inconsistencies in labelling or inability to identify those uploads. Identification through watermark recovery fulfills that grouping and enables a broader and more representative picture of viewer interest to be determined.

Watermark Granularity and Localization

Detecting watermark boundaries with precision is a design requirement in some applications as explained in the background section. One such application is where different watermark payloads are encoded within an audio-visual signal, and the decoder must report the boundaries between different watermarks and between watermarked and un-watermarked content with an accuracy of within 1 second. In particular, some broadcast monitoring, tracking and measurement applications require identifiers to be encoded within an audio-visual signal stream to differentiate different programs and advertisements, and transitions need to be detected with an accuracy of within 1 second.

As another example, some content recognition applications require synchronization of the playback of the watermarked content with supplemental content (e.g., on the same or different device). In these synchronization applications, it is sometimes necessary to have precise location of content segment boundaries in order to synchronize other device functions to the boundaries of a content segment during playback. Such synchronization may be performed periodically (e.g., on channel or program changes) to reset a reference clock that tracks elapsed time within a program or ad (e.g., relative to a watermark marker or clip recognized with an audio or video fingerprint). For more on synchronization in such applications, please see our U.S. Published Application 20130308818 (U.S. Pat. No. 9,292,894), which is hereby incorporated by reference. See also, U.S. Patent Publication 20100322469 (by Sharma, entitled Combined Watermarking and Fingerprinting), referenced earlier.

Figure 14:
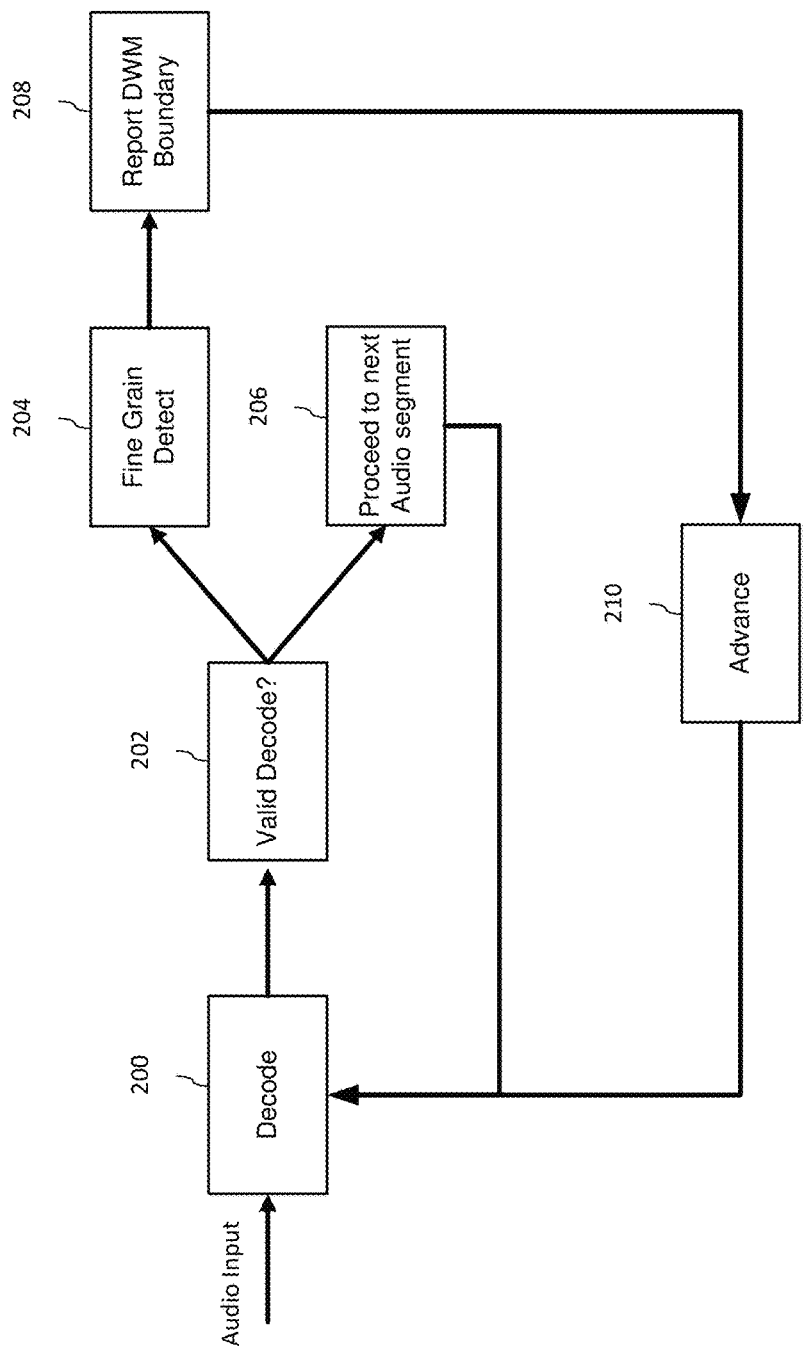
FIG. 14 is a diagram illustrating a process for localization of watermark boundaries.

FIG. 14 is a diagram illustrating a process for localization of watermark boundaries. This process builds upon the above described watermark decoding methodology, and the decoding methodology described in PCT/US14/72397 incorporated above. Block 200 depicts the decoder, which is operated in a sliding fashion on a sequence of incoming audio signal samples. These incoming samples may be delivered in real time as the signal is being received, played or transmitted (e.g., broadcast). When the decoder detects a valid payload, as validated by error detection, it provides that valid payload and the shift at which it was detected. Please refer to the earlier discussion of decoding above and in PCT/US14/72397 regarding how the decoder ascertains the shift. In one embodiment, the shift is specified in increments of ¼ frame, but more or less granular shifts may be specified. The frame is comprised of samples (e.g., 512, 1024, 2048, 4096, etc.) at a particular sampling rate (e.g., 48 kHz, 24 KHz, 16 kHz, 44.1 kHz, etc.). This extracted payload and shift are used in the process of FIG. 14 to detect the start and end of a watermarked segment.

Decision block 202 shows that the process proceeds to a fine grain detect process 204 or proceeds to the next audio segment, which is the next set of audio samples as the decoder slides along the input stream. Fine grain detect process 204 generates the watermark signal from the payload that is extracted by repeating signal generation stages of the encoder to convert the extracted payload into a version of the watermark signal that approximates the watermark embedded in the incoming signal. This conversion includes error correction coding, repetition, modulating with carrier and mapping to audio signal components (e.g., frequency locations for a frequency domain watermark, or time domain locations for a time domain watermark, or time-frequency locations). This regenerated watermark signal is similar to the original, but it cannot be identical because the original watermark was derived from the audio signal, and that audio signal has changed due to various distortions.

The decoder slides a regenerated version of the watermark signal along the host audio-visual signal (or pre-filtered version of it) to detect the presence of the embedded watermark at each of series of incremental steps both backward and forward in the host audio-visual signal. At each incremental step, it determines a detection metric. The detection metric is compared against a threshold, and the boundary is reported at the increments at which the detection metric falls below a threshold.

At block 208, the process reports the position of the boundaries of the watermarked portion of audio visual content. These boundaries provide a start and end of a particular watermark payload, e.g., a particular identifier of an audio program. This boundary is a boundary between differently watermarked segments or between watermarked and un-watermarked segments. Having completed detection up to the forward boundary, the decoder is advanced ahead to the audio-visual signal location at the forward boundary, as depicted in block 210.

This fine grain detect operation of FIG. 14 may be operated in parallel with normal encode or decode operations. For example, within the encoder, this process may be used to detect watermark boundaries to establish where the encoder overlays, overwrites or replaces the pre-existing watermark layer. Fine grain detection provides sufficient precision to partially remove a pre-existing watermark layer, freeing up more bandwidth within the host signal, and more space within the masking envelope, to encode a new watermark layer.

Figure 15:
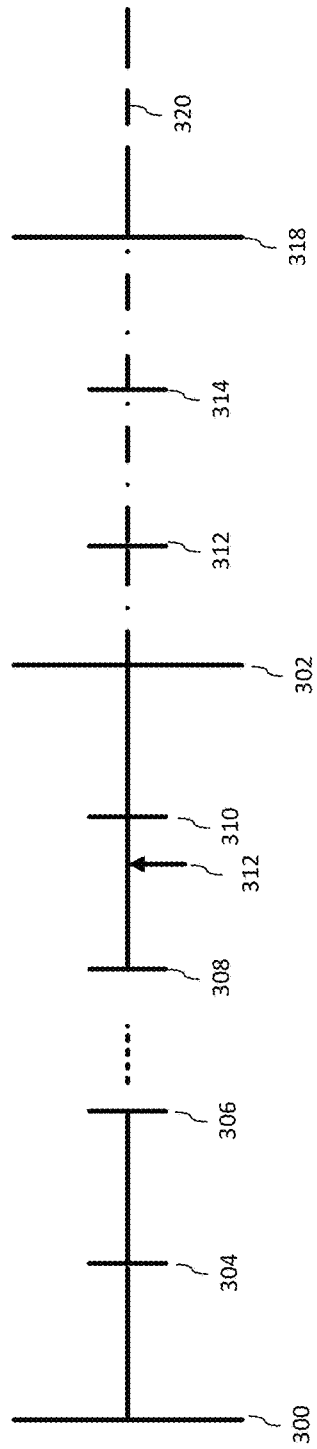
FIG. 15 is a diagram of an audio-visual signal depicted from the perspective of a timeline and boundaries of watermark signals.

FIG. 15 is a diagram of an audio-visual signal depicted from the perspective of a timeline and boundaries of watermark signals. In this example, the stream of audio samples forms a sequence in the horizontal direction. Within a particular program segment (e.g., from time boundary 300 to 302), the payload identifying that segment is repeated within frames. For example, the program identifier "ID1" for the audio-visual program is carried within the variable watermark payload portion of a watermark that is embedded in each of the frames (shown by frame markers 304, 306, 308, and 310) between program boundaries 300 to 302 for the duration of that segment. Due to distortion of audio signal, the position within an audio-visual program at which a valid watermark is detected may be some number of frames into the program segment before it is reliably extracted. One way to measure or indicate a reliable extraction is through the use of error correction and detection as described previously. Other measures of reliable extraction include one or more detection metrics exceeding thresholds, such as measures of correlation, DWM signal to noise ratio, detecting presence of known fixed bit sequences, etc. For the sake of illustration, we show the point at which the program ID is first reliably extracted is at point 312. At this point, the decoder initiates the fine grain detection process of FIG. 14 to detect the start boundary 300 and end boundary 302 of program ID1.

The particular details of fine grain detection vary with the watermark insertion method and protocol. Some operations are in common across watermark types, whereas others are particular to the details of the watermark encoding and decoding methods of a particular type. One option that applies to different techniques is the regeneration of a version of the watermark signal, though details of the regeneration, of course, depend on the watermark type. To illustrate, we describe a few examples and elaborate on possible variations below.

Figure 16:
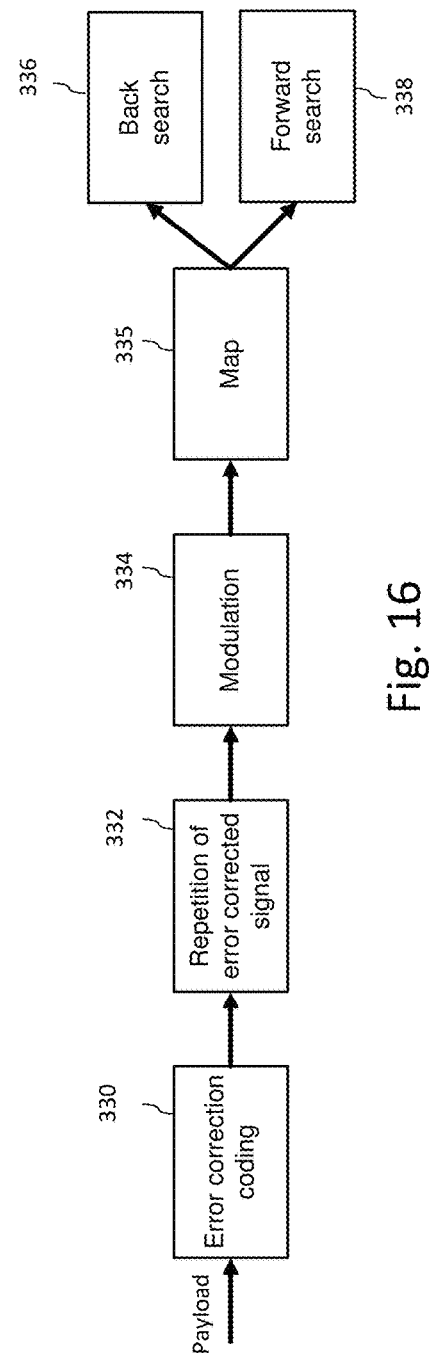
FIG. 16 illustrates a series of processing modules that regenerate a digital watermark signal from a variable payload extracted from an audio-visual signal.

FIG. 16 illustrates a series of processing modules that regenerate a digital watermark signal from the extracted variable payload. Notably, when the watermark signal carries an unknown, variable payload, the variable payload sequence needs to be extracted reliably and errors corrected. Thus, the processing modules execute operations on the variable payload to regenerate the watermark signal that has just been extracted at point 312 by the normal decoder. The payload includes variable data symbols and additional information, such as error detection symbols, version information and possibly other fixed symbols. These parts are re-formed. Once formed, this sequence of symbols is error correction coded (330), repeated to add redundancy 332 (see above), and modulated onto a carrier signal (334). The modulated signal is mapped to coordinates in the embedding domain (335)(e.g., time domain coordinates, frequency domain coordinates, or coordinates in some other feature domain, where the features correspond to features of the host that are modified to embed the watermark).

The re-generated signal may be amplitude adjusted to model the shape of the original watermark signal inserted previously by the encoder. One approach is to scale the amplitude of the re-generated signal according to the masking envelope determined from executing the perceptual model on the incoming audio-visual signal. Another approach is to scale the amplitude of the re-generated signal according to the detected profile of the incoming signal as described in companion patent application PCT/US14/72397, referenced above. These noise profiles weight the elements of the re-generated signal at time/frequency locations according to the type of host audio visual signal content and noise environment predicted from a classification of the type of incoming audio-visual signal (e.g., noisy public room, outdoor venue, car, home, or production studio environment). See above and incorporated applications PCT/US14/72397 and 2014/0142958, regarding classifiers and use of profiles. The amplitude scaling provides a weighting of components of the re-generated signal to provide more reliable detection in the ensuing detection metric measurements described below.

Figure 17:
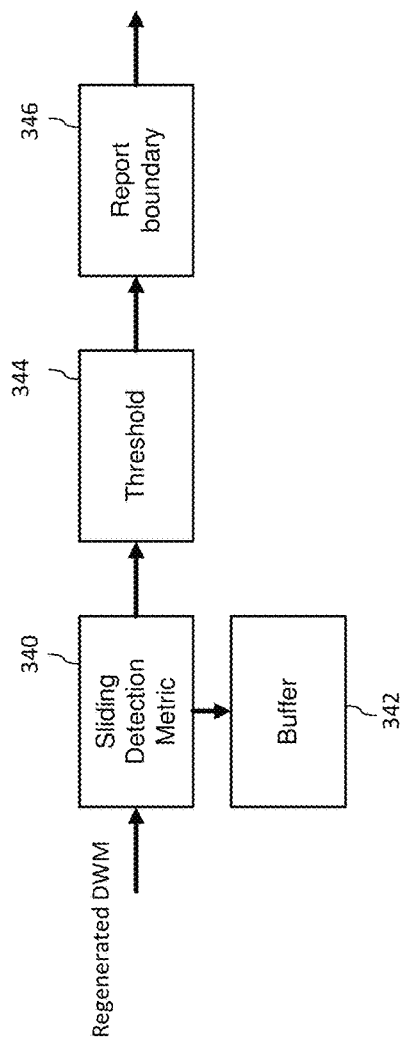
FIG. 17 illustrates backward search for the start boundary.
Figure 18:
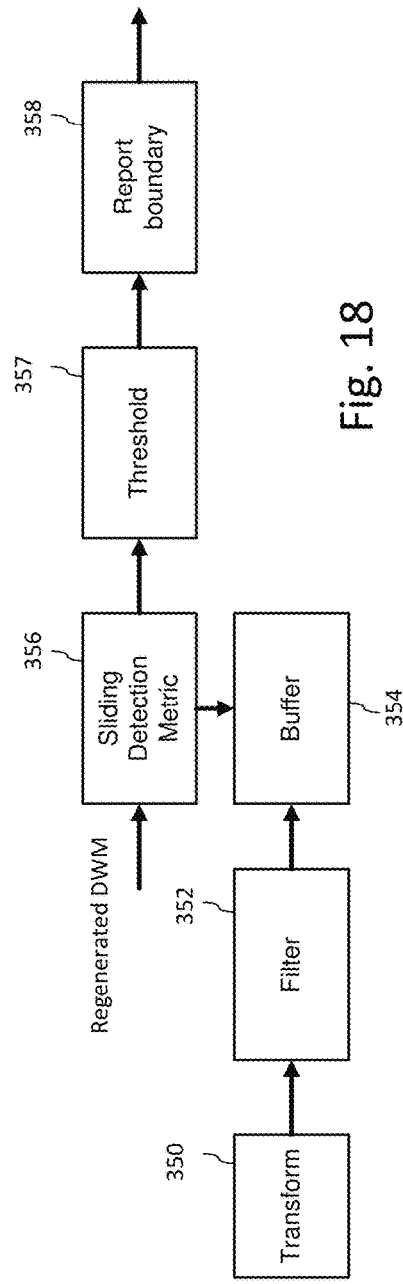
FIG. 18 illustrates forward search for the end boundary of the watermarked section with the particular payload that has been extracted.

Next, the operation proceeds to both a back (336) and forward (338) search for the start and end of the repeated watermarked sequence. FIGS. 17 and 18 illustrate processing modules and interaction with buffered signal for efficient implementation of boundary detection. FIG. 17 illustrates backward search for the start boundary, and FIG. 18 illustrates forward search for the end boundary of the watermarked section with the particular payload that has been extracted.

In the case of backward search, the normal decode operation has already produced a partially decoded signal from the incoming audio-visual signal, which is buffered so as to avoid repeating operations already completed, saving time and processing complexity. Partially decoded, includes, for example, a transformation of the incoming audio-visual signal to the embedding domain, pre-filtering, and signal accumulation. As explained, in PCT/US14/72397, the decode operation produces, for a frequency domain watermark, a transformed and filtered signal at each of several shifts, which is buffered in buffer stages. The transform, e.g., an FFT to get Fourier Magnitude values, has already been performed and its output buffered for each of the shift values. The number of seconds corresponding to partially decoded audio-visual signal that is buffered is a matter of design choice governed by how far back the start boundary typically may be, and other hardware constraints, such as available memory components for buffering, and processing power and time allowed for boundary detection. For example, partially decoded audio-visual signal may be buffered for 10-30 seconds (including overlapping frames at each shift).

Turning again to FIG. 17, the regenerated watermark ("DWM") is provided to processing module 340 which executes a sliding detection metric on the partially decoded signal in buffer 342. The regenerated DWM is, in one implementation, correlated with the partially decoded signal contents of the buffer at the determined shift, for each of a series of frames (e.g., in a step and repeat mode). This may be a weighted correlation or weighted DWM signal to noise (SNR) measurement, using weights from the profile or perceptual mask, applied to samples of the buffer and/or regenerated DWM at embedding locations within the embedding domain (e.g., time or frequency domain locations, or time frequency locations). There are various ways to implement the correlation, e.g., as a vector dot product, multiply and sum, or convolution operation of regenerated DWM and buffer contents to produce the detection metric. Various other signal to noise ratio metrics may be used as the detection metric. These metrics may be absolute signal energy measurements or a ratio of a signal measurement over total signal measurement per step (e.g., absolute or relative metric).

For each step of the sliding detection measurement 340, the boundary detect processing module of FIG. 17 compares the measurement with a threshold. When the measurement falls below the threshold, the module reports the boundary as the last time step where the measurement is above that threshold (346).

The end boundary detection processing module of FIG. 18 is similar to the one in FIG. 18. Sliding detection metric processing, including comparison with a threshold and reporting the boundary (356, 357 and 358) are the same as the counterparts in FIG. 17. The primary difference is that partial decode results need to be generated and buffered, if not already done (e.g., in the case of parallel processing pipelines or threads). The process is computationally efficient, as the shift and regenerated watermark proceeds with partially decoded audio-visual signal at the shift already determined. This means that the number of transformations (e.g., FFTs) 350 and filter operations 352 is reduced because the shift is known. The buffer 354 for storing this information can be smaller as a result.

For low latency operation within encoders and decoders, these efficiencies reduce complexity of processing and hardware components (for ASIC or FPGA implementations or mixed DSP and digital logic implementations).

Though encoding parameters may vary, a brief example of encoding parameters illustrates the precision with which boundaries may be detected. For frame sizes of 2048 samples at 16 kHz for example, with shift steps of ¼ frame, the boundary detect processing achieves boundary detection with granularity well under 1 second (down to ⅛ of a second). As noted, the shift increments, frame overlaps of sliding detection metrics and frame lengths may be tuned as desired to achieve desired granularity.

Where offline analysis is useful, longer portions of audio-visual content is buffered and transferred to persistent storage and/or a server, in response to each unique watermark ID detection, for precise boundary detection and archiving of metadata concerning each detection event, such as program or ad ID associated metadata from data registries like EIDR and Ad-ID, start and end time of continuous ID detection, and other information about the circumstances of the detection. This metadata in turn, may be mined for report generation for various applications. One application is tracking distribution of audio-visual content as well as reporting when and where advertisement and programs have been played or broadcast.

In some circumstances, distortions such as time scale modifications may require the normal decoder to resume and re-synchronize. Once re-synchronized, the above efficient process, employing regenerated DWM and shift, resumes to detect sequences of audio-visual content with the same payload, along with its boundaries.

Additionally, fine grain synchronization can be obtained using a time domain watermark signal, such as time domain DSSS described above and in incorporated patent documents. For instance, such time domain watermark signal may be encoded along with the frequency domain DSSS watermark to provide this time synchronization, which also may be used in boundary detection. It may also be used to provide fine grain synchronization as a pre-processing step to partial removal of a pre-existing watermark layer. In this case, the synchronization is used to ensure that the regenerated watermark is fully synchronized with the original watermark so that it can be removed more accurately.

The time domain watermark may be configured to carry a fixed or variable payload. If the time domain watermark is used to synchronize the detector for detecting, partially removing, and then embedding a new payload with the frequency domain watermark, it may be configured to carry a fixed payload. In this case, detection operations for detecting and synchronizing to the time domain watermark signal are less computationally complex as they may be implemented with a sliding correlation with the known fixed watermark signal, pre-generated from the fixed payload.

For applications where the audio has not encountered distortions due to ambient transmission and sampling (e.g., applications where the encoded signal remains in an electronic form from initial encoding to decoding), there is less noise in the signal and the time domain watermark is capable of providing synchronization down to an audio sample level (e.g., a sample in an audio signal at 16 kHz or higher sampling rate). Where compression has been introduced, there is more distortion at frequencies where lossy compression is more heavily applied, and thus, the sliding correlator will encounter more noise and may be designed to weight lower frequency audio signal content more heavily.

For applications where the audio encounters distortion due ambient transmission (e.g., echoes introducing multipath), multipath methods, such as those described above, may be used to mitigate effects of multipath distortion on the time domain watermark signal (e.g., echoes may introduce plural time shifted versions of the time domain DSSS signal in the sensed audio signal). These types of distortion have less impact on the frequency domain watermarking signaling method, so it may be relied on for applications where ambient detection is required.

The boundary detection and synchronization techniques described in this document may be used both within a decoder and encoder. In the decoder, the techniques enable accurate, reliable and efficient extraction of payloads, as well as precise watermark boundary reporting.

To conclude, we return to FIG. 15 to summarize how the boundary detection process operates. As explained, normal extraction of a validated payload at point 312 initiates both a back and forward boundary detect. In back mode, the sliding detection moves back toward boundary 300, where the detection metric falls below the threshold. In forward mode, the sliding detection proceeds to boundary 302, where the detection metric falls below a threshold. At each boundary, the detection metric falls below the threshold because the signal is not watermarked or carries a different variable payload. This may happen as programs and ads are spliced together in various ways, e.g., through ad insertion, transition periods of transitional content (music, voice overs, station ID, etc.) between programs and ads and inclusion of a portion of previously watermarked content in another program. For example, another program or ad may be appended to the audiovisual stream at boundary 302. At this boundary, time to the end of a first frame of a watermark, 312, may be less than a complete frame, due to cropping that occurred when programs were sliced together. The dashed line between boundaries 302 and 318 depicts a different program from the one between 300 and 302. Normal decode operation resumes after 302, and once the new watermark is detected, boundary detection in back and forward mode resumes. Audio visual content at 320 may have no watermark at all. The normal decoder resume operation on it, and reports the first valid watermark that it detects.

ID Replacement

In this document, and our previous work (see incorporated by reference documents), we detailed various strategies for layering plural watermarks within the same content. Layering provides a methodology for replacing an ID in content, e.g., when it is redistributed as a different program or ad. For example, each layer may be encoded using a different key (key 1, 2 and 3, for first, second and third ID replacement), so that a new layer has minimal interference with a previous layer. One example, in our technologies, is to employ a unique carrier for each key (e.g., orthogonal carriers). In this ID replacement strategy, the new key takes precedence over the previous one. The decoder then executes detection operations first using key 3, than 2, than 1, or all in parallel, but giving precedence to 3, than 2, than 1. In particular, if a higher priority key yields a valid payload extraction, any extraction with a lower priority key is ignored for a particular segment of content.

Another approach is to increment the version number in a version payload, to indicate which layer has been encoded. This version payload may be time or frequency multiplexed at predetermined locations within the host audio-visual signal, and due to its compact representation, takes less channel bandwidth. The version number can be used to identify to the decoder which key or protocol it should use to extract the watermark layer.

This approach is reasonably effective, but there are limits to the number of watermarks that may be encoded in the same time/frequency locations. Multiplexing of time frequency locations is possible, yet it does not achieve the performance, in terms of speed to first read, and granularity of unique identification, because it requires the watermark to be spread over a larger spectral, spatial and/or temporal range.

Reversible watermarks have been proposed, but they are generally not practical for many applications because they are too fragile. Instead, robust watermarks are needed that survive aggressive compression, time scale distortions, or various types of noise, including noise introduced in ambient detection (detection of DWM from a microphone captured signal).

An alternative approach, which may be used in various combinations with the layering schemes mentioned here and in the incorporated documents, is to at least partially remove a pre-existing watermark layer. This enables the ID carried in that partially removed layer to be replaced with a new ID, embedded in the audio-visual signal at the same time/frequency locations after removal of a pre-existing layer.

The synchronization and fine grain detection strategies described previously enable a pre-existing watermark layer to be at least partially removed. In this ID replacement strategy, the pre-existing watermark layer is decoded, its boundaries are detected, and it is regenerated using the above methodologies, including amplitude approximation based on executing the perceptual model on the incoming audio-visual signal. The perceptual model, while operating on a signal that already contains a watermark signal, still provides a reasonably accurate masking envelope per bin of frequency locations, to scale the regenerated watermark signal to approximate the amplitude of the pre-existing watermark layer. Thus, when the scaled, regenerated watermark signal is subtracted, the subtraction operation sufficiently removes the pre-existing watermark layer from the incoming audio-visual signal so that it does not interfere with subsequent decoding of the replacement payload. This at least partial removal frees up space within the masking envelope to insert a new watermark layer with the replacement ID.

Figure 19:
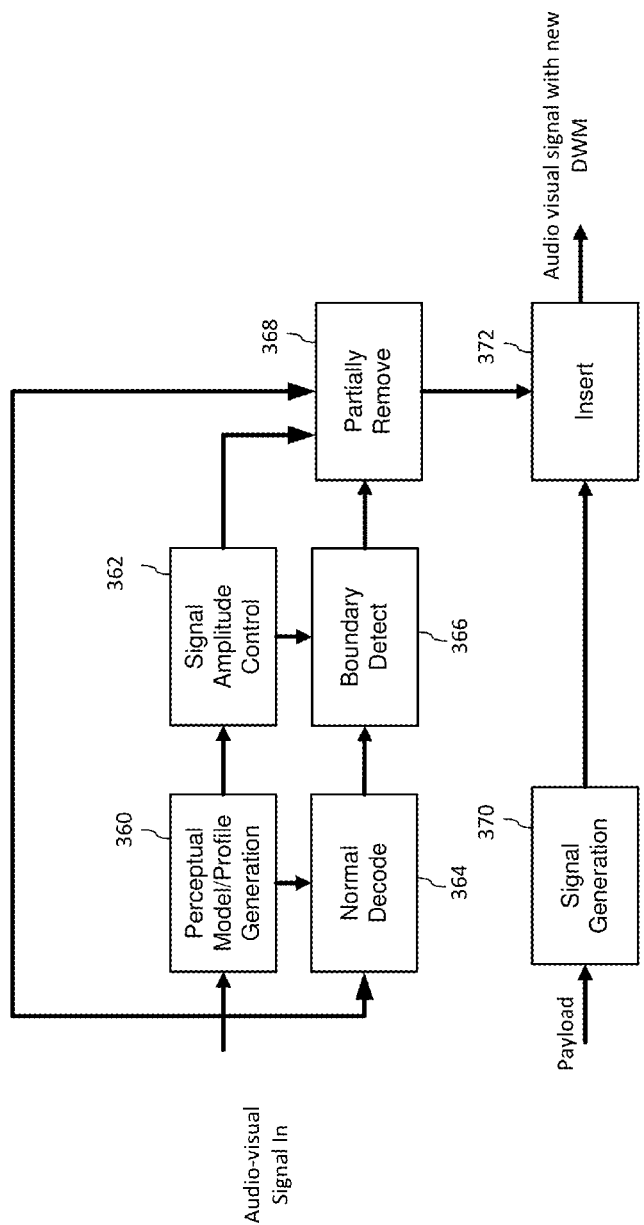
FIG. 19 is a diagram illustrating an arrangement of processing modules used in a watermark encoder for watermark payload replacement.

FIG. 19 is a diagram illustrating an arrangement of processing modules used in a watermark encoder for watermark payload replacement. In this configuration, the input audio-visual signal is fed to perceptual model analyzer 360, which generates a masking envelope per frequency bin, using simultaneous masking adapted from masking of MPEG/AAC audio coding. For background on such masking, please see M. Bosi and R. E. Goldberg, Introduction to Digital Audio Coding and Standards. Kluwer Academic, 2003. See also, U.S. patent application Ser. No. 15/213,335, filed Jul. 18, 2016, entitled HUMAN AUDITORY SYSTEM MODELING WITH MASKING ENERGY ADAPTATION, incorporated above.

Along with computing the masking envelope, module 360 computes the profile of the incoming audio. Profiles are explained above and in PCT/US14/72397.

For each segment of incoming audio signal, the encoder stores the masking envelope parameters and profile in a buffer, which is accessed by other processing modules to control amplitude of a DWM as shown at block 362. The profile is used in the operations of the normal decode module 364 as described in PCT/US14/72397. The boundary detect module 366 employs a profile and/or masking envelope parameters to adjust the amplitude of the regenerated DWM signal.

The normal decode module 364 executes decoding operations (e.g., transform, filter, accumulate, demodulate, error correction, and error detection) and provides an extracted payload and shift. Of course, this occurs only where a pre-existing watermark layer is detected in the incoming audio-visual signal.

The boundary detect module 366 uses the extracted payload to regenerate the pre-existing DWM signal. Optionally as noted above, the boundary detect module 366 can apply the weights or scale factors obtained from the profile and/or masking envelope parameters to adjust the amplitude of the regenerated DWM signal. This adjustment is made to improve the correlation between the regenerated watermark and partially decoded audio signal. The boundary detect module indicates each frame of audio in which the regenerated DWM is successfully detected, as determined by comparing the detection metric with a threshold.

The above processing provides the synchronized location, including start and end boundaries of a pre-existing watermark layer, including all of its frames. With this information and watermark amplitude predicted from the masking envelope parameters, processing module 368 partially removes the pre-existing watermark layer from the incoming audio-visual signal. To predict pre-existing watermark amplitude, the regenerated watermark signal is scaled according to the masking envelope parameters obtained for each frequency bin.

To insert a new watermark layer, the encoder receives a payload as input and generates the new watermark signal 370. Processing module 372 insert this new watermark signal into the host audio signal after the prior watermark layer is at least partially removed. It does so by adapting the new watermark signal according to the masking envelope parameters obtained for the corresponding frame of audio in which it is inserted.

For a frequency domain watermark, removal may be executed on samples in the frequency domain, followed by insertion of the new watermark layer. The resulting watermarked signal is then converted into the time domain. Alternatively, a removal signal may be generated in the time domain by inverting the regenerated watermark signal in the frequency domain, converting it to the time domain (e.g., through IFFT), and removing the converted time domain version of the removal signal from the host audio signal.

Time domain watermarks may be adapted and removed directly in the time domain without additional transformations.

ID replacement must be managed so that only authorized encoders are allowed to replace pre-existing IDs. This may be managed by incorporating logic in each encoder that governs the set of IDs that it may encode, as well as the set of IDs that it may replace. First, the possibility of overwriting or replacement is detected by executing a decoder within the encoder, as described. Then, only certain types of encoders used in the content production and distribution workflow are allowed to overwrite or replace a pre-existing watermark. These encoders are issued permissions to overwrite or replace certain IDs issued to the same entity, or entities at the same or higher level of distribution in the supply chain.

In one approach for managing ID replacement, payloads and embedders inserting these payloads are tightly coupled with the help of a database. Associated with each embedder is an embedder ID. Each payload in the database has an embedder ID associated with it, which corresponds to the embedder ID of the originating embedder. Also associated with each payload are permissions that allow (or disallow) specified embedders to replace/overwrite this payload with another payload. Only the originating embedders (or embedding entities) would be allowed to set/update these permissions, ensuring integrity of the system.

There are also alternatives to ID replacement. For example, instead of replacing the ID where an audio clip containing an existing ID needs to be embedded in a new program, use this clip as is in the new program (the embedder skips over this clip when embedding the ID for the new program). Then, during detection inspect IDs occurring before and after to infer context and disambiguate the usage of this clip in the new program. Such alternatives can help maintain subjective quality by eliminating the need for replacement and will also reduce the computational complexity of embedders.

Additional Detector/Decoder Embodiments

Above, we referenced our co-pending application, Methods and System for Cue Detection from Audio Input, Low-Power Data Processing and Related Arrangements, PCT/US14/72397. In this section, we include text and references to accompanying drawings from the specification.

Figure 20:
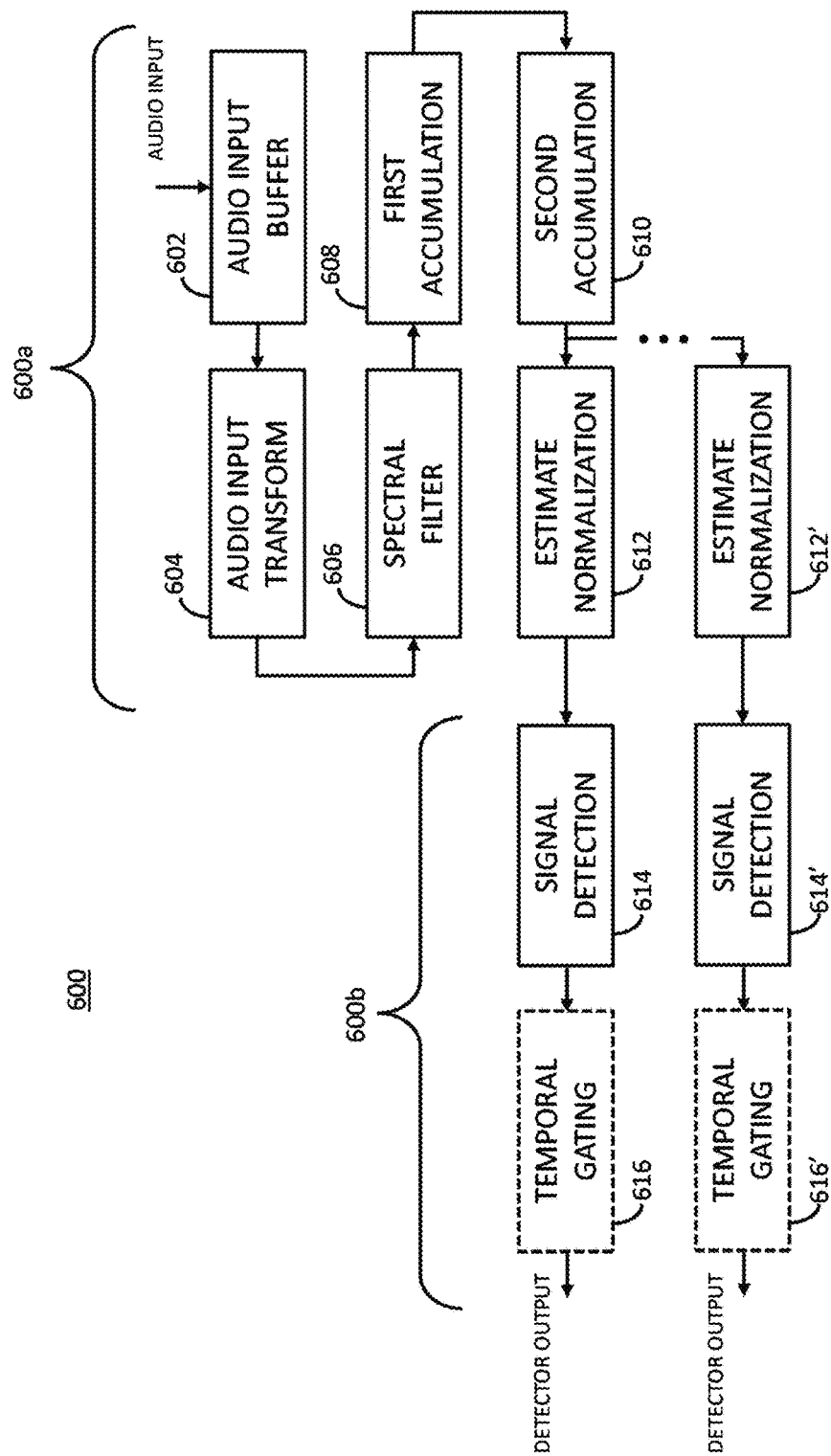
FIG. 20 illustrates a watermark detection process.

An exemplary watermark detection process is described in greater detail with respect to FIG. 20. Specifically, FIG. 20 illustrates a watermark detection process 600 for detecting a frequency-domain audio watermark signal employing an adjacent-frame, reversed embedding modulation scheme, such as that exemplarily described in aforementioned U.S. Patent App. Pub. No. 2014/0142958. It will be appreciated that the techniques described herein may be adapted to detect other types watermark signals employing any suitable or beneficial modulation scheme. Generally, the watermark detection process 600 operates on audio input, which is digitally sampled. In one example scenario, the audio input is sampled at a sampling rate of 16 kHz. It will be appreciated that the audio input may be sampled at a rate greater than or less than 16 kHz. Optionally, the sampled audio input is buffered before being operated upon by the watermark detection process 600 (e.g., by an input buffer or other memory of a cue detection module, the audio I/O module, the audio DSP, or the like; see PCT/US14/72397 for description of these components).

Audio Input Buffering Stage

At 602, sequentially-sampled portions of the audio input are stored within an audio input buffer (e.g., an input buffer or other memory of the watermark detector module, the cue detection module, the audio I/O module, the audio DSP, or the like). In one embodiment, the sequentially-sampled portions of the audio input are obtained as part of the any of the aforementioned audio activity detection processes. Generally, the number of samples in the audio input buffer corresponds to the minimum duration of an audio block required to carry a watermark tile that is (or that might be) embedded within the audio input. For example, and continuing with the sampling rate given in the example scenario given above, the audio input buffer can contain at least 2048 sequentially-sampled portions of the audio input, such samples spanning a duration of at least about 128 ms.

Audio Input Transform Stage

At stage 604, a group of sequentially-sampled portions of audio input (also referred to herein as a "frame" of audio input, or an "audio input frame") is transformed from the temporal domain into another domain (e.g., the frequency domain). Generally, the number of samples constituting an audio input frame corresponds to the minimum duration of an audio block required to carry a complete watermark tile that is (or that might be) embedded within the audio input. For example, and to continue with the example scenario given above, a frame of audio input could contain 2048 (or thereabout) samples of audio input.

A frame of sampled audio input may be transformed by computing the frequency spectrum of the frame (e.g., computing the entire frequency spectrum of the frame by applying an FFT, a DCT, wavelets, etc., to the frame). Once obtained, the transformed frame of sampled audio input is output to a subsequent stage (e.g., the spectral filter stage 606) as a multi-element data structure such as a multi-element vector, wherein each element contains a spectral magnitude of an FFT bin associated with the FFT applied to the audio input frame. Such a multi-element data structure is also referred to herein as a frame of spectral magnitudes or a "spectral magnitude frame." For example, a 2048-sample audio input frame can be transformed by applying a 1024-point FFT thereto, yielding a 1024-element data structure (i.e., a spectral magnitude frame) representing spectral magnitudes for 1024 frequency bins. Frames of audio input may be transformed at any suitable or desired or rate. In one embodiment, frames of audio input may be transformed at a rate that corresponds to a multiple of the sampling rate of the audio input. For example, and to continue with the example scenario given above, a frame of audio input can be transformed every 32 ms, or thereabout.

Figure 21A:
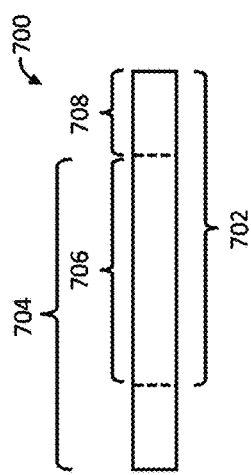
FIGS. 21A-D are diagrams illustrating audio buffers.

After transforming one audio input frame (e.g., a first audio input frame), a new audio input frame (e.g., a second audio input frame) can be transformed. In one embodiment, the second audio input frame contains at least one audio input sample that was in the first audio input frame. For example, and with reference to FIG. 21A, a block 700 represents the temporal extent of a series of sequentially-sampled portions of audio input, wherein samples at left-hand side of block 700 are relatively newer than samples at the right-hand side of block 700. After transforming a first audio input frame (e.g., containing audio input samples having a relatively older temporal extent represented by block 702), a second audio input frame (e.g., containing audio input samples having a relatively recent temporal extent represented by block 704) is transformed. The number of audio input samples that the first and second audio input frames share in common is represented by the horizontal extent of block 706. Overlap can be increased to improve robustness of watermark detection. The overlap may also be adjusted to reduce latency between arrival of audio and extraction of a watermark from the audio. The number of audio input samples shared between the first and second audio input frames is in a range from one-eighth to seven-eighths of the number of audio input samples in any of the audio input frames. In one embodiment, the number of audio input samples shared between the first and second audio input frames is in a range from one-quarter to three-quarters of the number of audio input samples in any of the audio input frames. In another embodiment, the number of audio input samples shared between the first and second audio input frames is one-half of the number of audio input samples in any of the audio input frames. After an audio input frame has been transformed, any audio input samples not included in the next audio input frame can be overwritten within, or otherwise cleared from, the audio input buffer. For example, after the first audio input frame 702 has been transformed, audio input samples corresponding to block 708 may be overwritten within, or otherwise cleared from, the audio input buffer.

Optionally, the sampled audio input may be filtered prior to being transformed (e.g., using one or more filters such as a high pass filter, a differentiator filter, a non-linear filter, a linear prediction residual filter, or the like or any combination thereof).

Spectral Filter Stage

At 606, one or more filtering operations can be performed on the spectral magnitude frames obtained at the transform stage 604 to emphasize the watermark signal or de-emphasize the remainder of the audio input frame. Selection of the particular type of spectral filter(s) to apply is based on the type of watermark signal that is, or may be, encoded into the audio input. Examples of filters that may be used during the spectral filtering are exemplarily described in aforementioned U.S. Patent App. Pub. No. 2014/0142958. In one embodiment, filtering is accomplished by first storing spectral magnitudes computed for a plurality of spectral magnitude frames (e.g., in a filter buffer, which may be provided as an input buffer or other memory of a watermark detector module, a watermark decoder module, a cue detection module, an audio I/O module, an audio DSP, or the like) and then applying a filtering operation (e.g., a non-linear filtering operation) to the stored spectral magnitudes, thereby producing a filtered frame of spectral magnitudes (also referred to herein as a filtered spectral magnitude frame). Generally, the filter buffer is provided as a FIFO buffer, wherein elements of the FIFO buffer are organized into x sets of buffer elements, where x is any integer greater than 1. In one embodiment, x is in a range from 3 to 11. In another embodiment, x is in a range from 5 to 9. In yet another embodiment, x is 7. Notwithstanding the foregoing, it will be appreciated that x may be greater than 11. Each set of buffer elements is configured to store spectral magnitudes computed for each frame of transformed audio input output from stage 604. Within a set of buffer elements, each buffer element is configured to store only a single spectral magnitude computed for a frame of transformed audio input. Thus, the filter buffer stores x sets of spectral magnitudes for the last x spectral magnitude frames. The filter buffer can also be conceptually likened to a two-dimensional matrix, wherein elements of the matrix correspond to spectral magnitudes corresponding to frequency bin (in the vertical dimension) and time (in the horizontal dimension). When the filter buffer is full, each new set of spectral magnitudes for a spectral magnitude frame obtained from the transform stage 604 replaces the oldest stored spectral magnitude frame.

Figure 21B:
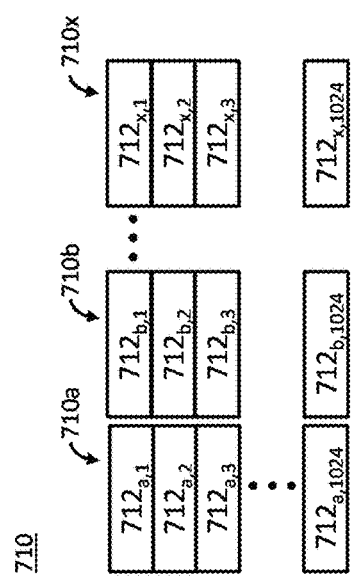

For example, and with reference to FIG. 21B, the filter buffer can be provided as a filter buffer 710 having x sets of buffer elements (e.g., a first set of buffer elements 710a, a second set of buffer elements 710b, etc., and an $x^{th}$ set of buffer elements 710x). Assuming each spectral magnitude frame obtained from stage 604 contains 1024 spectral magnitude values, then each set of buffer elements would also contain 1024 buffer elements (e.g., the first set of buffer elements 710a would contain a corresponding 1024 buffer elements, $712_{a,1}$, $712_{a,2}$, . . . $712_{a,1024}$). A first frame of spectral magnitudes obtained from stage 604 may be stored in the first set of buffer elements 710a, a second frame of spectral magnitudes obtained from stage 604 may be stored in the second set of buffer elements 710b, and so on. After a $x^{th}$ frame of spectral magnitudes obtained from stage 604 is stored in the $x^{th}$ set of buffer elements 710x, an $x+1^{th}$ frame of spectral magnitudes obtained from 604 is stored in the first set of buffer elements 710a, an $x+2^{th}$ frame of spectral magnitudes obtained from stage 604 is stored in the second set of buffer elements 710b, and so on.

Once spectral magnitudes for a plurality of spectral magnitude frames are stored within the filter buffer, a filtering operation can be performed. In one embodiment, the filtering operates on each spectral magnitude of a stored spectral magnitude frame: e.g., for an identified spectral magnitude within an identified spectral magnitude frame, a 2-dimensional window spanning a plurality of stored spectral magnitudes in the frequency and time dimensions is defined. Generally, the identified spectral magnitude will be included within the window. Values of the stored spectral magnitudes within this window are aggregated (e.g., averaged) and the difference between this aggregate value and the identified spectral magnitude is taken as a filtered spectral magnitude. This filtering operation can be performed when two, three, etc., or even x frames of spectral magnitudes are stored within the filter buffer. After spectral magnitudes for an older frame of spectral magnitudes have been filtered, the filtering operation may be performed on a newer frame of spectral magnitudes.

Filtered frames of spectral magnitudes may be produced at any suitable or desired or rate. In one embodiment, filtered frames of spectral magnitudes are produced at a rate that corresponds to the rate with which audio input frames are transformed at 604. For example, and to continue with the example scenario given above, a filtered frame of spectral magnitudes can be produced every 32 ms, or thereabout. Generally, the filter buffer 710 requires only modest memory resources (e.g., 4 kB, or thereabout, is typically required to store a single frame of spectral magnitudes). However, the spectral filter stage 606 can be omitted. If the spectral filter stage 606 is omitted, the memory requirements for the watermark detection process 600 will be reduced, but doing so can also cause in robustness during a subsequent decoding stage.

First Accumulation Stage

Frames of, optionally filtered, spectral magnitudes are accumulated (e.g., summed) at stage 608, as estimates of an embedded watermark signal, according to a first accumulation process. Spectral magnitude frames accumulated according to the first accumulation process are stored in a first accumulation buffer (e.g., an input buffer or other memory of the watermark detector module, watermark decoder module, the cue detection module, the audio I/O module, the audio DSP, or the like). Generally, the first accumulation buffer is provided as a FIFO buffer, wherein elements of the FIFO buffer are organized into y sets of buffer elements, where y is any integer greater than 1. In one embodiment, y is in a range from 3 to 24. In another embodiment, y is in a range from 6 to 18. In yet another embodiment, y is 6, 9 or 12. Notwithstanding the foregoing, it will be appreciated that y may be greater than 24. Generally, the number of buffer elements in each set of buffer elements can be in a range from 2 to 2048 (e.g., 2, 3, 4, 5, 8, 10, 16, 25, 32, 50, 64, 75, 100, 128, 256, 512, 1024, etc.). For purposes of facilitating discussion, examples provided below will be based on a scenario in which each set of buffer elements includes only 4 buffer elements.

Figure 21C:
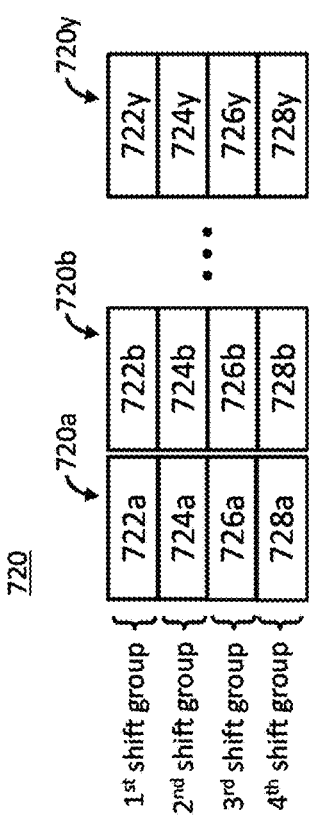

According to the first accumulation process, a set of spectral magnitude frames (e.g., as sequentially output from stage 604 or 606) is accumulated within each set of buffer elements of the first accumulation buffer. Generally, the number of spectral magnitude frames in a set of spectral magnitude frames corresponds to the minimum duration of an audio block required to carry a complete watermark tile that is (or that might be) embedded within the audio input. Thus, to continue with the example scenario given above, a set of spectral magnitude frames can include 32 spectral magnitude frames (e.g., as sequentially output from stage 604 or 606). For a set of buffer elements, however, the first accumulation process proceeds by accumulating a sub-set of non-sequential spectral magnitude frames (e.g., 8 non-sequential spectral magnitude frames) within each buffer element. For example, and with reference to FIG. 21C, the first accumulation buffer can be provided as an first accumulation buffer 720 having y sets of buffer elements (e.g., a first set of buffer elements 720a, a second set of buffer elements 720b, etc., and a $y^{th}$ set of buffer elements 720y). Each set of buffer elements includes four buffer elements (e.g., the first set of buffer elements 720a contains a first buffer element 722a, a second buffer element 724a, a third buffer element 726a and a fourth buffer element 728a, and so on). Assuming the first accumulation buffer 720 is empty, the first accumulation process is initially performed by storing a first frame of spectral magnitudes output from stage 604 (or stage 606) in the first buffer element 722a, storing a second frame of spectral magnitudes output from stage 604 (or stage 606) in the second buffer element 724a, storing a third frame of spectral magnitudes output from stage 604 (or stage 606) in the third buffer element 726a and storing a fourth frame of spectral magnitudes output from stage 604 (or stage 606) in the fourth buffer element 728a. Thereafter, a fifth frame of spectral magnitudes output from stage 604 (or stage 606) is accumulated in the first buffer element 722a, a sixth frame of spectral magnitudes output from stage 604 (or stage 606) is accumulated in the second buffer element 722b, and so on. Accordingly, the $1^{st}$, $5^{th}$, $9^{th}$, $13^{th}$, . . . and $29^{th}$ spectral magnitude frames in a first set of spectral magnitude frames output from stage 604 (or 606) can be accumulated in the first buffer element 722a of the first set of buffer elements 720a, the $2^{nd}$, $6^{th}$, $10^{th}$, $14^{th}$, . . . and $30^{th}$ spectral magnitude frames in the first set of spectral magnitude frames can be accumulated in the second buffer element 724a, the $3^{rd}$, $7^{th}$, $11^{th}$, $15^{th}$, ... and 31' spectral magnitude frames in the first set of spectral magnitude frames can be accumulated in the third buffer element 726*a* and the $4^{th}$, $8^{th}$, $12^{th}$, $16^{th}$, ... and $32^{nd}$ spectral magnitude frames in the first set of spectral magnitude frames can be accumulated in the fourth buffer element 728*a*. According to the example scenario outlined above, the first accumulation process accumulates 8 spectral magnitudes within a single buffer element, which enables the watermark detection process 600 to detect the alignment of a watermark tile at a temporal resolution of 32 ms (or thereabout). It will be appreciated, however, that buffer elements within a set can accumulate more or fewer than 8 spectral magnitude frames, and that the number of buffer elements within a set of buffer elements can be adjusted in correspondence with the number of spectral magnitude frames accumulated in each buffer element. For time domain watermark techniques (e.g., the noted time domain DSSS methods), it is possible to detect the alignment of a watermark tile at a temporal resolution as small as 0.0625 ms (assuming that audio input is sampled at a sampling rate of 16 kHz).

After one set of spectral magnitude frames has been accumulated within a set of buffer elements, another set of spectral magnitude frames can be accumulated (e.g., as described above) within another set of buffer elements. For example, after the first set of spectral magnitude frames has been accumulated within the first set of buffer elements 720*a* as discussed above, a second set of spectral magnitude frames can be similarly accumulated within the second set of buffer elements 720*b* (i.e., the $1^{st}$, $5^{th}$, $9^{th}$, $13^{th}$, ... and $29^{th}$ spectral magnitude frames in the second set of spectral magnitude frames output from stage 604 (or 606) can be accumulated in the first buffer element 724*a* of the second set of buffer elements 720*b*, etc.). In one embodiment, the spectral magnitude frames in temporally-adjacent sets of spectral magnitude frames are sequentially output from stage 604 (or stage 606). For example, the $32^{nd}$ spectral magnitude frame in the first set of spectral magnitude frames and the $1^{st}$ spectral magnitude frame in the second set of spectral magnitude frames are spectral magnitude frames that are sequentially output from stage 604 (or stage 606).

After spectral magnitude frames have been accumulated within each set of buffer elements of the first accumulation buffer, the set of buffer elements containing the oldest accumulated set of spectral magnitude frames is cleared and another set of spectral magnitude frames can be accumulated (e.g., as described above) within that set of buffer elements. For example, after a $y^{th}$ set of spectral magnitude frames has been accumulated within the $y^{th}$ set of buffer elements 720*y*, the first set of buffer elements 720*a* can be cleared and a $y+1^{th}$ set of spectral magnitude frames can be accumulated therein as discussed above.

Spectral magnitude frames can be accumulated within a buffer element at any suitable or desired or rate. In one embodiment, new spectral magnitude frames are accumulated within buffer elements at a rate that corresponds to the rate with which frames of (optionally filtered) spectral magnitudes are produced (e.g., at stage 604 or stage 606). Thus, to continue with the example scenario given above, a spectral magnitude frame can be accumulated within a different buffer element every 32 ms (or thereabout). In one embodiment, a set of spectral magnitude frames accumulated within set of buffer elements corresponds to a period of audio input having a duration of 1.024 seconds (or thereabout). It will be appreciated, however, that each set of buffer elements may store an accumulated set of spectral magnitude frames corresponding to a period of audio input having any suitable or desired duration that is greater than or less than 1.024 seconds (or thereabout).

Corresponding buffer elements across different sets of buffer elements can be conceptually characterized as belonging to the same "offset" or "shift" group. For example, first buffer elements 722*a*, 722*b*, ... and 722*y* can be considered as belonging to a first shift group, second buffer elements 724*a*, 724*b*, ... and 724*y* can be considered as belonging to a second shift group, third buffer elements 726*a*, 726*b*, ... and 726*y* can be considered as belonging to a third shift group and fourth buffer elements 728*a*, 728*b*, ... and 728*y* can be considered as belonging to a fourth shift group. As will be discussed in greater detail below, spectral magnitude frames accumulated within buffer elements belonging to the same shift group can be processed to facilitate watermark detection.

Memory Requirements and Accumulation Techniques

When implemented in the manner described above, the first accumulation process requires only modest memory resources. For example, 4 kB, or thereabout, is typically required to store a spectral magnitude frame within a single buffer element. Based on this example, a single set of buffer elements would typically require 16 kB of memory to store an accumulated set of spectral magnitude frames corresponding to a period of audio input having a duration of 1.024 seconds (or thereabout). By increasing the number of sets of buffer elements in the first accumulation buffer, one can store multiple accumulated sets of spectral magnitude frames corresponding to longer periods of audio input. For example, if y is 6 then the first accumulation process would require 96 kB to store multiple accumulated sets of spectral magnitude frames corresponding to a period of audio input spanning 6.144 seconds (or thereabout).

However, memory requirements of the first accumulation process may be reduced simply by decreasing the number of sets of buffer elements in the first accumulation buffer and increasing the number of spectral magnitude frames that are included in any set of spectral magnitude frames (thus increasing the number of spectral magnitude frames that are accumulated within any individual buffer element). For example, the first accumulation process may be performed such that each set of buffer elements stores an accumulated set of spectral magnitude frames corresponding to a period of audio input having a duration of 2.048 seconds (or thereabout). In this case, the first accumulation process would only require 48 kB (i.e., for three sets of the aforementioned buffer elements, y=3) to store multiple sets of spectral magnitude frames corresponding to a period of audio input spanning 6.144 seconds (or thereabout). Nevertheless, it will be appreciated that each set of buffer elements may store an accumulated set of spectral magnitude frames corresponding to a period of audio input having any suitable or desired duration that is greater than or less than 2.048 seconds (or thereabout).

Memory requirements of the first accumulation process may also be reduced by conducting a weighted accumulation process for at least one set of buffer elements. When implementing a weighted accumulation process, the first accumulation buffer can include only one set of buffer elements (e.g., containing only four buffer elements and, thus, imposing memory requirements of only 16 kB), or may include additional sets of buffer elements (e.g., storing spectral magnitude frames according to one or more other accumulation processes).

Generally, a weighted accumulation process is conducted by scaling each spectral magnitude frame to be accumulated within a buffer element or by scaling each accumulated spectral magnitude frame stored within a buffer element such that spectral magnitude frames accumulated relatively distantly in time are given less importance than weighted less heavily than spectral magnitude frames accumulated relatively recently in time. A weighted accumulation process can, for example, be performed each time a spectral magnitude frame is to be accumulated in a buffer element, and can be conducted by scaling each spectral magnitude frame to be accumulated within a buffer element or by scaling each accumulated spectral magnitude frame stored within a buffer element. Generally, the weighted accumulation process is conducted by scaling each spectral magnitude frame output from stage 604 (or stage 606), by scaling each accumulated spectral magnitude frame that is stored within a buffer element, or a combination thereof. After a new spectral magnitude frame (e.g., as output from stage 604 or stage 606) is scaled and/or after a previously-accumulated spectral magnitude frame (stored within a buffer element) is scaled, the two spectral magnitude frames are added together to yield a new accumulated spectral magnitude frame. Thereafter, the previous accumulated spectral magnitude frame in the buffer element is replaced with new accumulated spectral magnitude frame.

A spectral magnitude frame—whether as output from stage 604 or 606 or as accumulated and stored in a buffer element—can be scaled by multiplying each spectral magnitude value therein by a scaling factor. Spectral magnitude frames output from stage 604 (or stage 606) are typically scaled according to a first scaling factor whereas accumulated spectral magnitude frames stored within buffer elements are scaled according to a second scaling factor greater than the first scaling factor. Generally, one or both of the first and second scaling factors is less than 1. In one embodiment, both the first and second scaling factors are less than 1, and the sum of the two factors equal to or less than 1. Generally, the ratio between the second and first scaling factors may correspond to the desired robustness with which a watermark signal is ultimately detected or decoded, the minimum duration of an audio block required to carry a complete watermark tile that is (or that might be) embedded within the audio input, or the like or any combination thereof. Notwithstanding the above, it will be appreciated that one or both of the first and second scaling factors may be greater than or equal to 1, that the sum of the two factors may be greater than 1, or the like or any combination thereof.

Second Accumulation Stage

Spectral magnitude frames that have been accumulated in the first accumulation process are accumulated (e.g., summed) according to a second accumulation process at stage 610. Accumulated spectral magnitude frames accumulated according to the second accumulation process (also referred to herein as "secondly-accumulated spectral magnitude frames") are stored in a second accumulation buffer (e.g., an input buffer or other memory of the watermark detector module, watermark decoder module, the cue detection module, the audio I/O module, the audio DSP, or the like). Generally, the second accumulation buffer is provided as a FIFO buffer, wherein elements of the FIFO buffer are organized into z sets of buffer elements, where z is any integer equal to or greater than 1. In one embodiment, z is in a range from 3 to 24. In another embodiment, z is in a range from 6 to 12. In yet another embodiment, z is 3 or 6. Notwithstanding the foregoing, it will be appreciated that z may be greater than 24.

Generally, the second accumulation process, operates on each shift group of the first accumulation buffer 720. According to the second accumulation process, a set of accumulated spectral magnitude frames within each shift group is accumulated within a corresponding buffer element in a set of buffer elements of the second accumulation buffer. Generally, accumulated spectral magnitude frames within the set are accumulated across two or more sets of buffer elements of the first accumulation buffer 720. Thus, the rate with which accumulated sets of spectral magnitude frames are accumulated may depend upon the number of sets of buffer elements from the first accumulation buffer 720 that are involved, the rate with which new spectral magnitude frames are accumulated within the first accumulation buffer 720, or the like or a combination thereof.

Figure 21D:
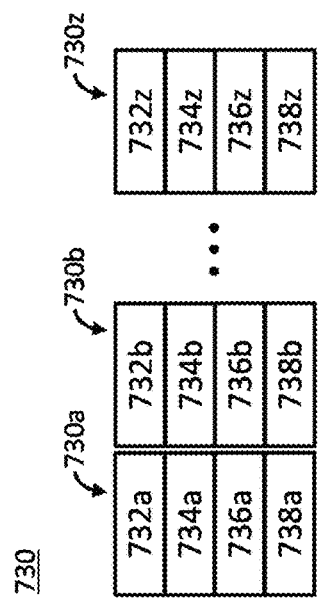

For example, and with reference to FIG. 21D, the second accumulation buffer can be provided as second accumulation buffer 730 having z sets of buffer elements (e.g., a first set of buffer elements 730a, a second set of buffer elements 730b, etc., and a $z^{th}$ set of buffer elements 730z). Each set of buffer elements includes four buffer elements (e.g., the first set of buffer elements 730a contains a first buffer element 732a, a second buffer element 734a, a third buffer element 736b and a fourth buffer element 738a, and so on). The second accumulation process can thus be performed by accumulating a set of accumulated spectral magnitude frames within the first shift group and across a group of sets of buffer elements of the first accumulation buffer 720 into the first buffer element 732a, accumulating a set of accumulated spectral magnitude frames within the second shift group and across the group of sets of buffer elements of the first accumulation buffer 720 into the second buffer element 734a, accumulating a set of accumulated spectral magnitude frames within the third shift group and across the group of sets of buffer elements of the first accumulation buffer 720 into the third buffer element 736a and accumulating a set of accumulated spectral magnitude frames within the fourth shift group and across the group of sets of buffer elements of the first accumulation buffer 720 into the fourth buffer element 738a.

In an embodiment in which the second accumulation buffer includes multiple sets of buffer elements (e.g., as shown in FIG. 21D), the second accumulation process can be performed by accumulating a set of accumulated spectral magnitude frames as discussed above, but across different groups of sets of buffer elements of the first accumulation buffer. Each set of secondly-accumulated spectral magnitude frames can then be stored in a different set of buffer elements of the second accumulation buffer. For example, and with reference to FIGS. 21C and 21D, the first set of buffer elements 730a may store a set of accumulated spectral magnitude frames that have been accumulated across all sets of buffer elements 720a, 720b, . . . , 720y in the first accumulation buffer 720. The second set of buffer elements 730b, however, may store another set of accumulated spectral magnitude frames that have been accumulated across only those sets of buffer elements in the first accumulation buffer 720 that store accumulated spectral magnitude frames corresponding to the n most recent seconds (or any fraction thereof). Another set of buffer elements of the second accumulation buffer may store yet another set of accumulated spectral magnitude frames that have been accumulated across only those sets of buffer elements in the first accumulation buffer 720 that store accumulated spectral magnitude frames corresponding to the m most recent seconds (or any fraction thereof), where m≠n.

In view of the above, it will be appreciated that a set of secondly-accumulated spectral magnitude frames stored within a set of buffer elements in the second accumulation buffer 730 can correspond to a period of audio input having a duration in a range from, for example, 1 second (or thereabout) to 24 seconds (or thereabout), and that one or more groups of accumulated spectral magnitude frames may be secondly-accumulated at stage 610. Sometimes, there is tradeoff between the benefits offered by a secondly-accumulated spectral magnitude frame corresponding to a relatively long period of audio input, and those offered by a secondly-accumulated spectral magnitude frame corresponding to a relatively short period of audio input. In environments having stationary sound sources and in which the electronic device of the detector is relatively stationary (e.g., laying on a desk), use of secondly-accumulated spectral magnitude frames corresponding to a relatively long period of audio input can be helpful in increasing signal-to-noise ratio (SNR) of the watermark signal. However, in environments in which there is rapid relative movement between the sound sources and the electronic device (or in which an embedded watermark signal is changing rapidly), using secondly-accumulated spectral magnitude frames corresponding to a relatively short period of audio input may more reliably detect a watermark signal. Accordingly, two or more groups of secondly-accumulated spectral magnitude frames may be obtained at stage 610, e.g., corresponding to two or more periods of sampled audio input spanning a duration of 3 seconds, 6 seconds, 9 seconds, 12 seconds, etc.

If multiple groups of secondly-accumulated spectral magnitude frames are stored within the second accumulation buffer 730, then post-accumulation stages of the watermark detection process 600 may then be performed to process each group of secondly-accumulated spectral magnitude frames in serial fashion. For example, and with reference to FIG. 20, after a first group of secondly-accumulated spectral magnitude frames has been processed at a subsequent estimate normalization stage 612, a second group of secondly-accumulated spectral magnitude frames may be processed at the estimate normalization stage 612. However in another embodiment, and as also shown in FIG. 20, such post-accumulation stages of the watermark detection process 600 can be executed in multiple threads to process each group of aggregated sets of spectral magnitudes in parallel fashion. It will also be appreciated that a processing thread can further process multiple groups of aggregated sets of spectral magnitudes in serial fashion.

Estimate Normalization Stage

A group of secondly-accumulated spectral magnitude frames is normalized at 612, thereby producing a group of normalized spectral magnitude frames. Normalizing the group of secondly-accumulated spectral magnitude frames helps to constrain the contribution that any spurious watermark signal elements may provide in the subsequent detection stage 614. In one embodiment, the normalization process is performed based on the overall statistical characteristics of the entire frequency band (e.g., including frequency bins 1 through 1024) but different audio (speech and different types of music) can be represented in different segments (bands) within the full spectrum. The frequency spectrum can be divided into 8 bands, and the frequencies in each band can be normalized based on the statistical characteristics of their band instead of the statistical characteristics of the full spectrum. Clipping may be performed prior to the normalization to suppress outliers. In another embodiment, normalization is accomplished by reference to a pre-computed normalization look-up table.

Detection Stage

Sometimes, the audio represented by the audio input, which might be encoded with an audio watermark signal, is distorted in such a manner as to prevent or otherwise hinder efficient detection of an encoded audio watermark signal at the detection stage 614. One type of distortion is linear time scale (LTS), which occurs when the audio input is stretched or squeezed in the time domain (consequently causing an opposite action in the frequency domain). In one embodiment, such distortion can be estimated and used to enhance watermark detection.

In one embodiment, the distortion estimation operates on the group of normalized spectral magnitude frames output at stage 612: spectral magnitude values in the group of normalized spectral magnitude frames are scaled in accordance with a set of linear scaling factors and one or more noise profiles, thereby yielding a set of candidate spectral magnitude profiles. For example, spectral magnitude values in the group of normalized spectral magnitude frames can be scaled using 40 linear scaling factors (e.g., ranging from −1% scaling to +1% scaling, and including 0% scaling) and 6 predetermined noise profiles, thereby yielding a set of 960 candidate spectral magnitude profiles. It will be appreciated that more or fewer than 40 linear scaling factors may be applied, and that more or fewer than 6 predetermined noise profiles may be applied.

Notwithstanding the above, it will be appreciated that distortion may be detected and accounted for as described in any of U.S. Pat. Nos. 7,152,021 and 8,694,049 (each of which is incorporated herein by reference in its entirety), in any of the aforementioned U.S. Patent App. Pub. Nos. 2014/0108020 and 2014/0142958, or the like or combination thereof.

For each of the candidate spectral magnitude profiles obtained from the distortion estimation, the spectral magnitudes corresponding to the aforementioned version bits of the version identifier are extracted. Thereafter, for each candidate spectral magnitude profile, values at the frequency locations for each version bit are aggregated (e.g., summed), thereby yielding a sequence of i spectral magnitudes (also referred to as a "version spectral magnitude sequence," where, as mentioned above, i represents the number of version bits used to convey the version identifier in the watermark signal). Version spectral magnitude sequences computed for the set of candidate spectral magnitude profiles are then correlated with one or more known version identifiers (e.g., stored within a memory of the watermark detector module, the cue detection module, etc.), thereby generating a "version correlation metric" for each version spectral magnitude sequence. If the version correlation metric for any version spectral magnitude sequence is above a threshold correlation value, then a watermark signal can, in some cases, be determined to be present within the audio input. Notwithstanding the above, it will be appreciated that the presence of a watermark signal can be detected as described in any of the aforementioned U.S. Pat. No. 8,694,049 or U.S. Patent App. Pub. Nos. 2014/0108020 and 2014/0142958, or the like or any combination thereof.

Upon detecting the presence of an audio watermark signal at stage 614, the watermark detector module generates, as output, a signal or other message or data signal (e.g., indicating that an encoded audio watermark signal has been detected). The watermark detector output can thereafter be communicated or otherwise delivered in the manner discussed above.

More on Coping with Distortions

As exemplarily described above, the detection process executed at stage 614 is facilitated takes a "brute force" approach to estimating linear time scaling of audio represented by the audio input. In another embodiment, linear time scaling can be estimated directly.

If an audio signal is time-scaled by a factor S, then the frequency component which would originally have appeared at bin index N of the FFT will now appear at index N/S. For example, if an original (unscaled) audio signal is time-scaled by a factor of 2 (becoming twice the duration as previously), then the frequency component at 500 Hz in the original signal will appear at 250 Hz in the scaled signal. By transforming the group of normalized spectral magnitude frames output at stage 612 to log-space (thereby creating a "transformed signal"), and also transforming version bits of the known version identifier(s) (also referred to herein as a "template"), their positions and known values, to the same space, the correlation between the transformed signal and the transformed template in log-space can be used to find a peak and determine the LTS shift. In one embodiment, transformation of the group of normalized spectral magnitude frames and of the template to log-space can accomplished as follows:

1. Let $R_O$ be the bin index of the lowest frequency to be transformed to log space. This first bin index can be 1 or greater.
2. Let $R_{END}$ be the bin index of the highest frequency to be transformed to log space. This second bin index can be 1023.
3. Let N be the desired number of points in the log-transformed space.
4. Transform a coordinate x in the log domain to a coordinate x' in the frequency domain as follows:

$$X' = R_O A_x, \quad (4)$$

such that, when x=0, $X'=R_O$, and value of A is chosen so that when x=N−1, $X'=R_{END}$.

5. The group of normalized spectral magnitude frames is then mapped onto the log-space (length N) as follows. For each coordinate x=0, 1, 2, ..., N−1, the source index X' is calculated using Equation (4). The value of the transformed signal, logspace[x], is computed by interpolation (linear or otherwise) on the frequency data at coordinate X'.
6. The template are also mapped to log-space for correlation with the transformed signal.
7. Let X'i be the index of the $i^{th}$ bit of the template in frequency space. Using the inverse of Equation (4) (solving for x in terms of X') the indices xi of the version bits in log space can be determined. The values (+1 or −1) of the version bits are unaltered by this transformation. These locations are fixed and can be built into the watermark detector module as constant data.
8. Once the transformed signal and transformed template are obtained, a correlation between the two is calculated. In one embodiment, the correlation is normalized in regions where the template partially "falls off" the signal due to LTS shifting of some version bits above the Nyquist limit. It may be possible to construct a range of interest such that this normalization is not required.
9. The absolute value of the correlation is then used as a basis to search for the highest peak.
10. Once the highest peak (or peaks) are found, the inverse of Equation (4) is applied to convert the peak position back to the usual frequency coordinates. The ratio between the converted peak position and the known peak position for the 0% LTS case gives the final LTS estimate.

Temporal Gating Stage

In one embodiment, the output generated at 614 is output (e.g., via the bus 100) to one or more components of the electronic device when it is generated. Optionally, the output of any signal or other message or data generated at 614 is delayed (e.g., at 616) until the encoded audio watermark signal is detected over some period of time (e.g., spanning a range from 0.5 seconds (or thereabout) to 30 seconds (or thereabout)). Temporally gating the output of the watermark detector module in this manner can help to avoid or otherwise reduce the risk of false positive detections.

Adaptive Dynamic Range Adjustment

Watermark detection processes, such as watermark detection process 600, can be implemented as "fixed-point" or "floating-point" processes. Fixed-point processes represent data with a fixed number of bits after (and sometimes before) the radix point (also called the decimal point or binary point). In contrast, floating-point processes represent data approximately to a fixed number of significant bits and scaled using an exponent. The exponentiation inherent in floating-point processing assures a much larger dynamic range (i.e., the largest and smallest numbers that can be represented), which can be important when processing data where the range may be unpredictable. However, floating-point processes can be more complicated (and, thus, more computationally expensive) than fixed-point processes. Therefore, when implementing a watermark detection process (e.g., watermark detection process 600) as a fixed-point process, it can be beneficial to adjust the dynamic range of the audio input as a pre-processing stage (e.g., prior to stage 604) in order to maintain low bit representation of the audio input within the watermark detector module 502 (and other modules such as a watermark decoder module, exemplarily discussed below).

Upon adjusting the dynamic range, the bit-depth representation of the sampled audio input can be reduced, for example, from the typical 32-bit (float) or 16-bit CPM to a lower bit depth representation (e.g., 8-bit or 12-bit) to avoid overflow when performing certain operations in connection with watermark detection or decoding. In one embodiment, the dynamic range of the audio input is adjusted by dropping some of the least significant bits and retaining the remaining most significant bits. This approach works in general, but when the audio input samples have a limited dynamic range (often due to low values) most of the information is in the lower significant bits and the most significant bits are not used. Thus the general approach of dropping the least significant bit can potentially result in losing a significant portion of information in the audio input samples. Accordingly, in another embodiment, the dynamic range of the audio input is adjusted by evaluating the dynamic range of the incoming audio input to determine which bits might be carrying a watermark signal and which bits could be truncated. In one embodiment, the evaluation may be performed by analyzing one or more frames of sampled audio input to determine certain statistical characteristics of the frame(s), such as min, max, mean, StDev etc. Adjustment of the dynamic range can be performed by the watermark detector, or by another module associated with the cue detection module and communicatively coupled to an input of the watermark detector module.

When a watermark signal is encoded in ambient sound, the watermark signal can serve as an auxiliary channel conveying one or more items of auxiliary data within the plural-bit message, which can be used for many applications. Methods of extracting, recovering or otherwise decoding auxiliary data from detected watermark signals are disclosed in aforementioned U.S. Pat. Nos. 5,862,260, 6,122,403, 6,590,996, 6,614,914, 6,674,876, 6,724,914, 6,968,564, 7,006,555, 7,020,304, 7,412,072, 7,424,131, 8,488,838, and 8,660,581, in aforementioned U.S. Patent App. Pub. Nos. 2012/0214544, 2014/0108020, 2014/0142958 and 20150016661 and U.S. application Ser. No. 14/821,435.

In one embodiment, an item of auxiliary data conveyed by the watermark signal is represented by a single bit or by a plural-bit sequence, wherein each bit of auxiliary data (also referred to herein as a "auxiliary data bit") is repeated at a plurality of known frequency locations. Accordingly, the auxiliary data may be repeated at k×l frequency locations, where k represents the number of auxiliary data bits and l represents the number of frequency locations to which each auxiliary data bit is mapped. Once a watermark signal is detected, it can be interpreted so as to extract, recover or otherwise decode a plural-bit message in a quick and efficient manner.

An item of auxiliary data can include any machine-executable instruction (e.g., executable by a CPU, the cue detection module, GPU, user interface module, sensor interface module, image signal processor, audio DSP, communications module, or the like), a content signal (e.g., an audio signal, an image signal, a video signal, etc.), a machine-readable computer file (e.g., for storing text data, audio data, image data, video data, or for storing haptic signature data as described in U.S. Patent App. Pub. No. 2012/0028577—which is incorporated by reference herein in its entirety), or any data or metadata as described in U.S. Patent App. No. 2014/0142958 and U.S. Provisional application Ser. No. 14/821,435, each of which is incorporated herein by reference in its entirety, or an IP address, URL, database index or other link (e.g., a direct link or an indirect link) to any of the foregoing examples of types of items of auxiliary data, or the like or any combination thereof. In one embodiment, the auxiliary data could be provided as an identifier comprising a hash of any of the examples of types of auxiliary data items given above.

Decoding Encoded Audio Watermark Signals

Figure 22:
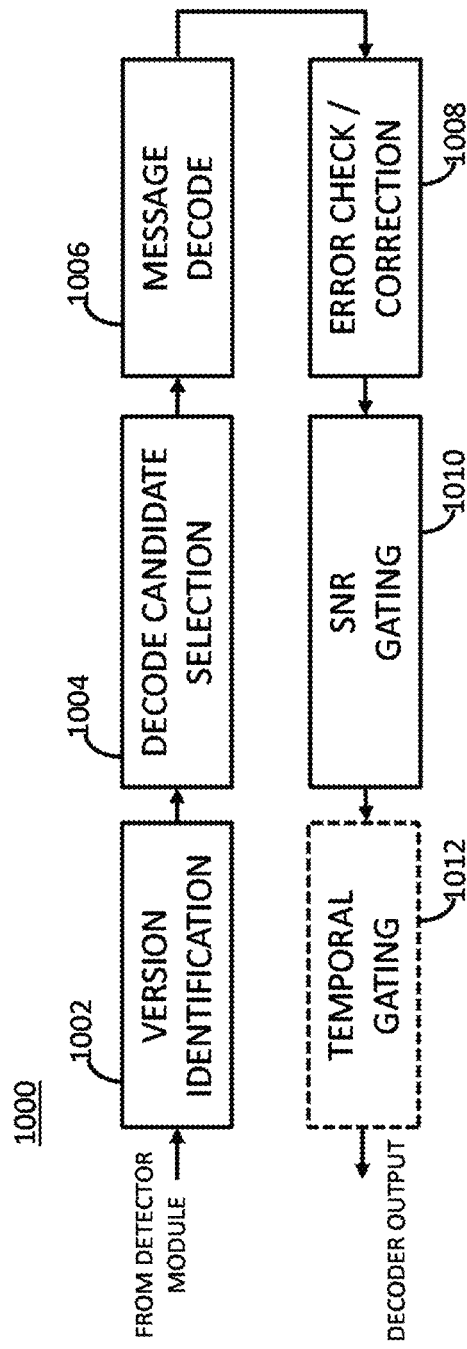
FIG. 22 is a diagram illustrating a process of extracting a watermark payload (also variously referred to as decoding, decoding a payload or reading a watermark message).

An exemplary decoding process is described in greater detail with respect to FIG. 22. Specifically, FIG. 22 illustrates a watermark decoding process 1000 for decoding a frequency-domain audio watermark signal employing an adjacent-frame, reversed embedding modulation scheme, such as that exemplarily described above and in aforementioned U.S. Patent App. Pub. No. 2014/0142958. It will be appreciated that the techniques described herein may be adapted to detect other types watermark signals employing any suitable or beneficial modulation scheme. Generally, the watermark decoding process 1000 operates on audio input that has been processed by the watermark detector module (e.g., as a result of any stage of the watermark detection process of FIG. 20). It will be appreciated, however, that the watermark decoding process 1000 may operate on audio input that has not be processed by the watermark detector module, executing the detection process of FIG. 20.

Version Identification Stage

At 1002, the version of the watermark protocol used to construct the detected watermark signal is identified. In one embodiment, the version is determined by determining the highest version correlation metric obtained at aforementioned stage 614, and then identifying the version identifier associated with the highest version correlation metric. Notwithstanding the above, it will be appreciated that the version may be detected as described in any of the aforementioned U.S. Pat. Nos. 7,020,304 and 7,412,072, in any of the aforementioned U.S. Patent App. Pub. Nos. 2014/0108020 and 2014/0142958, or the like or any combination thereof.

Decoding Candidate Selection Stage 1004

As mentioned above, the watermark protocol specifies, among other things, data formatting (e.g., relating to how data symbols are arranged into message fields, how message fields are packaged into message packets, etc.) and how watermark signal elements are mapped to corresponding elements of a host audio signal. Thus the version identifier identified at 1002, which is associated with a particular watermark protocol, can be used to determine the manner in which the auxiliary data should be formatted and mapped (i.e., "structured") within the detected watermark signal. To increase the likelihood that auxiliary data constructed into the detected watermarked signal is decoded correctly, a decode candidate selection process is performed prior to decoding. In one embodiment, the decode candidate selection process operates on the set of candidate spectral magnitude profiles obtained from the distortion estimation performed at 614. For example, for each of the candidate spectral magnitude profiles obtained from the distortion estimation at 614, the spectral magnitudes corresponding to the aforementioned auxiliary data bits are extracted. Thereafter, values at the frequency locations for each extracted auxiliary data bit are aggregated (e.g., summed), thereby yielding a sequence of k spectral magnitudes (also referred to as an "auxiliary data spectral magnitude sequence," where, as mentioned above, k represents the number of auxiliary data bits used to convey the auxiliary data in the watermark signal). Each auxiliary data spectral magnitude sequence is then correlated with a reference spectral magnitude sequence (e.g., stored within a memory of the watermark detector module, the cue detection module, etc.) associated with version identifier identified at 1002, thereby generating a "structural strength metric" for that auxiliary data spectral magnitude sequence. For each auxiliary data spectral magnitude sequence, the version correlation metric and the structural strength metric are aggregated (e.g., summed) to produce a "decode candidate strength metric" for that auxiliary data spectral magnitude sequence. Thereafter, a decode candidate selection process is performed to select which auxiliary data spectral magnitude sequence(s) to submit to the decode process at 1006.

In one embodiment, the decode candidate selection process 1004 is performed by analyzing the decode candidate strength metrics computed for each auxiliary data spectral magnitude sequence. For example, decode candidate strength metrics for the entire set of auxiliary data spectral magnitude sequences are analyzed to identify any auxiliary data spectral magnitude sequence(s) having a decode candidate strength metric above a threshold decode candidate value. In another example, decode candidate strength metrics for the entire set of auxiliary data spectral magnitude sequences are analyzed to identify only the auxiliary data spectral magnitude sequences having the o highest decode candidate strength metric values (where o is any integer greater than 1 and, in one embodiment, is in a range from 4 to 10, but may alternatively be greater than 10 or less than 4), which may or may not be greater than the threshold decode candidate value. Any identified auxiliary data spectral magnitude sequence is then submitted, as a candidate spectral magnitude sequence, for decoding at the decoding stage 1006.

In another embodiment, the decode candidate selection process is performed by first analyzing the decode candidate strength metrics computed for each auxiliary data spectral magnitude sequence (e.g., as discussed in the examples above). Next, and assuming that a set of multiple auxiliary data spectral magnitude sequences has been identified, the set of identified auxiliary data spectral magnitude sequences is analyzed to identify "similar" auxiliary data spectral magnitude sequences. As defined herein, one auxiliary data spectral magnitude sequence (e.g., auxiliary data spectral magnitude sequence "A") is similar to another auxiliary data spectral magnitude sequence (e.g., auxiliary data spectral magnitude sequence "B") if the two auxiliary data spectral magnitude sequences are derived from the same noise profile and neighboring linear scaling factors. For example, auxiliary data spectral magnitude sequence "A" may be similar to auxiliary data spectral magnitude sequence "B" if the two auxiliary data spectral magnitude sequences are both derived from noise profile "C," and auxiliary data spectral magnitude sequence "A" is further derived from linear scaling factor "D" while auxiliary data spectral magnitude sequence "B" is further derived from linear scaling factor "E" (where linear scaling factors "D" and "E" are adjacent to one another, or are separated from one another by a range of 1 to 5 other intervening linear scaling factors). Within each sub-set of similar auxiliary data spectral magnitude sequences, any auxiliary data spectral magnitude sequence that does not have the highest decode candidate strength metric is identified as a redundant auxiliary data spectral magnitude sequence. Redundant auxiliary data spectral magnitude sequences are removed from the set of identified auxiliary data spectral magnitude sequences, and any auxiliary data spectral magnitude sequence remaining is then submitted, as a candidate spectral magnitude sequences, for decoding at the decoding stage 1006.

In yet another embodiment, the decode candidate selection process is performed by analyzing the decode candidate strength metrics computed for multiple sub-sets of auxiliary data spectral magnitude sequences. In this embodiment, different sub-sets of auxiliary data spectral magnitude sequences are derived from one or more different linear scaling factors, such that different sub-sets of auxiliary data spectral magnitude sequences represent different levels of distortion. For example, a first sub-set of auxiliary data spectral magnitude sequences may be derived from one or more first linear scaling factors (e.g., including 0% scaling, a first range of linear scaling factors, or the like or any combination thereof) and a second sub-set of auxiliary data spectral magnitude sequences may be derived from one or more second linear scaling factors (e.g., including second range of linear scaling factors, having an average linear scaling factor that is greater than that of the first range of linear scaling factors). Then, for each sub-set of auxiliary data spectral magnitude sequences, the decode candidate strength metrics are analyzed to identify only the auxiliary data spectral magnitude sequences having the highest p decode candidate strength metric values (which may or may not be greater than the threshold decode candidate value). In general, the number of auxiliary data spectral magnitude sequences, p, identified for a sub-set will correspond to the distortion level represented by the sub-set. In one embodiment, the number of auxiliary data spectral magnitude sequences, p, identified for any sub-set will increase as the distortion level represented by the sub-set decreases. For example, the number of auxiliary data spectral magnitude sequences p identified for the aforementioned second sub-set may be in a range that is 10% to 80% less than the number of auxiliary data spectral magnitude sequences p identified for the aforementioned first sub-set. The resulting sub-sets of identified auxiliary data spectral magnitude sequences are then submitted, as candidate spectral magnitude sequences, for decoding at the decoding stage 1006.

In the embodiments discussed above, a set of one or more candidate spectral magnitude sequences can be submitted for decoding periodically (e.g., every half-second, every second, every two seconds, etc., or thereabout), after a certain number (e.g., 2, 4, 6, 8, 10, 12, etc.) of auxiliary data spectral magnitudes have been identified, or the like or any combination thereof.

In the embodiments discussed above, the decode candidate selection process is performed based on the decode candidate strength metric. In another embodiment, however, any of the aforementioned decode candidate selection processes can be similarly performed based upon the version correlation metric, thus obviating the need to compute the structural strength metric and potentially increasing the speed with which the decode candidate selection process is performed.

Notwithstanding the above, it will be appreciated that the candidate decode selection stage 1004 can be performed according one or more other suitable processes (e.g., as exemplarily described in aforementioned U.S. Pat. Nos. 5,862,260, 6,122,403, 6,590,996, 6,614,914, 6,674,876, 6,724,914, 6,968,564, 7,006,555, 7,020,304, 7,412,072, 7,424,131, 8,488,838, and 8,660,581, in aforementioned U.S. Patent App. Pub. Nos. 2012/0214544, 2014/0108020, 2014/0142958 and 20150016661 and U.S. application Ser. No. 14/821,435, or the like or any combination thereof).

Message Decode Stage

At 1006, each candidate spectral magnitude sequence in the set submitted from stage 1004 is processed to decode the auxiliary data constructed into the detected watermark signal, thereby yielding decoded auxiliary data. In one embodiment, the decoding is performed by reference to the version identifier identified at 1002 (which, as discussed above, is associated with the particular watermark protocol used to construct and encode the watermark signal). It will be appreciated that the decoding process 1006 can be performed according one or more suitable processes (e.g., as exemplarily described in aforementioned U.S. Pat. Nos. 5,862,260, 6,122,403, 6,590,996, 6,614,914, 6,674,876, 6,724,914, 6,968,564, 7,006,555, 7,020,304, 7,412,072, 7,424,131, 8,488,838, and 8,660,581, in aforementioned U.S. Patent App. Pub. Nos. 2012/0214544, 2014/0108020, 2014/0142958 and 2015/0016661 and U.S. application Ser. No. 14/821,435, or the like or any combination thereof). The resulting set of decoded candidate spectral magnitude sequences is then submitted, as a set of one or more instances of decoded auxiliary data, for error checking or correction at stage 1008.

Error Check/Correction Stage

At 1008, each decoded candidate spectral magnitude sequence in the set submitted from the decoding stage 1006 is subjected to error checking or correction. It will be appreciated that any error checking or correction processes conducted at 1008 can be performed according one or more suitable processes (e.g., as exemplarily described in aforementioned U.S. Pat. Nos. 5,862,260, 6,122,403, 6,590,996, 6,614,914, 6,674,876, 6,724,914, 6,968,564, 7,006,555, 7,020,304, 7,412,072, 7,424,131, 8,488,838, and 8,660,581, in aforementioned U.S. Patent App. Pub. Nos. 2012/0214544, 2014/0108020, 2014/0142958 and 20150016661 and U.S. application Ser. No. 14/821,435, or the like or any combination thereof). Upon passing the error checking or correction at stage 1008, a decoded candidate spectral magnitude sequence is submitted to next processing stage (e.g., the SNR gating stage 1010).

SNR Gating Stage

At 1010, SNR gating is applied to each decoded candidate spectral magnitude sequence submitted from stage 1008 to determine the strength of the watermark signal that conveyed the decoded auxiliary data relative to one or more noise profiles. If it is determined that the watermark signal strength of a decoded candidate spectral magnitude sequence is above one or more predetermined threshold values, the watermark detector module generates, as output, a signal or other message or data indicating that an encoded audio watermark signal has been decoded. Additionally or alternatively, the watermark decoder output can include the extracted, recovered or otherwise decoded auxiliary data corresponding to the decoded candidate spectral magnitude sequence that passed the SNR gating. Thereafter, the watermark decoder output can be communicated or otherwise delivered in the manner discussed above.

In one embodiment, one or more sets of buffer elements in the filter buffer (e.g., filter buffer 710), the first accumulation buffer (e.g., first accumulation buffer 720), the aggregation buffer (e.g., aggregation buffer 730), or any combination thereof) may be cleared upon transmitting the watermark detector output.

Temporal Gating Stage

In one embodiment, the output generated at 1010 is output (via bus) to one or more components of the electronic device when it is generated. Optionally, the output of any signal or other message or data generated at 1010 is delayed (e.g., at 1012) until multiple instances of the same auxiliary data have been decoded over some period of time (e.g., spanning a range from 0.5 seconds (or thereabout) to 30 seconds (or thereabout)). Temporally gating the output of the watermark decoder module in this manner can help to avoid or otherwise reduce the risk of generating output based on auxiliary data that has been improperly decoded.

More on Watermark-Based Cue Detection

As discussed above, the watermark decoding process 1000 can be generally characterized as operating upon audio input that has been processed during the watermark detection process 600. Thus the watermark detection process 600 essentially functions as a pre-processing stage to the watermark decoding process 1000, and can be characterized as including a signal processing phase (e.g., signal processing phase 600a shown in FIG. 20, which includes aforementioned stages 602, 604, 606, 608, 610 and 612 that facilitate detection of a watermark signal within the audio input) and a watermark determination phase (e.g., watermark determination phase 600b shown in FIG. 20, which includes aforementioned stage 614—and optionally stage 616—where a determination can be made as to whether or not a watermark signal is present within the audio input).

More on the Signal Processing Phase and the Signal Processing Module

In the embodiments discussed above, the signal processing phase 600a and the watermark determination phase 600b are both performed by the watermark detector module. In another embodiment, however, the signal processing phase 600a is performed by a separate module (e.g., a "signal processing module," included as part of the cue detection module), and the watermark detector module may simply be communicatively coupled to an output of the signal processing module (e.g., so as to receive the output of the estimate normalization stage 612) to execute signal detection stage 614 and (optionally) the gating stage 616. In this case, the watermark decoder module is communicatively coupled to the output of the watermark detector module (e.g., to receive output indicating that a watermark signal has been detected), to an output of the signal processing module (e.g., to receive the output of the estimate normalization stage 612), or the like or any combination thereof. In one embodiment, the signal processing module and any of the audio activity detector module, the watermark detector module and watermark decoder module are part of the same electronic device. In another embodiment, however, the signal processing module is part of one electronic device (e.g., a first electronic device) and the audio activity detector module, watermark detector module and the watermark decoder module are part of one or more other electronic devices (e.g., one or more second electronic devices) physically separate from the first device but communicatively coupled to the first electronic device (e.g., via one or more wired or wireless links as discussed above). In this embodiment, the first electronic device and the second electronic device(s) may be any of the aforementioned portable electronic devices or may be a desktop computer, a server (e.g., an application server, a cloud server, a base-station server, or the like or any combination thereof), or the like or any combination thereof.

In one embodiment, the signal processing phase 600a is reconfigurable or otherwise adapted to increase the speed, accuracy, etc., with which a watermark signal is detected or with which auxiliary data is decoded. For example, the signal processing phase 600a may be initially executed using one more parameters that are optimized or otherwise suitable for watermark detection. Once a watermark signal has been detected (e.g., as indicated by the watermark detector output by the watermark detector module 502), the signal processing phase 600a may be re-executed using one more parameters that are optimized or otherwise suitable for decoding of auxiliary data. In some cases, reconfiguring the signal processing phase 600a can also result in reducing the amount of resources (e.g., in terms of number of computations required, complexity of computations required, instructions per second required, memory requirements, power usage, etc.) that would have otherwise been required or otherwise consumed to process the audio input according one standard configuration.

In another embodiment, multiple signal processing modules may be employed, where one signal processing module (e.g., a first signal processing module) is configured to execute a signal processing phase 600a using parameters that are suitable or otherwise optimized for watermark detection and another signal processing module (e.g., a second signal processing module) is configured to execute a signal processing phase 600a using parameters that are suitable or otherwise optimized for decoding of auxiliary data. In this embodiment, the first signal processing module may be activated to execute a signal processing phase 600a using one more parameters process that are optimized or otherwise suitable for watermark detection. Once a watermark signal has been detected (e.g., as indicated by the watermark detector output), the second signal processing module may be activated to execute a signal processing phase 600a using one more parameters process that are optimized or otherwise suitable for decoding of auxiliary data.

Example Processing Parameters

In one embodiment, an example parameter that may optimized or otherwise suitably selected for watermark detection or decoding of auxiliary data is a frequency spectrum of the sampled audio input computed at the transform stage 604, where the frequency spectrum to be computed in support of a watermark detection process is different from that to be computed in support of a decoding process. For example, one or more first sub-bands of the frequency spectrum (e.g., with each sub-band only spanning a frequency range of 2 kHz, 4 kHz, etc.) may be computed in support of a watermark detection process whereas and one or more second sub-bands of the frequency spectrum (or the entire frequency spectrum) may be computed in support of a decoding process. In this case, each first sub-band could correspond to a location in the frequency spectrum where a watermark signal or a portion thereof (e.g., a version identifier, etc.) is, or is otherwise expected to be, found. In another example, a sparse FFT could be used to compute the frequency spectrum of the frame where a portion of the watermark signal (e.g., the version identifier, etc.) could be found or is otherwise expected to be found. The frequency sub-band to be computed may be predetermined, or may be determined after first examining the frequency content of the audio input frame.

In another embodiment, an example parameter that may optimized or otherwise suitably selected for watermark detection or decoding of auxiliary data is a resolution of an FFT applied to the audio input during the transform stage 604. For example, an FFT applied in support of a watermark detection process can have a relatively coarse resolution (e.g., a 512- or 256-point FFT) and an FFT applied in support of a watermark detection process can have a relatively fine resolution (e.g., a 1024-point FFT).

Pilot and Auxiliary Data Signals, and Other Aspects of Watermark Signals

In addition to (or as alternative to) configuring the signal processing phase 600a according to one or more parameters such as those described above, a watermark signal may be constructed so as to have one or more characteristics that facilitate quick and efficient detection by the watermark detector module. For example, the watermark signal can be constructed such that a portion thereof (e.g., the portion of the watermark conveying the version identifier, etc.) is present within a frequency sub-band corresponding to a set of relatively low-frequency FFT bins or other FFT bins that provide for suitable or desirable computational simplification. In this sense, the watermark signal can be characterized as including a "pilot signal." By constructing the watermark signal as described above, the audio input can be initially sampled at a lower sampling rate (e.g., lower than 16 kHz) and may also allow for one or more relatively small FFTs to be used at the transformation stage 604 in support of a watermark detection process.

In another embodiment, a watermark signal may be constructed simply to be detected, and need not convey auxiliary data for decoding. In this context, such a watermark signal may also be referred to as a "pilot signal." The pilot signal may be constructed as a frequency-domain audio watermark signal employing an adjacent-frame, reversed embedding modulation scheme (e.g., such as that exemplarily described in aforementioned U.S. Patent App. Pub. No. 2014/0142958) and may be represented by a multi-bit sequence having bits that are mapped to one or more particular frequency sub-bands (e.g., in a range spanning 0 to 2 kHz, etc.).

In another embodiment, one or more characteristics of the pilot signal may be different from another watermark signal conveying auxiliary data (also referred to herein as an "auxiliary data signal"). For example, both the pilot signal and the auxiliary data signal may be characterized as a frequency-domain audio watermark signal, but the tile size of the pilot signal may be less than that of the auxiliary data signal. In another example, the pilot signal may be provided as a time-domain watermark signal whereas the auxiliary data signal may be provided as a frequency-domain watermark signal (e.g., of the type exemplarily described above). Exemplary details of time-domain audio watermark signals are described in aforementioned U.S. Patent App. Pub. No. 2014/0142958. In another example, the pilot signal may be provided as a single-bit watermark signal whereas the auxiliary data signal can be provided as a multi-bit watermark signal.

In these embodiments, a first instance of a signal processing phase 600a may be executed to support a watermark detection process performed by the watermark detector module (i.e., implemented to detect the presence of a pilot signal in the audio input). Once a pilot signal has been detected (e.g., as indicated by the watermark detector output by the watermark detector module), a second instance of a signal processing phase 600a may be executed to support a decoding process performed by the watermark decoder module (i.e., implemented to decode auxiliary data constructed into a watermark signal encoded in the audio input). In one embodiment, the second instance of the signal processing phase 600a may be performed immediately once pilot signal is detected. Alternatively, the second instance of the signal processing phase 600a is executed only after a predetermined period of time has passed. In this case, the pilot signal acts to indicate when a watermark signal conveying decodable auxiliary data will be present within the audio input.

Digital Watermarking for Media Synchronization

Digital watermarks in the audio or video provide various forms of information that can be extracted from ambient capture of the audio output or video display, or in-line detection from the electronic video or audio signal in a video or audio receiver. The digital watermark payload embedded in the audio or video signal may convey identifiers (i.e. identifier of the distribution source or broadcaster, program identifier, segment or event identifiers, etc.) as well as timing marks.

The rate at which these payloads are updated in the signal typically varies. The source identifier, for example, may be repeated throughout the signal, while the program identifier varies with the program or commercial, and the timing mark varies more frequently to provide a time reference within the program. Regardless of the rate and granularity of this information, the robustness of the watermark may be such that, at least initially, a relatively large portion of audio or video (e.g., a few seconds, or even more) is needed to extract it reliably (particularly in ambient detection where background noise is mixed with the watermarked signal). Initial detection may take longer as the identity of the content and position of payloads within it are unknown. Once the identity is determined and watermark payloads synchronized (temporal position and scale), the detection is more computationally efficient as it focuses on expected payloads and synchronization parameters.

Detection of the watermark payloads (content IDs or content ID and timing mark) provides data from which the content is identified directly or indirectly. If timing marks are decoded from the watermark, they provide a time reference to re-establish synchronization. Thus, watermark decoding provides the ability to re-synch efficiently as it provides information about the content and the decoded timing information, if available.

The watermark provides the additional benefit of identifying particular instances of the content. The embedded content IDs can provide attribution of source (who was the distributor that sent that entertainment content or program copy). They can provide any other information that is unique to the instance of a signal, such as other attributes of the particular circumstances of the distribution of that signal to the user. Attribution, for example, is needed for determining payment for advertisement revenue sharing, as well as payment for transaction based fees, where the user's consumption or use of the content requires payment or leads to the purchase of a product or service linked to the program. Digital watermarking also provides robust content recognition and can identify content captured from the user's ambient environment through built-in microphones and sensors. The digital watermark conveys a payload that is able to identify entertainment content despite changes due to distortions incurred in the distribution channel, including source coding like compression and digital to analog conversion. It enables recognition triggered services to be delivered on an un-tethered mobile device as it samples signals from its environment through its sensors.

Media Identification and Payoffs

When used for identification, the digital watermark payload embedded in the audio or video content provides an identifier for the specific segment of the content. The content ID can be unique to this specific segment or it could repeat over the entire content or over disjointed segments of the content. A payload carrying an identifier may be used to trigger a payoff associated with the identifier. Due to the latency between detecting that payload, and the fetching and rendering of a payoff linked to that identifier, it may be desirable to encode the payload at a temporal location in the program in advance of when the payoff is to be rendered to the viewer/listener. The payload may also include a data field providing a time offset at which the payoff is to be rendered relative to the location of the payload in the content. Examples of payoffs include rendering of an image, video sequence, animation, graphic (e.g., augmented reality overlay on display of live video), haptic response, etc. This time offset enables the detector and payoff rendering system to compensate for variable latency of detection and payoff fetching and schedule rendering of the payoff accurately. Once content is identified, payoffs may be fetched and cached on the user's local device, or even pre-stored within a mobile application's shared memory on that device. Further, after initial identification, the payloads and relative position of them may be known for the program, enabling the detector to execute simpler detection operations. Thus, the latency of detection and payoff fetching may be negligible after initial detection and watermark synchronization. Nevertheless, the detector still needs to detect out of sync conditions and re-establish identification and/or synchronization.

In addition to, or as alternative to content IDs, a set of timing marks can be embedded in the audio or video and used to build content timeline to achieve synchronization and timed delivery of recognition triggered services.

Content IDs Whenever Payoff is Required (No Explicit Timeline)

In the case where a payload identifies and triggers a payoff, the watermark payload need only be inserted at specific locations in the media and for a specified duration (e.g., redundantly encoding the payload for 10 seconds minimum for optimal detection). The watermark payload need not include timing information. The listening device will deliver recognition triggered services in response to detecting a particular payload and fetching the payoff as noted. Normally the listening device will detect the payload with content identifier within 1-3 seconds from the start of the watermarked segment depending on the device quality and the listening environment. This is because the payload is redundantly encoded in the segment, and the decoder operates on content within a sliding time window.

In some embodiments, the decoder is set up to perform a detection attempt every 1 or 2 seconds. The decoder analyzes a few seconds of audio to detect the payload. If the watermark signal is strong, the decoder might decode the content ID in less than a second. On the other hand, if for some reason, the decoder receives noisy watermark signal (interference from non-watermarked speakers, audience talking or other such sounds that interfere with watermark signal), then it might take the decoder a few seconds before it successfully decode the identifier from the payload in the segment.

If the watermarked media is audible enough, then all listening devices would detect the watermark within a span of few seconds. The exact timing of decoding the content IDs can be different between devices listening simultaneously for the watermark. This could be due to the differences in microphones and audio processing units in the devices, the location of the devices with respect to speakers, or some noise near a given device (someone talking, coughing, etc.). Synchronization between different listening devices is discussed in the section "Multiple device synchronization approaches".

Timing Marks Plus Content ID Whenever Payoff is Required

For broadcast monitoring, it is often important to synchronize the payoff to the start of the program or to different timed events within the program. This might necessitate building an explicit timeline at the decoder or at the resolver service to more tightly synchronize the recognition triggered services with the program events. Building a content timeline at the decoder could be derived/estimated from the watermark itself. This approach requires performing more frequent detection attempts and using timing marks to build the content timeline. Inserting timing payloads at regular/ known time intervals within the content provides the decoder with needed information for building the content timeline. The timing payloads can be sequential numbers to provide a counter relevant to the start of the program or they can have a single number or message symbol or symbol pattern that repeats at a known time interval.

For formatting of time codes in a payload encoded over an audio segment, it is not necessary to change the code more frequently than the period examined by the detector or captured in a useful duration of audio-visual content. If the audio-visual sample is long enough, then the time code transition can be searched for forward or backward from any point to calculate alignment (e.g., using above described methods). For example, a timecode portion of a payload could be updated every 10 seconds of host audio-visual content in which the payload is embedded, with every minute, flipping the second data over to full minute/hour/ date.

The decoder at the listening device can derive the content timeline to provide synchronization information using appropriate timeline estimation and smoothing logic based on the timing payloads. One way to derive the content timeline is as follows—the decoder starts to initialize upon being launched and it fully initializes only after it successfully detects the first (or first few) payloads. It uses these first few payload detections to establish a timeline before starting to deliver recognition triggered services. The decoder might take several seconds to initialize, but will then be in sync with the content timeline. The timeline is adjusted periodically whenever the predicted arrival of a payload does not match the actual arrival.

In one use case, the timing payloads are generic to multiple content items (e.g., programs, TV shows, songs, movies, commercials or the like), where the same set of timing payloads are used in different content items. In this case, the decoder at the listening device and/or the resolver service uses the timing payloads for building the content timeline while relying on the identifiers decoded in separate payloads along the content timeline to define the services to be delivered to the user. In another use case, the timing payloads are unique to the content, and they are used for both building the content timeline as well as identifying the content and the services to be delivered to the user.

Once the timeline is established, it may be used by any application, program or device (collectively, synchronizer) to pinpoint a time within a program at which to synchronize other processes, such as rendering a payoff. To pinpoint a time at a finer granularity than the time marks of the watermark, the synchronizer interpolates between marks, as refined by the timeline construction process. To predict a time in the future, the synchronizer extrapolates along the timeline to the time of the future event. Latency between a time point in the timeline and the actual time point in the program being received in sensors of the listening device is negligible for most applications as the detection time is fast after content identification and watermark synchronization is established. Nevertheless, a device can track latency by time stamping content on receipt and measuring delay to detection and report of a time boundary of a timing payload change on a local clock. The synchronizer then adjusts the timeline by the measured latency to keep it synchronized with content being sensed.

Broadcast and Internet Stream Monitoring

Monitoring and tracking radio, television and internet airplay of programs and songs provides statistical information about the distribution of the contents as well as audience engagement. This information is important for optimizing the monetization of the content and for fulfilling contractual obligations.

Digital watermarking can provide a robust means for tracking and monitoring the content by embedding the content with content IDs (i.e. identifier of the distribution source or broadcaster, program identifier, segment or event identifiers, etc.) as well as timing payloads. Digital watermarks can survive different transformations through the distribution workflow and they are robust in noisy listing environments.

Audience Measurement

Audience measurement measures radio listenership and television viewership as well as internet streaming traffic. Audience measurement helps broadcasters, advertisers and song owners determine the audience who are engaged with their content as well as their demographics and locations. This information helps the content providers in providing their audience with the most enjoyable and interactive experience.

Timing Marks Plus Content Identification

New digital technologies and internet streaming allow users to time shift, skip or pause broadcast content. This requires for providing content timing information and for establishing an explicit timeline at the listening/monitoring device. The timeline helps in providing a more tightly coupled experience with the content and a better audience measurement.

Digital watermarks embedded in the content can provide both content identification as well as the timing information necessary for maintaining synchronization with the a given timeline or a set of events. The timing information can be based on a set of indexed IDs embedded at a regular time interval or a single ID repeated at a known pattern of time intervals. The content IDs can be embedded at different locations of the content based on their intended use.

When embedding timing information in the content, one should balance between the benefit of timing marks and the information carrying content IDs. The more frequent the timing marks are available, the better the timeline estimation is but that comes at the expense of fewer information carrying content IDs. Less frequent timing marks lead to less accurate timeline estimation and to additional processing for refining and smoothing the timeline.

The decoder at the listening device and/or resolver service can build an explicit content timeline from the timing marks and use the content timeline to synchronize the audience measurements to the correct segments in the program they are listening/viewing. This approach allows the audience measurement devices to provide accurate listening/viewing information even when the user is listening/viewing the program off-sync from the actual broadcasting time.

Airplay Tracking

Media owners and media distribution agencies provide their media to broadcasters and distribution channels under contracts which guide the use case. For a long time the industry relied on an inefficient manual tracking process to monitor the media distribution and to verify that the actual use cases are in agreement with what is specified in the contract.

Digital watermarking provides a more efficient and accurate approach to media monitoring and tracking. Embedding content IDs in the audio clips before they are provided to the broadcasters or to the distribution channels will allow for tracking and monitoring the actual use case of these audio clips even after they are incorporated in the final media production.

A device equipped with a digital watermark decoder listening in-line or in ambient condition can detect the content ID and record statistical information about the content then compare actual detections to the specifics of the contractual agreement. Airplay tracking could also use a combination of timestamp and content IDs. This leads to an additional use case of using timestamp information to identify location of content in the stream. Of course, this involves the decoding of at least two different payloads which may not be practical in case of short media files (<5 seconds). Even if a few timestamps and a content ID are successfully retrieved, then the original content is used corresponding to the correct segment and correlated to obtain more accurate granularity information.

Tight Estimate of Payload Start and End Times

The watermark payload should be embedded in segment long enough (e.g., 10 seconds minimum for harsh environments) for optimal detection. In particular, the payload is redundantly encoded with the same content (e.g., an identifier) for the entire segment. The watermark decoder searches for the watermark every 1-2 second and should easily decode the payload from the segment, even under noisy listening conditions. The decoder should be able to easily collect statistical information pertaining to the frequency the media content was played. But contractual agreements often specify the content play duration (i.e. length of song or advertisement) and the decoder needs to collect tight statistical estimates of the duration of the content.

For a tighter estimate of payload segment start and end times, the decoder listens to the content a second time in a more detailed search mode in order to generate a tighter estimate of the start and end time for the detected content ID. The following are detection approaches for building a refined estimate of start and end time for a detected payload.

Likelihood Detection Approach

The watermark decoder operates on different size buffer of audio (3 to 12 second buffers) and performs detection attempts at different interval of time. The longer the buffer size used by the decoder the more information it has for decoding the payload but the least specific the start and end time for the payload segment. The more frequent the decode attempts that the decoder makes the better the chance of decoding the payload but this is expensive in terms of time and resources.

In one embodiment, a second-pass likelihood detector performs detection attempts at frequencies of 1 second or less and uses different buffer size configurations (ranging from 1 second to 12 second long). The second-pass likelihood detector uses smoothing functions to interpolate between decode results from its different configuration to achieve tighter estimates of the start and end for each instant the payload is detected.

The likelihood detection estimator can be used to estimate the likelihood that an audio segment is watermarked. It uses the watermark detector in multiple configurations (buffer sizes and detection frequencies) to obtain as many watermark detections as possible. Then, it uses a statistical analysis of the detection results to estimate the beginning and end of the audio segment watermarked with the unique payload.

The watermark detector buffers N seconds of audio and accumulates multiple frames of audio before decoding the watermark to enhance the signal to noise ratio. In this context, a frame refers to the length of audio to which a complete payload is mapped. As described elsewhere in this document, the decoder can accumulate plural frames of audio within a buffer and decode the watermark from the accumulated frames.

In one configuration, the detector uses a 6 second sliding buffer with a new second of audio being added before every detection attempt. When a watermark is detected from a 6 second buffer, it is not possible to know which part of the 6 second of audio in the buffer contributed to the detection of the watermark. A shorter buffer gives a more granular estimate of the watermarked region, but it is less robust especially under ambient conditions.

Shorter detection buffers provided finer estimates while longer buffers increase the signal to noise ratio and provide more robust detection of the watermark. The likelihood detection estimator method uses combinations of sort and long buffers at different detection frequencies to estimate the likelihood that a given audio segment is watermarked and it better defines the beginning and end of the watermarked segment.

One implementation of the likelihood detector is to collect detection results from the given audio input using watermark detectors with 1, 3, 6, and 9 second buffers and detection frequency of 1 second. The watermark detection results from each detector configuration is evaluated to estimate a likelihood that a given second of audio is watermarked.

Figure 23:
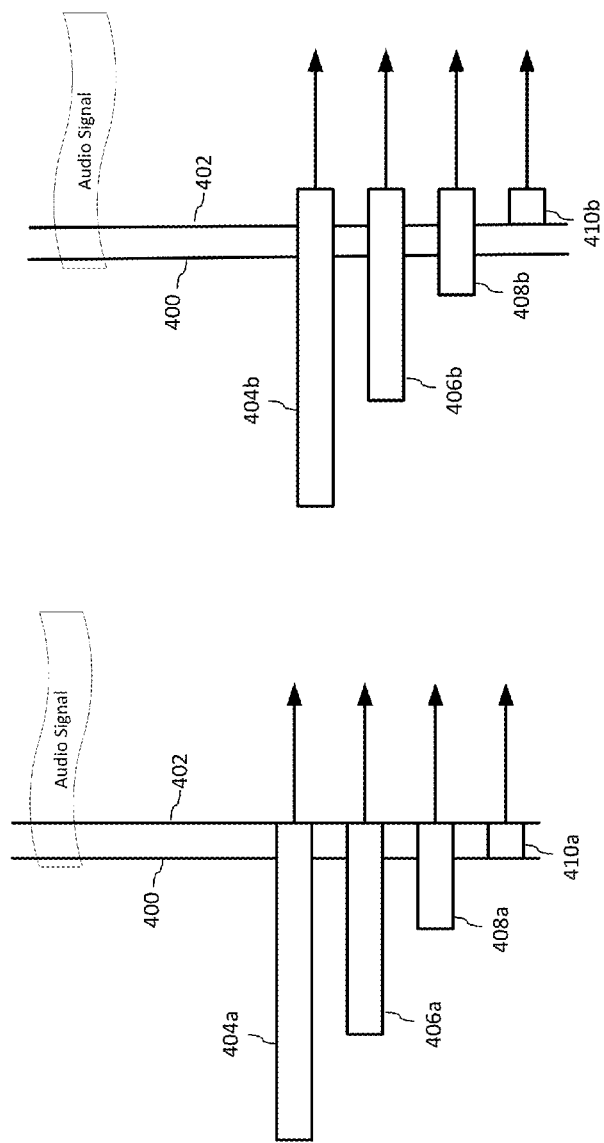
FIG. 23 is a diagram illustrating aspects of watermark decoding using plural buffers of varying lengths, corresponding to different lengths of audio sample sequences.

FIG. 23 is a diagram illustrating aspects of watermark decoding using plural buffers of varying audio sequence lengths. A decoder attempts to decode a watermark payload in the audio sequence within these different length buffers and outputs detection results. The smallest segment of audio that is buffered spans time points 400 to 402 in the audio signal. For this example, that time segment is one second. Buffers 404a, 406a, 408a, and 410a store 9, 6, 3 and 1 second of audio samples, respectively, at a time. The arrows to the right of each buffer illustrate that the decoder loads the buffers and steps through the audio in 1 second segments. For example, the next step in the sequence of shifting audio segments through the buffers is shown on the right, where the audio signal from time 400 to 402 has now shifted one segment to the left, as shown in the state of the buffers 404b, 406b, 408b. This segment of audio signal is now shifted out of the 1 second buffer 410b, which now buffers the next one second segment from the audio signal. From this illustration, one can see that the 1 second segment remains in the buffer for a sequence of N shifts of incoming audio, where N corresponds to buffer size in seconds of audio samples.

Separate detection results from the different length buffers for a time segment of audio are accumulated only if the same watermark payload is decoded in that segment. The audio segment from 400 to 402 steps through buffer 404a for 9 steps, through buffer 406a for 6 steps, through buffer 408a for three steps, and is only in buffer 410a for 1 step.

When a watermark is decoded with a decoder using N second buffer, each second of audio in the buffer is assigned a likelihood of 1/N.

For example, when using a 6 second buffer detector, as the detection buffer slides (at 1 second frequency, for example), a given second of audio will contribute to 6 different detection attempts.

When using a 6 second buffer detector, the likelihood that a given second of audio is watermarked is the sum of the contributions from all 6 detection attempts.

Similarly for 1, 3, and 9 second buffer detectors, the likelihood that a given second of audio is watermarked is a combination of the contributions from 1 detection attempt, 3 detection attempts, and 9 detection attempts, respectively.

The final likelihood that a time segment is watermarked is a combination of the detection likelihoods determined for that segment in the plural different buffers. For example, the plural different likelihoods are combined by summing or taking a weighted sum. In one embodiment, the final likelihood that a segment of audio is watermarked is the maximum of the sum of the likelihoods from any of the detection configurations.

For the 4 detector configurations—9 second buffers, 6 second buffers, 3 second buffers and 1 second buffers, each performing detection at 1 second intervals, the likelihood estimate at each second may be calculated by processing the detection results according to the following pseudocode:

$Val_x$=MAX ($detResult_x$, from 1-secBuff Detects,
SUM ($detResult_{x-2}$: $detResult_x$, from 3-secBuff Detects)*⅓,
SUM ($detResult_{x-5}$: $detResult_x$ from 6-secBuff Detects)*⅙,
SUM ($detResult_{x-8}$: $detResult_x$ from 9-secBuff Detects)*⅑)

where, $detResult_x$ is [0 or 1] (0 for no detect and 1 for detect) and x stands for the time instance (in seconds).

The contiguous span of a portion of audio signal with the same payload, including the start and end of that span, is detected by comparing this likelihood measure with a threshold (e.g., greater than 0.2). The successfully detected watermarked portion is the portion with a contiguous sequence of audio segments (e.g., 1 second segments in this example), each with a likelihood of detection above the threshold. The start of the portion is the first of such segments and the end is the last of such segments. The granularity of the start and end may be increased by using smaller audio segments than one second.

A smoothing function can be used to smoothen the likelihood estimates. In one implementation, the resulting likelihood values were smoothened by running a moving average across 5 values. The span of contiguous segments with the same payload are then determined by comparing the smoothed likelihood with a threshold and determining contiguous segments exceeding the threshold to be in the span. The start and end are the increments of time (and corresponding audio samples at those times) where the likelihood crosses the threshold.

The above example can be improved using an informed detector. After a watermark is decoded, the detector can be switched from default mode to an informed mode which only looks for the decoded watermark payload. Detector internal metrics (example SNR value) can be used to improve the likelihood estimates. Also a correlation detector can be used to provide higher detection frequency and finer granularity.

Special constraints can be applied to the first and last few second in the input audio as the buffer will be appended with all zeros at the beginning and end of the audio file or input audio stream.

Correlation Detection Approach

In this embodiment, the watermark decoder searches for IDs from a large set of possible IDs for a given payload specification. The default mode (full decode mode) of the watermark decoder operates under tight constraints that are meant to minimize the false positive case (falsely decoding the incorrect ID). After successfully decoding the ID, the watermark decoder changes its constraint full decode mode into a correlation based mode that is focused on search for the now-known ID.

A second-pass decoder operates as a correlation decoder searching for a known ID. This decoder is less resource consuming than a full search decoder and performs detection attempts at much higher frequency (few samples shifts). The buffer size for the correlation decoder is shorter than full decode mode and allows for tight start and end time estimates. Since the correlation decoder searches for a known ID, the signal to noise ratio is much improved and this in turn leads to fairly accurate detection of watermark start and end times.

Second Screen Applications

In the television industry, automatic content recognition (ACR) has been used to enhance a TV viewer's experience while watching a show on a primary screen by providing associated services on the viewer's personal mobile device, dubbed the "second screen." The ACR system, in such applications, includes a mobile application that operates on the user's device, and a computing service (e.g., in the cloud) that interacts with the mobile application to provide content recognition and/or delivery of network services associated with content once it has been recognized. See, e.g., our prior work in U.S. Pat. Nos. 8,407,752 and 9,292,894, which are hereby incorporated by reference.

A sophisticated application for enhanced TV experiences requires that the ACR system synchronize with the show timeline. Synchronizing to show timeline, in this context, means that the application keeps track of relative time location where the user is in the show during the viewing experience. The application synchronizes so that it can render time or event relevant experiences, such as alternative story lines, time relevant program data, social network experiences tied to particular events in a show, at time relevant events within the show.

The time offset relative to the show start or some other time reference of a signal stream is a proxy for program events within the stream. Typical viewing habits introduce discontinuities in the signal stream that affects signal recognition and synchronization. These discontinuities include, for example, channel surfing, time shifted viewing of previously recorded programs, fast forwarding and rewinding through a program, etc. The ACR application should preferably operate in the background in a passive recognition mode, effectively maintaining accurate recognition and synchronization, even as discontinuities occur. The digital watermark can provide IDs and timing marks that enable identification and synchronization through the viewing session.

Media Synchronization Approaches

In timeline synchronization, a listening device equipped with a watermark decoder builds an explicit timeline for the main program that the user is viewing based on the watermark payloads (e.g., a pattern of payloads such as timing marks) decoded from the content. As discussed earlier, the frequency of the timing marks can vary dependent on the program requirements and the required distribution of marks. Also, the detection of timing marks might be noisy due to content variability, content discontinuity, environment noise level variation and the length of the required buffer (3 to 6 seconds). Additional processing is needed at the decoder to refine the estimated timeline and media synchronization.

Regression Analysis for Timeline Fitting

The decoder at the listening device starts building the timeline after it successfully detects the first few timing marks. It might take the decoder few seconds to build the initial timeline, but it will then be in sync with the media timeline. The decoder continues to refine its timeline estimate as it decodes additional timing marks.

One approach for refining the timeline estimate is to use regression analysis of the detected timing marks. The timing marks can be sequential or fixed with known time interval pattern. As more timing marks are detected, a least squares method is used to fit timing information to form a tight representation of the content's timeline. This will allow for close synchronization with the events in the content and better utilization of payload bandwidth for carrying other information, such as the various identifiers mentioned.

Predictive Decoding after Initialization of Timeline

When the listening device is connected to networks (e.g., via Wi-Fi and cell networks) in this embodiment, it uses a resolver server (e.g., in the cloud) as alternative means of achieving synchronization. At initial state, the decoder in the listening device operates in the full decode mode and sends the decoded content and timing marks to the resolver server. Then once the resolver server has plural decode results, it establishes a timeline and synchronizes to the content. Then the resolver service predicts and supplies future watermark payloads according to a predetermined timeline. This embodiment allows the decoder to switch from the full decode mode to a predictive decode mode where it looks for these predicted payloads alone. The predictive decode mode is more robust and fast than the full decode mode. The resolver server continues to use the new decoded IDs to further fine tune the timeline.

Using this predictive decoding approach, the decoder relies on the resolver server to establish and refine the timeline while the decoder uses the predicted payloads from the resolver server to improve its accuracy and robustness. This approach eliminates the need for embedding timing marks and extends the capacity for other watermark payloads.

Each decoder may also maintain a local program timeline. In one configuration, the decoders receive an initial timeline estimate from the resolver, along with expected payloads and associated time offsets relative to payload position within the program. The decoder then maintains its own timeline, updated based on detecting expected payloads at the associated time offsets. This enables the decoder to manage the user experience effectively when it detects discontinuities in the program, e.g., due to channel change or time shifting.

In another configuration, the resolver provides program time updates based on a timeline it creates from detection results supplied from plural different decoders exposed to the same program stream. Examples of this configuration are discussed further below.

Multiple Device Synchronization Approaches

In some applications, multiple devices might be listening to or viewing the content simultaneously and they should be able to respond to recognition triggered services at the same moment in time. One scenario is where the audio track of a movie is encoded with watermark payloads according to the various embodiments of this specification for the purpose of triggering a response in each of the audience member's mobile devices at predetermined time points during the movie. It is desirable to have the audience members receive the triggered output of a recognition triggered response at the same time. However, the receiving devices might decode the watermark at different times due to the differences in microphones and audio processing units in the devices, the location of the devices with respect to speakers, or some noise near a given device (someone talking, coughing, etc.). Synchronization between different listening devices is achieved using a resolver service (e.g., executing on a server in the cloud, like watermark server 1308) that is connected to all listening devices.

Figure 33:
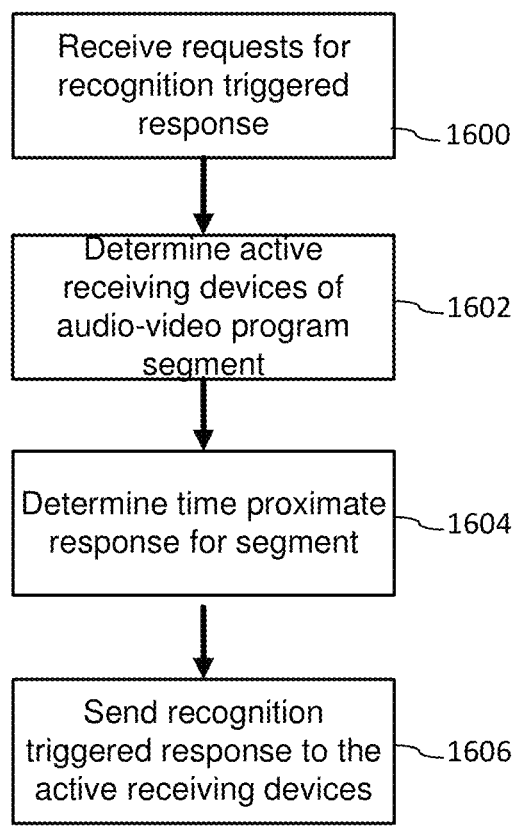
FIG. 33 is a flow diagram illustrating a method for synchronizing output on a plurality of receiving devices based on signal detection in audio-video input.

FIG. 33 is a flow diagram illustrating a method for synchronizing output on a plurality of receiving devices based on signal detection in audio-video input. This method is implemented by executing instructions on one or more processors in a resolver service. The resolver service is implemented in a programmed server, base station, or gateway to which the receiving devices are connected via wireless, wired or combination of wired and wireless network connection. In an exemplary configuration, the receiving devices are mobile telephones or tablets of the audience members, which receive audio of the movie from a theater's speaker system via microphones and transport digital audio into memory buffers via audio transport. In the analogous case for video, video frames are captured via the device's camera or received in-line via video receiver and held in frame buffers. A signal detector in a program (firmware, or software of the operating system or application program) executing in the receiving device, accesses the audio-video signal in the buffers and executes detection on signal segments, as the incoming stream gets transferred through the buffers. Other configurations are also possible, such as where audience members are watching a live event stream via TV broadcast or IP network, and the receiving devices of the stream are either the mobile devices exposed to the ambient audio-video from a TV or like output device, or are in-line receivers of the electronic audio-video signal, such as a set top box or television. The receiving devices execute an application program that processes detections of the detector, issues requests to the resolver service, gets responses to the requests, and manages rendering of payoff output on the receiving device display, speaker, haptic actuator, of the like according to a trigger from the resolver service. The resolver service coordinates synchronized rendering of the payoff across the receiving devices by determining what payoff to trigger and when to trigger it based on detections that the receiving devices provide to it. For the sake of illustration, we will depict an example based on audio signal detection. A similar methodology can be implemented on video signal detection.

FIG. 33 illustrates the method from the perspective of the resolver service. A first device in the resolver service, e.g., a programmed processor receives requests for a recognition triggered response (1600). These requests correspond to signals detected in the audio-video input of the receiving devices. In the exemplary audio watermark application, the signal detector comprises an audio watermark detector that detects and provides decoded watermark payloads extracted from time segments of content. These payloads, as described, provide identifiers and/or timing information. These identifiers and/or timing markers may be unique to a particular movie or program to enable unique identification of program segments, and thus, unique payoff for that program segment. Additional context information provided by the application can also serve the role of identifying the program or instance of the program such that the combination of context and generic timing payloads are sufficient to identify a program segment and its corresponding payoff.

The application program executing on the receiving device establishes a network connection with the resolver service through which it sends requests in network packet form via network protocol for recognition triggered responses. Additionally, it is useful for the application program to time stamp the payload detection event and request with a time stamp from a local device clock, and also include in the request the GPS location of the receiving device, where available.

Next, the resolver server determines active receiving devices that are receiving common audio-video input (1602). This common audio-video input comprising a time segment of an audio-video program. The resolver services determines the active receiving devices by grouping requests from devices based on the detected signals identified in the requests by the plurality of receiving devices. In particular, the resolver identifies receiving devices exposed to a common audio video input by the identifying information ascertained by the detector process, and as needed, context information to identify the program. In the case of the watermark, this identifying information is a payload, which includes an identifier, e.g., such as a segment identifier or program identifier and counter value. The identifiers of a time sequence of program segments are preferably encoded in a predetermined sequence. This pattern of identifiers enables the resolver services to group requests from devices based on proximity of the identifiers (e.g., as measured in numerical distance, or based on predetermined arrangement of payloads). In one embodiment, the resolver service also further limits the group of active devices exposed to a particular content stream by the time stamp and/or GPS location provided by the receiving devices in their requests to the resolver.

Having identified the program segment, the resolver server determines a time proximate response for the segment (1604). In the case of synchronizing a payoff across plural receiving devices, the time proximate response is a trigger instruction for an identifier of the payoff to be rendered on the users' devices for the common program segment. Preferably, the application program on the user devices has already identified the program and has obtained the auxiliary or supplemental content, such as a web page (HTML, XML, HTML5, etc.), video, animation, audio, haptic response, or the like. See, for example, US Application Publications 20130308818 (U.S. Pat. No. 9,292,894), incorporated by reference. The trigger instruction provides a time proximate response relative to the location in the program timeline where the detected identifiers in the incoming requests are clustered. The resolver identifies the payoff identifier corresponding to the program segment by looking up the payoff identifier that is indexed by or correlated to the program segment identifier in a database. In some implementations, the resolver service does not need to include an explicit payoff identifier in the trigger instruction that it returns for a particular program segment because the receiving device infers the payoff identifier from the program segment that the trigger pertains to. The receiving devices independently queue up the payoff for the program segment that they identify locally or that the resolver identifies, and initiate rendering that payoff in response to the trigger instruction from the resolver.

The resolver services synchronizes the payoff across the active devices by accumulating requests within a waiting period and sending the trigger instruction to the active receiving devices with a program timeline offset indicating when the devices should render the payoff of a program segment. Due to the noted differences in the active devices, the requests from these devices will reflect different detection times for a common program segment. The resolver service correlates requests by program segment identifier that it ascertains from the requests. In one embodiment, for example, the resolver service creates a program timeline for an identified group of active receiving devices from a series of detection results provided in a series of requests from the receiving devices. It accumulates requests for a program segment by instantiating a timer for a waiting period relative to an initial request. Over the waiting period, it accumulates requests for a trigger of a program segment. At the end of the waiting period, it sends the trigger instruction to the active receiving devices with program time offset indicating the time to initiate rendering of the payoff of that program segment. In FIG. 33 this process is reflected at block 1606, at which the resolver sends a recognition triggered response to the active receiving devices (1606).

In an audio watermark embodiment, the resolver service uses the timing marks it receives from all the listening devices to build and a content timeline. When the same payload comes in at the resolver through multiple devices at different times, then the resolver service knows how delayed these devices are with respect to each other (assuming network delays are uniform). The resolver service uses estimated delays between the devices as well as additional timing marks to continue refining the timeline.

The resolver service keeps account of currently active listening devices based on the frequency at which they are transmitting detected payloads. Once the resolver service receives a payload that requires delivery of recognition triggered services from one (or sub-set) of currently active listening devices, then it will deliver the trigger instruction for the services, at the same time, to all currently active devices listening.

In some applications, the resolver service also accounts for latencies due to distance between the listening devices and the audio-visual signal transmission source. For long audio path latencies, consider a case where the listening device is located at the back of a huge venue with the audio-visual signal coming from a big projector screen and speakers at the far end, e.g., 300 meters away for a second of audio path at a speed of sound of 300 m/sec.

The audio is out of synch with the visual experience, so any direct watermark derived interactive experience will be at least a second delayed relative to the main audio-visual display screen.

The pooled data from other user's devices situated around the venue (some closer to, some further away from the main screen and speakers) is used in this case to help determine path latencies for all users as follows.

Each listening device time stamps upon capture the audio captured through its microphone, and associates it with the buffered audio. The time stamp may be provided by a globally synchronized clock on the listening devices.

The watermark detector then reads the audio and recovers time values for watermark events (e.g., watermark transitions for payloads encoded in the audio of that audio capture).

When the watermark times found by the detector are sent to the resolver service, along with the actual time at which the audio sample was captured, the resolver has two pieces of information. It then starts to compare audio capture times of other user's watermark events, to compare relative locations (audio latencies).

The resolver service sends data back to the users with instructions to adjust when an interactive event should be triggered on each device. Clearly, the device cannot trigger a user's interactive event by watermark before the audio has arrived, unless it can use a running time-code to trigger an event at time X in the AV by triggering it at time X-d where d is the estimated delay between AV event and the audio arriving at the user's device.

If the interactive event is to be synchronized to the audio rather than video, the delay 'd' is not subtracted from the time for triggering; otherwise, the interaction would be too soon, preempting the audio.

The device location (e.g., from GPS/cell-tower triangulation, or like positioning means) are passed to this resolver service to help in calculating the relative location of the source to the listener(s).

A number of system enhancements may be included to optimize synchronization between a receiving device and resolver device, as well as among receiving devices. One enhancement is to time stamp packets to ascertain and compensate for network latency between the resolver and receiving devices. For instance, the receiving device, resolver service, or both, are configured to measure round trip time of a packet transmission between receiving device and resolver to estimate network latency and adjust the time to trigger the payoff accordingly. This is useful where the receiving device relies on the program timeline of the resolver, as opposed to maintaining a local program timeline.

In other embodiments, the receiving and resolver devices are configured to synchronize their local clocks. For instance, in one configuration, receiving devices and resolver service synchronize their clocks via time synchronization protocol such as Inter-range Instrumentation Group (IRIG), e.g., IRIG-B, IEEE 1394 Extensions, IEEE 1588, or the like.

The receiving devices may further enhance their internal timing of detection events and payoff trigger output times by compensating for transport delay in the incoming audio signal path and rendering delay in the payoff output path.

Real Time Timeline Construction

Introduction

In this section, we detail technology for real-time construction of a program timeline. Timeline construction provides a better resolution of program time as well as provides a smooth estimation of the "actual" program time. This method provides the timeline construction from watermark detections on an incoming stream of host content, obtained from an in-line or ambient sampled audio or video signal stream. For applications of robust watermark detection involving ambient detection, we generally recommend that watermark payload in the host content be switched not less than every 3 to 6 seconds. While a longer duration payload buffer leads to improved robustness, it does so at the expense of timing resolution. Moreover, due to harsh ambient conditions, it may not be possible to detect all the watermarks embedded within a program. Having a method to estimate program timeline based on detected watermark(s) becomes important for a variety of applications. This approach for constructing a timeline from detections is compatible with both audio watermarking and fingerprinting techniques for generating timeline data.

One reason for this flexibility is that it applies to signal detection technologies that provide detection results for segments of a content stream in which the detection result itself does not initially provide a time position within the segment, yet forms part of a detection sequence from which the method derives a more granular timeline. This applies to watermark detection, where the detection result corresponds to a segment of audio or video signal without finer specificity, yet a timeline formed from higher resolution program times within such segment is needed. Likewise, the method applies to detection in fingerprint matching systems, where the detection corresponds to a most probable match. For example, fingerprint-matching embodiments generate fingerprints from the received audio or video segment in the buffer of a receiver, match them to a database of reference fingerprints, and return the most probable matching audio or video segment in a reference database. For optimal performance, the fingerprint database for the program is stored in RAM memory of the receiving device for matching within the memory at runtime, yet that same function may also be provided remotely at a server. Examples of fingerprints for audio-video signal segments include frequency domain peak locations, or fingerprints formed from the amplitude change in Fourier magnitude values in bands of sub-segments within an audio or video signal segment. See, for example, US Application Publications 20130308818 (U.S. Pat. No. 9,292,894), 20110276334 and 20020178410, which are hereby incorporated by reference. The match process executed on the fingerprint database provides a program time for this most probable matching segment, if one is found, that meets matching criteria. The program time does not provide a more granular time position within the segment without further matching. For the sake of illustration, we focus the following discussion on embodiments that invoke watermark detection.

The method establishes timeline construction as soon as the first watermark payload is detected. The current implementation of the timeline method requires information about the watermark embedding pattern or buffer size (e.g., 3 second, 6 second and so on). This information about the embedding pattern includes the duration of host signal conveying a particular payload and how frequently the payload changes. Since duration corresponds to a length of content, we also refer to it as the size (e.g., size in seconds of audio over which a payload is redundantly encoded). Information about the watermark duration and frequency of payload change is either known a priori, or is obtained from the payoff associated with a watermark detection. The method requires information about the size of the detection buffer (or read size) and detection slide (read frequency). This information is configured a priori or is obtained from the watermark detector (e.g., the watermark protocol, which may be indicated by part of the watermark payload, provides this information). The specifics of the method are discussed for the case of a 3 second embedded watermark pattern or buffer size and a detector read size of 3 seconds and read frequency of 1 second. This means that each watermark payload signal exists over a 3-second duration of audio. The watermarks change every three seconds. For this case, the method provides an estimate of the program timeline that is at worst 2 seconds apart from the actual program timeline even if just a single payload is detected. Depending on the detection pattern of watermark payloads, one or more paths may cease to exist. However, the method ensures that at least one path will always remain. If this convergence to a single path takes place, then it is assured that the estimated program timeline at every instant is identical to the actual program timeline. Even if more than one path remains, the instantaneously estimated timeline converges to the actual/true program timeline either exactly or to within a second most of the time. The method generally applies for different payload patterns and detector read sizes and frequencies.

The detection path refers to possible positions of program timing. The nature of the signal being detected and/or the detection method does not initially localize the program timing within a segment of content buffered in the detector. For example, this occurs for watermarking applications where instances of the watermark payload are repeated within a segment, and the detector accumulates watermark signal estimates from positions of the different instances and then decodes the payload from the accumulated signal estimates. The payload encodes or indexes a database entry of a program time for the segment. The watermark is encoded in a pattern, such as repeating a payload for a period of time, and then changing it to a new payload. Detection can occur within a clip of content over which the watermark is repeated, but the detector does not reveal the precise start and stop positions (at least without further searching, which is not required in this method). The timeline construction method knows the rate at which the payload is changed, and from the sequence of detection results over time, refines the program time from the detection results.

Figure 24:
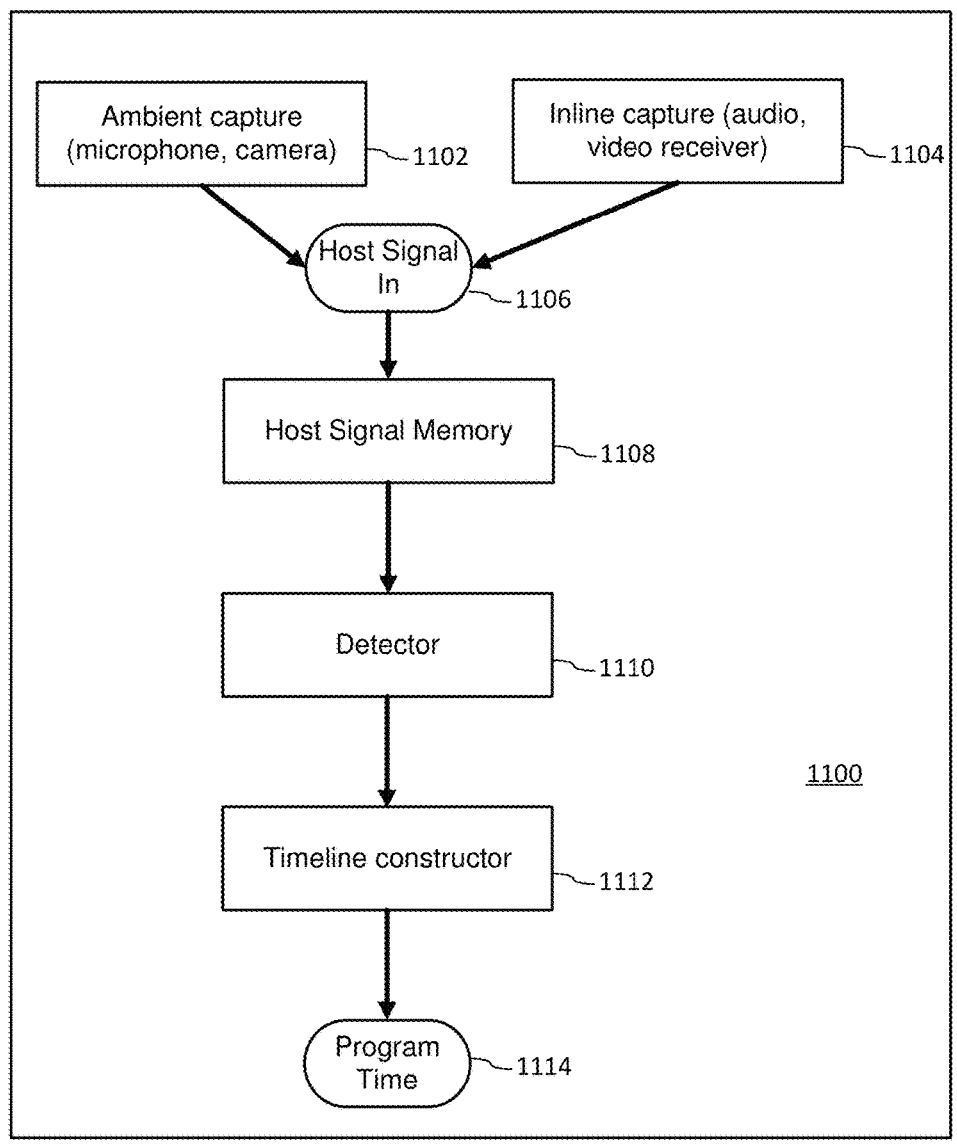
FIG. 24 is a diagram illustrating components of a timeline construction system in a receiving device.

FIG. 24 is a diagram illustrating components of a timeline construction system in a receiving device 1100. The receiving device is one that has a sensor or interface that provides an incoming host signal stream in electronic form. It also has processing logic for signal detection and path estimation. The latter processing logic may be located in a separate device (e.g., a peripheral, host computer, network connected computer (e.g., cloud service)). Examples include mobile devices such as mobile telephones, tablets, wearable computers, or laptops. Additional examples include home entertainment system components (such as audio-video receivers or players), set-top boxes, TVs, audio-video monitoring computers or the like.

The receiving device receives a stream of incoming audio/video either from an ambient capture sensor 1102 or in-line receiver 1104. The ambient capture sensor is a microphone for audio capture, or an image sensor, such as a digital camera, for video capture. In-line receiver is a hardware component that receives the incoming content via a wire or wireless transmission, such as via a broadcast or network. Referred to as the host signal 1106, this incoming stream is buffered in a host signal memory 1108, e.g., such as a RAM memory.

A detector 110 operates on a portion of the incoming stream at a time, which we refer to as a segment. Within this signal segment buffered in memory 1108, the detector 1110 seeks to detect a signal pattern, and if detected, outputs an indication of which signal it has detected. For implementations based on watermark technology, this is a watermark detector. The watermark detector seeks to detect a watermark payload, and outputs the payload when it reliably decodes it. Specific examples of watermark detectors are described in this and incorporated patent documents, such as decoders for time domain or frequency domain watermark signals described above. The method applies to watermark encoding that maps an error correction encoded payload to redundant embedding locations within a host signal segment. The payload is error correction encoded with error correction methods, such as repetition, block, BCH, convolution, Turbo, Reed Solomon, or the like and combinations thereof. The detector operates on a duration of content long enough to include a signal pattern, e.g., plural instances of a watermark payload. The detector 1110 steps through the incoming stream, attempting to detect a signal pattern in a content segment with a duration corresponding to a read buffer size (e.g., 3 or 6 seconds). It advances to a next segment in step increments shorter than the read buffer size (e.g., 1 second), which we refer to as the read frequency.

Detector and buffer operation is configured to keep pace with real time play speed of the incoming signal. As soon as a memory buffer is filled with a segment of incoming signal, the detector executes on the segment in the buffer. The buffer, in one embodiment, is configured in memory to load an incoming segment, while the detector executes on previous segment in the stream that is loaded in memory. The detector executes on a segment faster than real time play speed of the incoming signal, and as such, keeps pace with the program for applications where the time construction must be provided as the incoming signal plays to the viewer/listener.

The detector 1110 provides detection results to a timeline constructor 1112. These detection results provide an indicator of the signal pattern, such as the watermark payload. The timeline constructor 1112 provides an output of a program time (1114) based on its execution of a dynamic path estimation method, which tracks signal pattern detections over time and determines the most likely program time. In particular, the timeline constructor 1112 outputs estimated program time instantaneously. After the first watermark detection, the timeline constructor starts outputting an estimate of the most likely program time at every instance (e.g., 1 second). The most likely path may change as more detection results becomes available.

The detector 1110 and timeline constructor 1112 are implemented as software modules that execute on a processor within the device 1110, such as a CPU, DSP, or the like programmable processor. Alternatively, they may be implemented within digital logic hardware such as a FPGA or ASIC.

Figure 25:
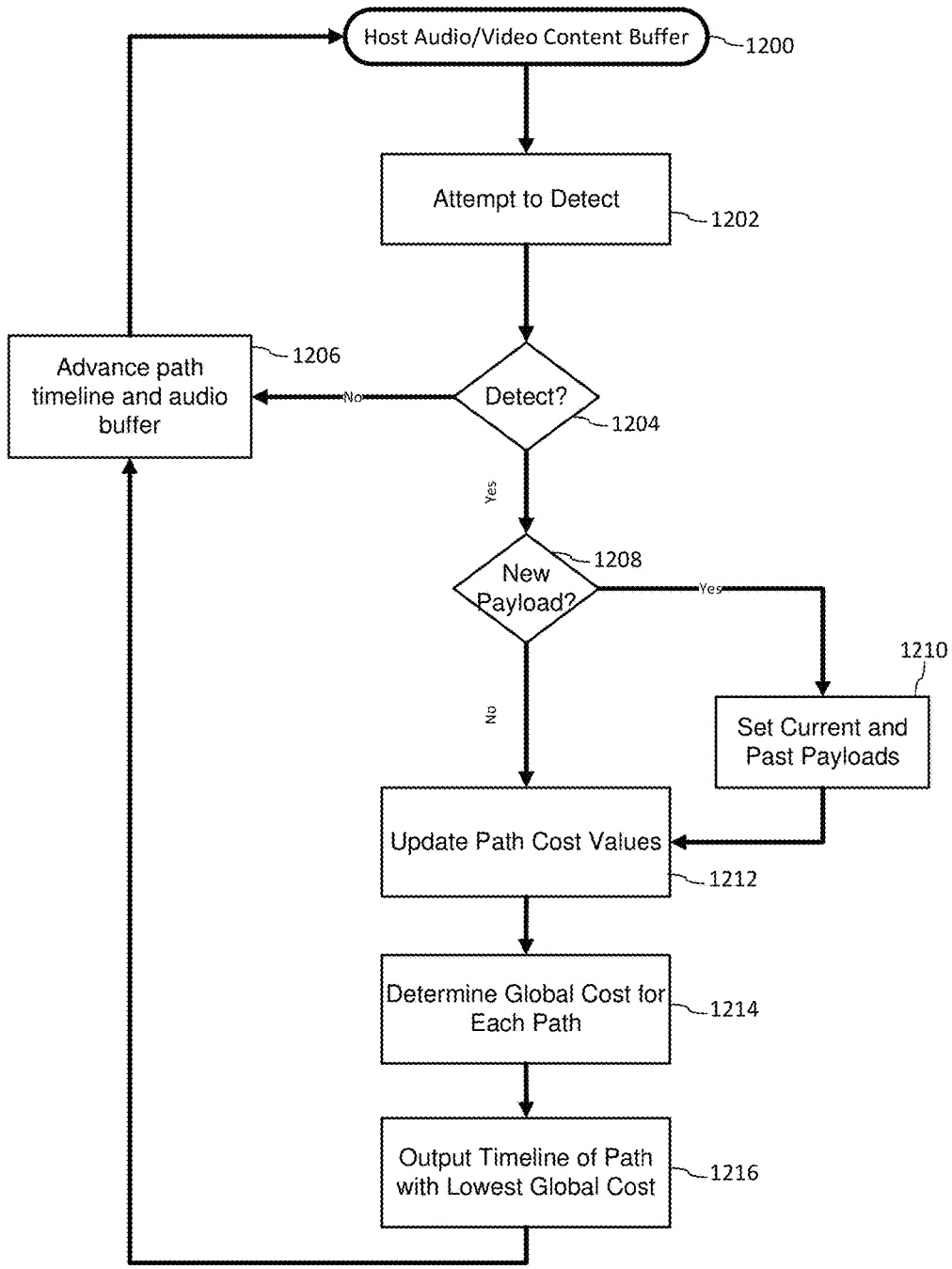
FIG. 25 is a flow diagram illustrating a dynamic path estimation method.

FIG. 25 is a flow diagram illustrating a dynamic path estimation method. We begin with an explanation of the method and then proceed to provide detailed examples. The path estimation method operates on output provided by a detector. For the sake of illustration, we will describe implementations of the method for a watermark detector. This watermark detector operates on an incoming stream of audio/video buffered in a memory unit (1200). The receiving device invokes the watermark detector each time a new segment of the incoming signal has been loaded into the buffer. As shown in block 1202, the watermark detector attempts to detect a watermark signal in the host signal segment within the buffer. As explained further below, the buffer may contain no watermark, a single watermark, or plural watermarks. The latter case occurs, for example, where the buffer contains a signal segment with the end part of first watermark and a starting part of a second watermark. Additionally, the detector may not detect any watermark, even if present, or may only detect particular instances of the watermark somewhere in the buffer.

To briefly recap robust watermark detection, the watermark detector executes a process to attempt to locate and then decode a watermark payload. The particular sub-processes within the locate and decode processes depend on the specifics of the watermark technology employed. Consider an example where a watermark payload is repeated in the host audio in contiguous, sequential frames of length every 128 milliseconds, for 20 frames. In a buffer of 3 seconds of audio, there could be 20 frames of that payload, some lesser number of frames of two watermark payloads, a lesser number of frames of one payload, or no payload at all. In one embodiment, the detector aggregates frames of audio at each of different shifts and attempts to decode a watermark payload from the aggregated frames. In another embodiment, the detector applies a sliding correlation, which includes correlating audio with a watermark signal pattern to locate a candidate watermark position. The watermark detector than attempts to decode a watermark payload at that position, potentially aggregating signal from frames aligned at that candidate position.

The decoding attempt entails, for example, applying error correction decoding on watermark signal estimates to produce a candidate payload, and then checking the candidate payload with error detection to determine whether a valid payload has been recovered. See above examples of error detection, e.g., checking fixed bits, checking CRC bits of the payload, etc. Alternatively, other decoding methods and associated metrics for ascertaining a valid detection metrics may be used. One example is correlation metric that indicates a watermark is detected when a correlation between a watermark pattern and a candidate watermark obtained from the incoming signal exceeds a threshold. This correlation metric is an option, for example, where the expected payloads are more limited in nature, such as a set of payloads used to encode data fields of a time code, and parallel hardware or software instructions efficiently correlate with candidate codes to detect a match.

If the detector fails to decode a payload (1204), it proceeds to the next segment of incoming audio in the buffer (1206). The path estimation method also associates a time with each successful and unsuccessful detection attempt. It uses this information to determine possible detection paths. This operation is reflected in block 1206, which shows that the method advances the path timeline.

If the detector successfully decodes a watermark (1204) from the current buffer of host signal, the detector then determines whether a new watermark has been detected (1208). If a new payload is detected, it updates the detection state to reflect the new current payload, and the past payload or payloads (1210). The method tracks possible detection paths for each payload.

With a detection, the method updates the path cost values as shown in block 1212. The path cost values are values that correspond to likelihood that a possible detection path is correct. The detection path refers to a sequence of watermark payload positions that produce the payload detection results. By compiling evidence of the most likely path, the path estimation method is able to provide a more accurate program time estimate, even though each individual detection result does not provide that time resolution. For each detection, the detection of a payload in the buffer results from possible positions of the watermark pattern as it shifts through the buffer, and these possible positions, in turn, relate to possible program times. The payload in that watermark pattern corresponds to only one program time for the audio segment. As such, the detection may originate from a position within an audio segment that differs from the position of the program time indicated by the payload. Each possible position has a corresponding likelihood based on how much of the watermark signal bearing that payload is in the buffer for that path. As detections proceed, the likelihood changes as the detection of the same or new payload provide additional clues as to the likelihood of a path. Additionally, global constraints indicate which paths are ruled out. The path estimation method constructs potential payload paths for each detected payload. At block 1212, the method updates the cost values for each path.

The method proceeds to determine a global cost for each path as shown in block 1214. The method computes this global cost per path for each payload (current and past). The global cost for a path is the sum of the cost values for the detection results obtained over time.

The method outputs the timeline for the path with the lowest global cost as shown in block 1216. For each advance of the audio in the buffer, this output is the current program time corresponding to the path with lowest cost. The path of lowest cost refers to a particular payload as well as a time adjustment between the time position of the watermark in the buffer and the program time referenced by the payload.

Below, we describe example implementations in more detail.

Program Timeline Construction for the Case of Perfect Synchronization

This initial discussion pertains to the case where the incoming watermarked audio stream is synchronized to a second. Later on, the implementation is discussed for real-world applications wherein the watermarked audio stream received at the detector is not expected to be synchronized. In this first example, we illustrate a scenario where each watermark payload is embedded in an audio signal for a duration of 3 seconds and the embedded payload is changed every 3 seconds. The audio watermark detector uses a detection read size of 3 seconds and a read frequency of 1 second. While we use audio in these examples, the path estimation works for detections in other time varying content, such as video by detecting payloads each encoded over a sequence of frames (e.g., by varying chrominance or luminance of pixels or pixel blocks in the frames).

Figure 26:
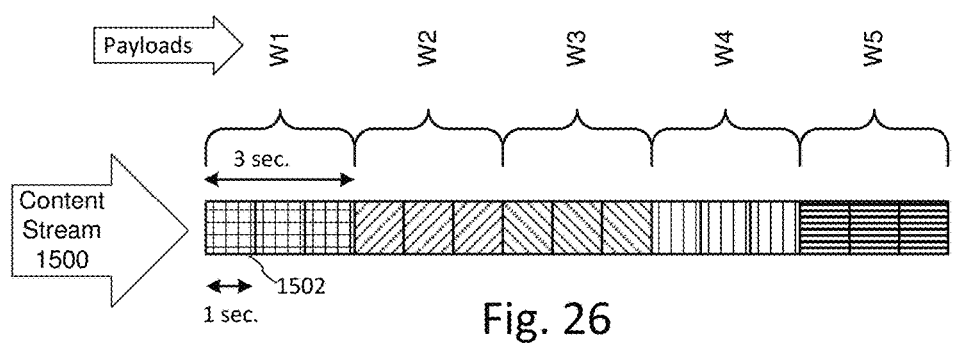
FIG. 26 depicts a watermark embedding pattern for an embodiment of timeline construction using the dynamic path estimation method.

FIG. 26 depicts a watermark embedding pattern for this example. The incoming content signal is represented as a stream of shaded blocks 1500. The shading of the signal changes with the change in watermark payloads embedded in it. The payloads are labeled, W1, W2, W3, W4, and W5. Note that the payload changes every 3 seconds, whereas the audio signal is advanced by 1 second for each detection attempt, which corresponds to the read frequency. Each small square represents one second segment of audio.

Figure 27:
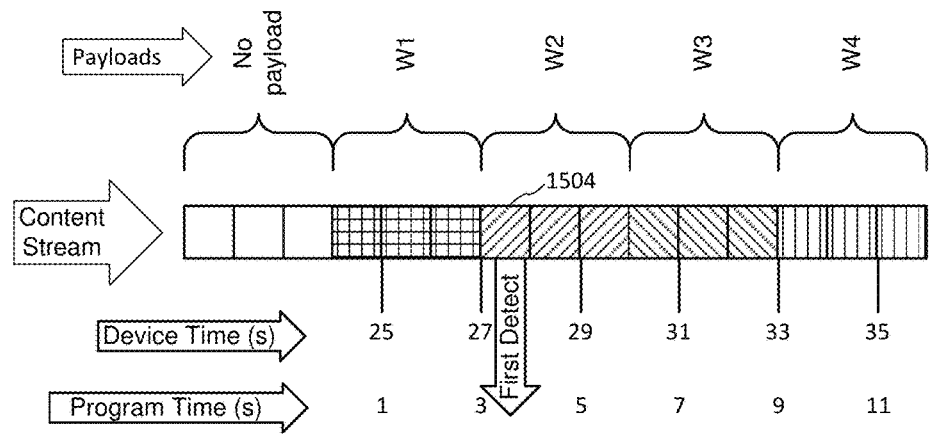
FIG. 27 illustrates an example of real time timeline construction where the audio received by the watermark detector is synchronized to a second.

FIG. 27 illustrates a case where the audio received by the watermark detector is synchronized to a second. The first detection of a watermark payload (shown at the first block 1504 of the segment containing W2) leads to five possible "paths" resulting in the detection of this payload.

Figure 28:
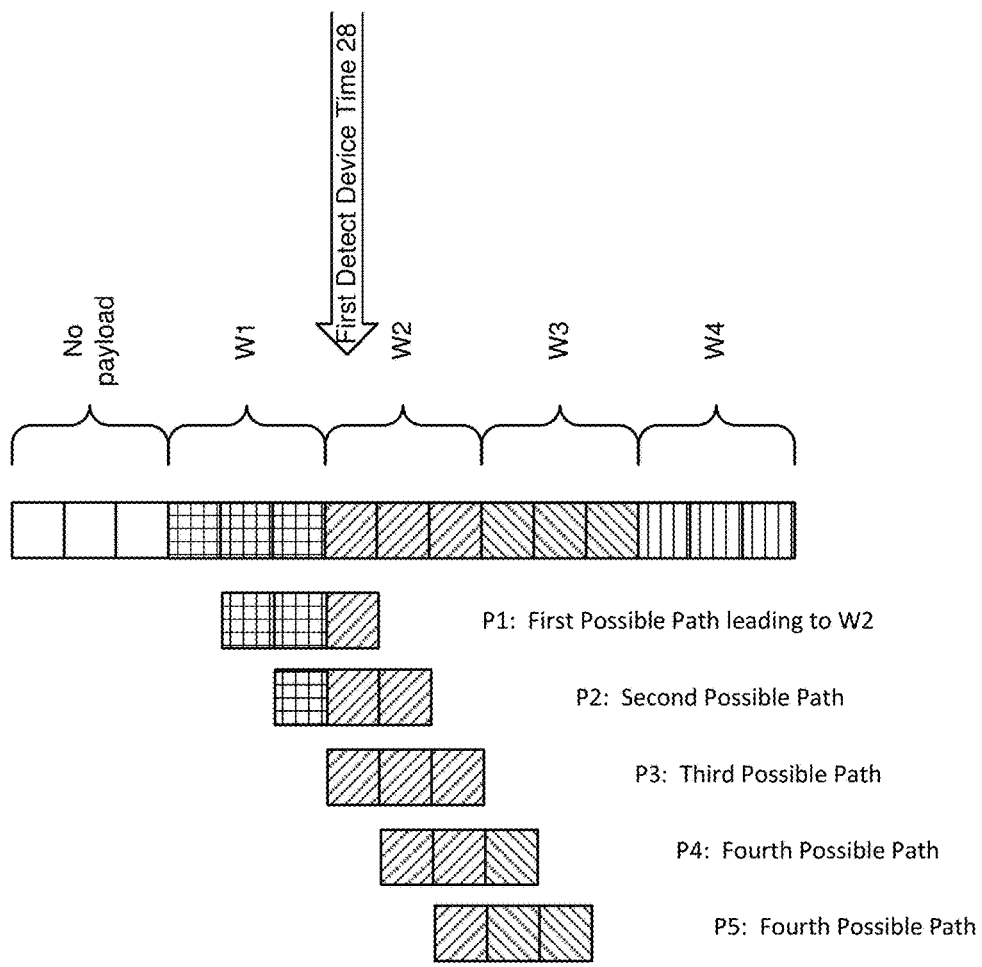
FIG. 28 depicts five possible detection paths, P1, P2, P3, P4, and P5, corresponding to a detection of payload, W2, and each of these detection paths provide possible program timing.

FIG. 28 depicts the five possible detection paths, P1, P2, P3, P4, and P5, corresponding to a detection of payload, W2. These paths correspond to five possible positions of the watermark segment having W2 that could have produced the detection result. The method establishes these five possible paths and associates each of these paths with a program time value at each instance based on the program time indicated by the decoded payload. As the audio watermark detector slides by $\alpha=1$ second and proceeds to decode the next 3-second detection buffer, each of the paths are incremented in time by $\alpha$ seconds.

Referring to FIGS. 27 and 28, let us suppose that the first detection of a watermark happens at device time instance 28 seconds of decoding and the detected payload (W2) or its associated pay-off indicate the program time to be 6 seconds. This value may be encoded in the payload, or looked up in a database indexed by a number in the payload. We will refer to this program time indicated from the detection as the detected program time to distinguish it from the actual program time and the estimated program time output obtained from path estimation. Under conditions of perfect synchronization (to a second), the actual program time at this instance could be one of the five possibilities—(i) 4 seconds, (ii) 5 seconds, (iii) 6 seconds, (iv) 7 seconds, or (v) 8 seconds. These paths are shown in FIG. 28 as P1, P2, P3, P4 and P5. These are the only five possible paths that could have led to the detection of this payload as any other path/timeline would not correspond to a detection buffer even partially containing watermarked audio with watermark W2. In general, if the first decoded payload indicates a detected program time of $\tau$ seconds, then the program time corresponding to each of the five initial paths is $\tau-2$, $\tau-1$, $\tau$, $\tau+1$, and $\tau+2$. Here, the implementation is programmed so that detected program time, $\tau$, corresponds to the location of the right-most 1-second buffer during embedding. It could have instead corresponded to the left-most buffer in which case the offsets would be $\tau$, $\tau+1$, $\tau+2$, $\tau+3$ and $\tau+4$. The rest of the examples assume that $\tau$ corresponds to the time of the right-most 1-second buffer. In any case, the detected program time, $\tau$, could be converted easily to represent one or the other time index.

Merely based on this first detection, the method does not have any information about which of these five paths is the actual program timeline. However, the method will make an instantaneous decision on program timeline based on the cost function described in the next section. Each subsequent detection of the payload provides an opportunity to prune certain paths if they do not satisfy the global path constraints, which are also are also described in the next section. In the absence of any subsequent watermark detection, the method proceeds by incrementing the path timelines and outputting the timeline corresponding to the "least" cost path at every instance (or detection slide) unless instructed to terminate the process.

Figure 29:
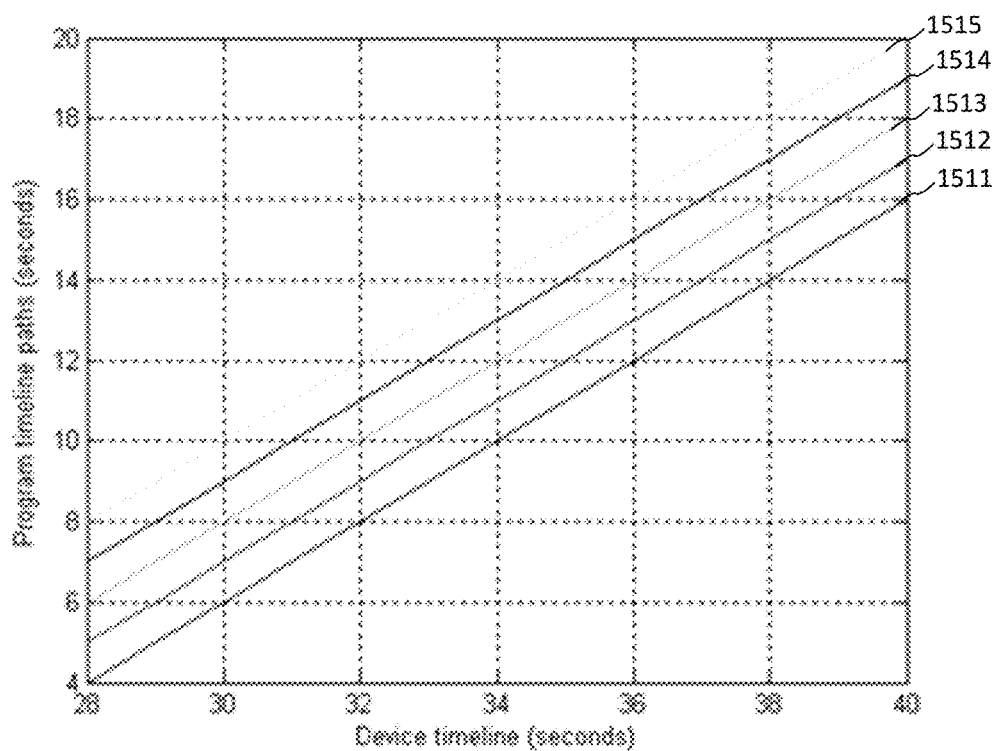
FIG. 29 is a plot illustrating program timelines for possible detection paths.

FIG. 29 is a plot illustrating program timelines for possible detection paths. The first detected payload leads to the establishment of five possible program timelines (1511, 1512, 1513, 1514 and 1515) corresponding to the five detection paths. The timelines are shown in different starting times of 4 to 8 seconds. Each subsequent read or detection slide by 1 second, leads to these paths being incremented by 1 second every time. A path is eliminated if it does not satisfy the global path constraints.

Cost Function and Global Path Constraints

The cost function is related to the duration of the watermarked host signal carrying the payload in question and contained in any given 3-second buffer of a program timeline/path. The inverse of the cost function called the area function is first defined where in each 1 second sub-segment of the audio is assigned an area of 0.33 units. The one second is of significance here due to its relationship to the detector slide or read frequency. Since the embedding was carried out in 3-second segments, a 3-second segment of the path in question containing 3 seconds of watermarked audio would correspond to an area of one unit. Defining the area function in this manner is related to the notion that the average likelihood of a particular watermark detection is related to the duration of watermarked audio containing the same watermark in the detection buffer. For any given path and any given alignment with respect to the "actual" payload time, the following area and cost function values shown in Table 1 are possible.

TABLE I

Area and cost functions

| # units of audio containing watermark X | Area function | Cost function |
|---|---|---|
| 0 | 0 | 1/0 or infinity |
| 1 | 0.33 | 3 |
| 2 | 0.67 | 2 |
| 3 | 1 | 1 |

In an implementation, the area function is set to a small epsilon value rather than 0 (say, 0.0000001) to avoid an undefined value of cost function. Higher the cost function, lower the likelihood of presence of the watermark in question.

Based on the cost function in Table 1, the paths P1, P2, P3, P4 and P5 at the device time instance of 28 seconds (see FIG. 28) are associated with cost values of 3, 2, 1, 2, and 3, respectively. Hence the lowest cost path at device time of 28 seconds is path P3. Path P3 at this instance corresponds to an estimated program time of 6 seconds as shown in FIG. 28. Hence, the method outputs estimated program time of 6 seconds at device time of 28 seconds. The unknown "actual" program time at this instance was 4 seconds. The worst-case estimate deviates from the "actual" program time by at most 2 seconds. During subsequent detection attempts, the path timelines are incremented by the detection slide and the cost is determined (discussed in the next section). The global cost is calculated for each path by taking the sum of the cost associated with this path since its inception at the very first watermark detection. The program time associated with the path with the least global cost is output as the estimated program time at that instance.

Each of the five possible paths obtained in the case of perfect synchronization are in turn subject to global path constraints. Failure to satisfy a global path constraint at any given instance would lead to the elimination of the particular path. Global path constraints are defined based on the expected patterns of watermark embedding. For the case of 3-second embedding of every new watermark payload, a newly detected payload can only exist within at most +/−2 seconds of the detected program time if the audio is synchronized to a second. The detected program time could be obtained from the payoff associated with watermark detection (e.g., a database look-up) or could be programmed to correspond to the detection of a particular watermark. A global path constraint for the case of perfect synchronization is that the absolute value of the difference between the program time indicated by a particular path and that indicated by the detected program time is less than 2 seconds. For example, if the detected watermark indicates a detected program time of $\tau=18$ seconds, then the particular detection could only be the result of the right-most 1-second buffer aligned at program time of 16, 17, 18, 19, or 20 seconds. If a path is associated with a program time $\mu$ such that $abs(\mu-\tau)>2$, then this path is improbable and is eliminated.

Figure 30:
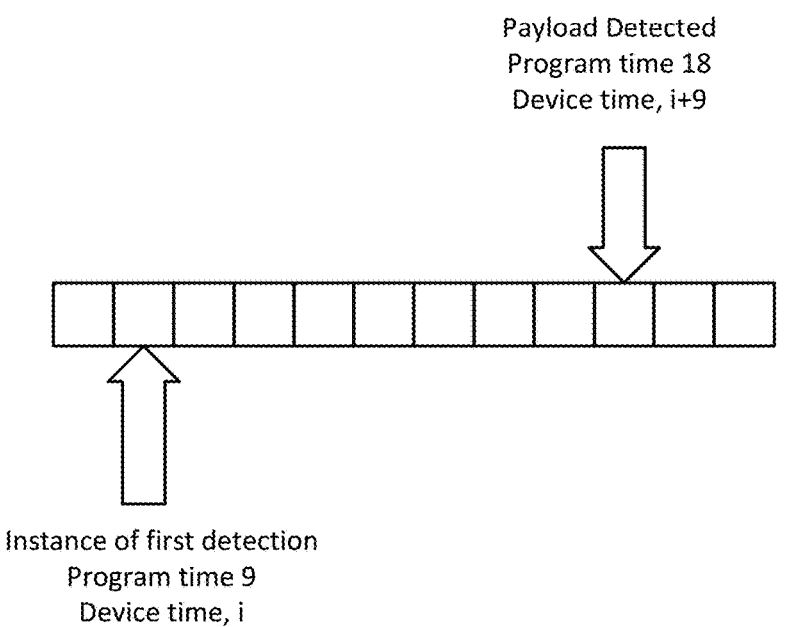
FIG. 30 provide an example showing how the detection of a new payload could lead to the elimination of an existing path if a global constraint is not satisfied.

FIG. 30 provide an example showing how the detection of a new payload could lead to the elimination of an existing path if a global constraint is not satisfied. In this case, the remapping of paths to the newly detected program time of 18 seconds leads to path P1 being discarded as its program time of 15 could not have led to the detection of payload corresponding to program time 18.

Additional global path constraints are defined based on the expected pattern of past and current payloads in the stream. A "current" payload is a recurrence of an already detected immediate prior payload. A "past" payload is a recurrence of a payload immediately prior to the unique payload value detected preceding it. The recurrence of a past payload is highly unlikely but not impossible and hence is considered in the implementation. A "future" payload is a new payload which did not appear before. Every time a new payload appears, a remapping of paths to the cost function takes place by factoring the relative time difference between the path time and the detected program time indicated by the newly detected payload value. This is discussed further in the next section. Additional path constraints are defined in Tables 2A and 2B based on the difference between the path time and the detected program time at the instance of initial detection of the current payload.

TABLE 2A

Global path constraints applied when a current payload is detected

| Diff. path time and payload program time ($\mu - \tau$) | Timeline starting at current device time i | | | | | | |
|---|---|---|---|---|---|---|---|
| | I | i + 1 | i + 2 | i + 3 | i + 4 | i + 5 | i + 6 |
| | Constraints on detection of current payload. One (1) indicates current payload could have occurred. Zero (0) indicates current payload could not have occurred and hence corresponding path should be discarded | | | | | | |
| −2 | 1 | 1 | 1 | 1 | 1 | 0 | 0 |
| −1 | 1 | 1 | 1 | 1 | 0 | 0 | 0 |
| 0 | 1 | 1 | 1 | 0 | 0 | 0 | 0 |
| 1 | 1 | 1 | 0 | 0 | 0 | 0 | 0 |
| 2 | 1 | 0 | 0 | 0 | 0 | 0 | 0 |

TABLE 2B

Global path constraints applied when a past payload is detected.

Diff. path time and payload program time (μ − τ): Timeline starting at current device time i. Constraints on detection of past payload. One (1) indicates past payload could have occurred. Zero (0) indicates past payload could not have occurred and hence corresponding path should be discarded

| time (μ − τ) | I | i + 1 | i + 2 | i + 3 | i + 4 | i + 5 | i + 6 |
|---|---|---|---|---|---|---|---|
| −2 | 1 | 1 | 0 | 0 | 0 | 0 | 0 |
| −1 | 1 | 0 | 0 | 0 | 0 | 0 | 0 |
| 0 | 0 | 0 | 0 | 0 | 0 | 0 | 0 |
| 1 | 0 | 0 | 0 | 0 | 0 | 0 | 0 |
| 2 | 0 | 0 | 0 | 0 | 0 | 0 | 0 |

According to Table 2A, if a current payload first appeared at device time i and appears again at time i+1, then the path corresponding to a difference between program time of a path and detected payload time (μ−τ) equal to 2 is improbable and is discarded. If the same payload appears again at time i+2, then the path corresponding to (μ−τ) equal to 1 is discarded. If the same payload appears for a fourth time at device time i+2, then the path corresponding to (μ−τ) equal to 0 is discarded. If the same payload appears for a fifth time, then only the path corresponding to (μ−τ) equal to −2 remains. Table 2B determines the path constraints for the less likely case where in a previously detected payload appears at time i+1 after the detection of the current payload at time i. In this case, only the path corresponding to (μ−τ) equal to −2 could have led to such a detection and all other paths are discarded.

The constraints discussed here are for the case where the watermarked audio is synchronized to a second. At least one path will always survive. If the timeline converges to a single path, then with certainty it would represent the "true" program timeline. The cost function and global path constraints for the more realistic case of desynchronized watermarked audio at the detector, are covered in the section discussing generalization for desynchronized host signal. The path estimation method for the case of synchronized audio is discussed next.

Timeline Estimation for Synchronized Watermarked Audio

The path estimation method establishes the five possible timeline paths (P1, P2, P3, P4, and P5 shown in FIG. 28) as soon as the first payload is detected. If the detected program time, the time indicated by the payload/payoff, is τ, then the fives paths represent program times τ−2, τ−1, τ, τ+1, and τ+2. Any subsequent detection attempt will lead to each of the paths to be incremented in time by the detection slide (α=1 second). The costs associated with these paths initially are 3, 2, 1, 2, 3, respectively as determined by Table 1. Since the least cost path at this instance is P3, the method outputs the estimated program time at this instance as "τ". At the next detection attempt, the 3-second detection buffer is advanced in time by 1 second (or could be any other α seconds) and the program time is estimated depending on which of the following scenarios plays out.

i. Additional detections of an already detected or "current" payload ii. Detection of a new payload iii. Absence of a payload detection iv. Detection of a past payload These scenarios are discussed in detail below.

i. Additional Detections of an Already Detected or "Current" Payload

Let us suppose that the first detection happened at time instance i and the same payload was detected again at (device) instance i+1. The existing path timelines are advanced by a second as determined by the detection slide. This results in the five paths representing program time τ−1, τ, τ+1, τ+2, and τ+3. Following this, the global path constraints as defined in Table 2A are applied and any improbable path is removed or labeled as "non-existing". For example, in this case where the second detection is the same payload, path P5 is untenable and should not exist. The number of existing paths is updated. Any non-existing path (P5) is associated with a very high cost value such as β=1000000 units and this prevents its selection. The cost of the existing paths at instance i+1 is calculated. It can be recalled that the costs of paths P1, P2, P3, P4 and P5 at instance i were 3, 2, 1, 2, and 3, respectively. Due to the slide by one second at time instance i+1, the costs of paths P1, P2, P3, P4 and P5 are 2, 1, 2, 3, and β, respectively. This is because the duration of watermarked audio containing the payload in question and underlying each of these paths has changed due to the shift of the detection buffer by one second.

This is illustrated in FIG. 31. Referring to FIG. 31, cost of the paths is updated at every 1-second detection slide by factoring in the impact of the slide on the assumed area of audio containing the particular watermark traversing each of the surviving paths. The gain or loss in area of currently watermarked audio depends on the initial assumed location of each path along with the number of slides.

The global cost of each path is calculated by taking the sum of its cost since the path's inception. The timeline associated with the path having the least global cost at time i+1 is output as the estimated timeline at time i+1.

In FIG. 31, the second column in each table contains a field called "path to cost" mapping. At the very first detection, the path to cost mapping for the 5 paths is initialized to 1, 2, 3, 4, and 5, respectively. Since the detection at time i+1 was also of the same payload, the path to cost mapping remains the same. However, if a new payload is detected, then the path to cost mapping may be modified depending on the time difference between program time as indicated by the decoded payload and the timing associated with each path. This is explained further in the next section.

ii. Detection of a New Payload

With every new detection attempt, the path timelines are advanced by the duration of the detection slide (1 second in this discussion, but the slide length/read frequency may be adapted for the desired application constraints). For example, let us suppose that a new payload was detected at time i+4 and the existing paths at this time are P1, P2, P3 and P4. Let's say that the detected program time associated with the newly decoded payload/payoff is τ+3. The existing four paths at time i+4 represent program timelines τ+2, τ+3, τ+4, and τ+5, respectively. The main global path constraint requiring that the absolute value of the difference between a path time and the detected program time not exceed a value of 2 is applied. In this case, all four paths satisfy this constraint.

TABLE 3

Path to cost mapping based on difference between path time and payload time.

| Diff. path time and payload program time (μ − τ) | Path to cost mapping |
|---|---|
| −2 | 1 |
| −1 | 2 |
| 0 | 3 |
| 1 | 4 |
| 2 | 5 |

The path to cost mapping is determined next based on the time difference indicated by the decoded payload and that indicated by each existing path. For the four existing paths, this time difference is −1, 0, 1, and 2, respectively. The mapping is carried out just once for every newly detected payload. So the paths P1, P2, P3 and P4 will be associated with path to cost mapping of 2, 3, 4, and 5, respectively. This is shown in Table 3. The path to cost mapping is, in turn, used to determine the cost associated with each path at this instance (i+4). Table 4 shows the relationship between path to cost mapping, area/duration of watermarked audio and cost.

TABLE 4

Path to cost mapping and cost values based on difference between path time and payload time.

| Diff. path time and payload program time (μ − τ) | Path to cost mapping | Area/duration of payload (1-second units) | Cost |
|---|---|---|---|
| −2 | 1 | 1 | 3 |
| −1 | 2 | 2 | 2 |
| 0 | 3 | 3 | 1 |
| 1 | 4 | 2 | 2 |
| 2 | 5 | 1 | 3 |

The cost for each existing path is obtained from Table 4. Hence, the paths P1, P2, P3 and P4 will be assigned costs 2, 1, 2 and 3 as their path to cost mapping is 2, 3, 4, and 5, respectively. At this point, the newly detected payload is set as the "current" payload and the previous current payload is set as the "past" payload. The global cost is calculated for each path by summing the cost from the very first detection to this point in time. The timeline associated with the path having the least global cost is output as the estimated program timeline.

If the newly assigned "current" payload value is detected again at a subsequent time, then the path to cost mapping remains the same. However, the cost associated with each path is determined by factoring the new time and its impact on the duration of watermarked audio underlying each path. This can be seen in Table 5 for this example by setting the time k to i+4. Any subsequent detections of the same payload will have cost values in rows 2, 3, 4, and 5 of the corresponding time column. The steps outlined in the previous section are executed to get an estimate of the program timing at successive detection(s) of the current payload.

TABLE 5

Change in cost for different cost to path mappings at successive detection attempts.

| | Path to cost mapping | First detection of a payload W happens at k | | | | | |
|---|---|---|---|---|---|---|---|
| (μ − τ) | | K | k + 1 | k + 2 | k + 3 | k + 4 | k + 5 |
| | | Cost at successive time instances starting at k | | | | | |
| −2 | 1 | 3 | 2 | 1 | 2 | 3 | β |
| −1 | 2 | 2 | 1 | 2 | 3 | β | β |
| 0 | 3 | 1 | 2 | 3 | β | β | β |
| 1 | 4 | 2 | 3 | β | β | β | β |
| 2 | 5 | 3 | B | β | β | β | β | iii. Absence of a Payload Detection

A successive detection attempt may not result in a successful watermark detection. Even in this case, the path timeline must be incremented in time by the duration of the detection slide (1 second). No global path constraints are applied. That is, paths considered "existing" or "non-existing" remain the same. There are two options for assigning the path cost in this case for already "existing paths". The cost of all existing paths could either be set to 0 or copied from that of the previous successful detection. The latter option was shown experimentally to result in smoother program timeline estimates and hence is the preferred option. The non-existing paths are assigned a large cost value of β to prevent their selection. The global cost is calculated for each path as before by summing its cost since the very first payload detection. The timing associated with the path having the least global cost is output as the estimated program time at this instance.

iv. Detection of a Past Payload

Under highly unlikely circumstances, a past payload may be detected following the detection of the current payload. The timeline of the paths is first incremented by the duration of the detection slide or 1 second. Following this, the global path constraints as defined in Table 2B are applied for the (μ−τ) corresponding to the path to cost mapping associated with the current (not past) payload. While applying the path constraints defined in Table 2B, the path to cost mapping leading to (μ−τ) provides the row information and the number of successive detections since the "current" (not past) payload first appeared provides the column information. It is apparent from Table 2B that the only time a path can result in the generation of a past payload after the detection of a current payload is for μ−τ=−2.

The four steps described above cover all possible states for timeline construction in the case of synchronized audio. The timeline generation starts with the first payload detection and continues throughout the duration of programming. The method provides an estimate of the program timeline that is at worst 2 seconds apart from the actual program timeline even if just a single payload is detected. Depending on the detection patterns of watermark payloads, one or more paths may cease to exist. However, the method ensures that at least one path will always remain. If this convergence to a single path takes place, then it is assured that the estimated program timeline at every instant is identical to the actual program timeline. Even if more than one path remains, the instantaneously estimated timeline converges to the actual/true program timeline either exactly or to within a second most of the time.

Generalization for Desynchronized Audio

The incoming watermarked audio stream is not expected to be synchronized as is the case in most real-world applications. The audio watermark detector is expected to be continuously decoding audio and the watermarked program could start anywhere. It is also possible that only a partial segment of the watermarked audio is aired. The generalization of the method is discussed for the case where each watermark payload is embedded for a duration of 3 seconds and the embedded payload is changed every 3 seconds. The audio watermark detector uses a detection read size of 3 seconds and a read frequency of 1 second. In this example embodiment, the audio watermark has an embedding frame size of 2048 samples at 16 kHz or 0.128 seconds. The watermark payload is 24 bits and combined with error detection bits (e.g., 24 CRC), and this combined sequence of variable payload bits is convolution encoded (e.g., at rate 1/3). The encoded variable bits are repeated in a repetition pattern. Additionally, version bits (e.g., 12 versions) are conveyed as Hadamard codes, leading to a repetition pattern comprising 120 bits. These encoded version bits are combined with the repeated, encoded variable bits and mapped to FFT bins of an FFT of the 2048 samples of the audio frame.

In this configuration, the shortest watermarked buffer required for detection is assumed to be 0.1 seconds. The 0.1 second quantity is called the fractional slide in this implementation. If necessary, the method could use fractional slide less than 0.1 seconds. This will increase the number of available paths. Since the method is computational light, there should not be any impact on computational cost due to the increase in the number of paths. A fractional slide of 0.1 seconds results in 59 different paths for a 3-second embedding of each unique payload and detection involving a 3-second detection buffer and 1-second detection slide. One the 59 paths corresponds to the "true" program timeline to within 0.1 second resolution in the desynchronized case. Each consecutive path differs in time by the value of the fractional slide. Using a finer composition of paths, the method is generalized for desynchronized audio.

The 59 assumed paths involve different assumptions about the underlying duration of the currently detected watermarked audio. At the first detection, the very first path is assumed to be the consequence of a 2.9 seconds of a previously embedded payload (or unmarked audio) and 0.1 seconds of the current payload. The second path is assumed to be the consequence of 2.8 seconds of a previously embedded payload and 0.2 seconds of the current watermarked audio, and so on. The 59$^{th}$ path is assumed to be the result of the last 0.1 seconds of the current payload and 2.9 seconds of the next payload. Just as before, the cost functions of this generalized method are derived based on the area/duration of the particular watermarked audio underlying these paths. Using the same measure of 0.33 units per second of watermarked audio, the following table lists the costs associated with the different durations of watermarked audio underlying a path at any time.

TABLE 6

Cost function related to the duration of audio containing the "current" watermark. The values are for a fractional slide of 0.1 seconds.

| # units of audio containing watermark X | Area function | Cost function |
| --- | --- | --- |
| 0 | 0 | 1/0 or infinity |
| 0.1 | 0.033 | 30.30 |
| 0.2 | 0.066 | 15.15 |
| 0.3 | 0.1 | 10.10 |

TABLE 6-continued

Cost function related to the duration of audio containing the "current" watermark. The values are for a fractional slide of 0.1 seconds.

| # units of audio containing watermark X | Area function | Cost function |
| --- | --- | --- |
| 0.4 | 0.133 | 7.58 |
| 0.5 | 0.165 | 6.06 |
| 0.6 | 0.198 | 5.05 |
| 0.7 | 0.231 | 4.33 |
| 0.8 | 0.264 | 3.79 |
| 0.9 | 0.297 | 3.37 |
| 1 | 0.33 | 3.03 |
| 1.1 | 0.363 | 2.75 |
| 1.2 | 0.396 | 2.53 |
| 1.3 | 0.429 | 2.33 |
| 1.4 | 0.462 | 2.16 |
| 1.5 | 0.495 | 2.02 |
| 1.6 | 0.528 | 1.89 |
| 1.7 | 0.561 | 1.78 |
| 1.8 | 0.594 | 1.68 |
| 1.9 | 0.627 | 1.59 |
| 2 | 0.66 | 1.51 |
| 2.1 | 0.693 | 1.44 |
| 2.2 | 0.726 | 1.38 |
| 2.3 | 0.759 | 1.32 |
| 2.4 | 0.792 | 1.26 |
| 2.5 | 0.825 | 1.21 |
| 2.6 | 0.858 | 1.17 |
| 2.7 | 0.891 | 1.12 |
| 2.8 | 0.924 | 1.08 |
| 2.9 | 0.957 | 1.04 |
| 3.0 | 1 | 1 |

Each of the 59 paths map to one of the different rows of Table 6 at any given time in terms of duration of audio containing the watermark in question and the associated cost. As the detector progresses in time, the duration of the watermark audio changes with each 1-second detection slide. This is shown in FIG. 31 for the case of the very first payload detection which leads to the initialization of all 59 paths. During subsequent detections of new payloads, the alignment between payload time and path time may require remapping (as discussed in case of perfect synchronization).

Figure 32:
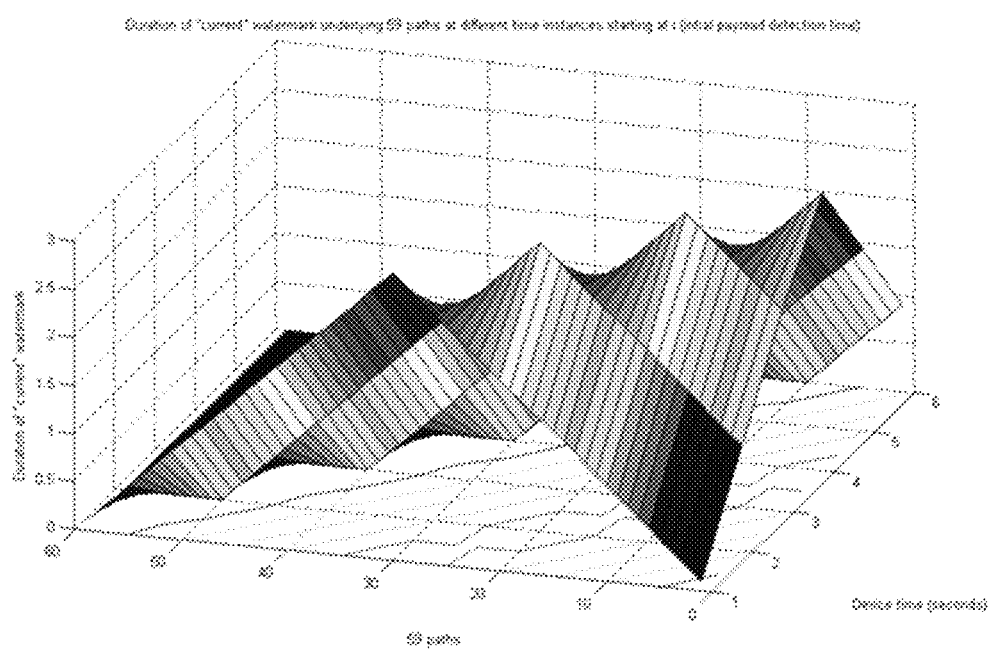
FIG. 32 depicts a surface plot showing the duration of signal watermarked with the initial detected payload for each of the 59 paths as they progress in time.

FIG. 32 depicts a surface plot showing the duration of audio watermarked with the initial detected payload for each of the 59 paths as they progress in time.

The global path constraints are such that any path that differs in time by more than 2.9 seconds from the detected payload time should be discarded. Only paths that are within 2.9 seconds of the "current" payload time should survive. Additional path constraints for current and past payload detections are derived from this basic path constraint and are listed in Table 7A and 7B. The constraints in Tables 7A and 7B are equivalent to the ones defined in Tables 2A and 2B for the synchronize case. The path to cost mapping is listed in Table 8 as a function of the difference between payload time and path time. The re-mapping listed in Table 8 is carried out every time a new payload is detected.

TABLE 7A

Global path constraints applied when a current payload is detected

| Diff. path time and payload program time (μ − τ) | i | i + 1 | i + 2 | i + 3 | i + 4 | i + 5 | i + 6 |
|---|---|---|---|---|---|---|---|
| | Constraints on detection of current payload. One (1) indicates current payload could have occurred. Zero (0) indicates current payload could not have occurred and hence corresponding path should be discarded | | | | | | |
| −2.9 | 1 | 1 | 1 | 1 | 1 | 1 | 0 |
| −2.8 | 1 | 1 | 1 | 1 | 1 | 1 | 0 |
| −2.7 | 1 | 1 | 1 | 1 | 1 | 1 | 0 |
| −2.6 | 1 | 1 | 1 | 1 | 1 | 1 | 0 |
| −2.5 | 1 | 1 | 1 | 1 | 1 | 1 | 0 |
| −2.4 | 1 | 1 | 1 | 1 | 1 | 1 | 0 |
| −2.3 | 1 | 1 | 1 | 1 | 1 | 1 | 0 |
| −2.2 | 1 | 1 | 1 | 1 | 1 | 1 | 0 |
| −2.1 | 1 | 1 | 1 | 1 | 1 | 1 | 0 |
| −2 | 1 | 1 | 1 | 1 | 1 | 0 | 0 |
| −1.9 | 1 | 1 | 1 | 1 | 1 | 0 | 0 |
| −1.8 | 1 | 1 | 1 | 1 | 1 | 0 | 0 |
| −1.7 | 1 | 1 | 1 | 1 | 1 | 0 | 0 |
| −1.6 | 1 | 1 | 1 | 1 | 1 | 0 | 0 |
| −1.5 | 1 | 1 | 1 | 1 | 1 | 0 | 0 |
| −1.4 | 1 | 1 | 1 | 1 | 1 | 0 | 0 |
| −1.3 | 1 | 1 | 1 | 1 | 1 | 0 | 0 |
| −1.2 | 1 | 1 | 1 | 1 | 1 | 0 | 0 |
| −1.1 | 1 | 1 | 1 | 1 | 1 | 0 | 0 |
| −1.0 | 1 | 1 | 1 | 1 | 0 | 0 | 0 |
| −0.9 | 1 | 1 | 1 | 1 | 0 | 0 | 0 |
| −0.8 | 1 | 1 | 1 | 1 | 0 | 0 | 0 |
| −0.7 | 1 | 1 | 1 | 1 | 0 | 0 | 0 |
| −0.6 | 1 | 1 | 1 | 1 | 0 | 0 | 0 |
| −0.5 | 1 | 1 | 1 | 1 | 0 | 0 | 0 |
| −0.4 | 1 | 1 | 1 | 1 | 0 | 0 | 0 |
| −0.3 | 1 | 1 | 1 | 1 | 0 | 0 | 0 |
| −0.2 | 1 | 1 | 1 | 1 | 0 | 0 | 0 |
| −0.1 | 1 | 1 | 1 | 1 | 0 | 0 | 0 |
| 0 | 1 | 1 | 1 | 0 | 0 | 0 | 0 |
| 0.1 | 1 | 1 | 1 | 0 | 0 | 0 | 0 |
| 0.2 | 1 | 1 | 1 | 0 | 0 | 0 | 0 |
| 0.3 | 1 | 1 | 1 | 0 | 0 | 0 | 0 |
| 0.4 | 1 | 1 | 1 | 0 | 0 | 0 | 0 |
| 0.5 | 1 | 1 | 1 | 0 | 0 | 0 | 0 |
| 0.6 | 1 | 1 | 1 | 0 | 0 | 0 | 0 |
| 0.7 | 1 | 1 | 1 | 0 | 0 | 0 | 0 |
| 0.8 | 1 | 1 | 1 | 0 | 0 | 0 | 0 |
| 0.9 | 1 | 1 | 1 | 0 | 0 | 0 | 0 |
| 1.0 | 1 | 1 | 0 | 0 | 0 | 0 | 0 |
| 1.1 | 1 | 1 | 0 | 0 | 0 | 0 | 0 |
| 1.2 | 1 | 1 | 0 | 0 | 0 | 0 | 0 |
| 1.3 | 1 | 1 | 0 | 0 | 0 | 0 | 0 |
| 1.4 | 1 | 1 | 0 | 0 | 0 | 0 | 0 |
| 1.5 | 1 | 1 | 0 | 0 | 0 | 0 | 0 |
| 1.6 | 1 | 1 | 0 | 0 | 0 | 0 | 0 |
| 1.7 | 1 | 1 | 0 | 0 | 0 | 0 | 0 |
| 1.8 | 1 | 1 | 0 | 0 | 0 | 0 | 0 |
| 1.9 | 1 | 1 | 0 | 0 | 0 | 0 | 0 |
| 2 | 1 | 0 | 0 | 0 | 0 | 0 | 0 |
| 2.1 | 1 | 0 | 0 | 0 | 0 | 0 | 0 |
| 2.2 | 1 | 0 | 0 | 0 | 0 | 0 | 0 |
| 2.3 | 1 | 0 | 0 | 0 | 0 | 0 | 0 |
| 2.4 | 1 | 0 | 0 | 0 | 0 | 0 | 0 |
| 2.5 | 1 | 0 | 0 | 0 | 0 | 0 | 0 |
| 2.6 | 1 | 0 | 0 | 0 | 0 | 0 | 0 |
| 2.7 | 1 | 0 | 0 | 0 | 0 | 0 | 0 |
| 2.8 | 1 | 0 | 0 | 0 | 0 | 0 | 0 |
| 2.9 | 1 | 0 | 0 | 0 | 0 | 0 | 0 |

TABLE 7B

Global path constraints applied when a past payload is detected.

| Diff. path time and payload program time (μ − τ) | i | i + 1 | i + 2 | i + 3 | i + 4 | i + 5 | i + 6 |
|---|---|---|---|---|---|---|---|
| | Constraints on detection of past payload. One (1) indicates past payload could have occurred. Zero (0) indicates past payload could not have occurred and hence corresponding path should be discarded | | | | | | |
| −2.9 | 1 | 1 | 1 | 0 | 0 | 0 | 0 |
| −2.8 | 1 | 1 | 1 | 0 | 0 | 0 | 0 |
| −2.7 | 1 | 1 | 1 | 0 | 0 | 0 | 0 |
| −2.6 | 1 | 1 | 1 | 0 | 0 | 0 | 0 |
| −2.5 | 1 | 1 | 1 | 0 | 0 | 0 | 0 |
| −2.4 | 1 | 1 | 1 | 0 | 0 | 0 | 0 |
| −2.3 | 1 | 1 | 1 | 0 | 0 | 0 | 0 |
| −2.2 | 1 | 1 | 1 | 0 | 0 | 0 | 0 |
| −2.1 | 1 | 1 | 1 | 0 | 0 | 0 | 0 |
| −2 | 1 | 1 | 0 | 0 | 0 | 0 | 0 |
| −1.9 | 1 | 1 | 0 | 0 | 0 | 0 | 0 |
| −1.8 | 1 | 1 | 0 | 0 | 0 | 0 | 0 |
| −1.7 | 1 | 1 | 0 | 0 | 0 | 0 | 0 |
| −1.6 | 1 | 1 | 0 | 0 | 0 | 0 | 0 |
| −1.5 | 1 | 1 | 0 | 0 | 0 | 0 | 0 |
| −1.4 | 1 | 1 | 0 | 0 | 0 | 0 | 0 |
| −1.3 | 1 | 1 | 0 | 0 | 0 | 0 | 0 |
| −1.2 | 1 | 1 | 0 | 0 | 0 | 0 | 0 |
| −1.1 | 1 | 1 | 0 | 0 | 0 | 0 | 0 |
| −1.0 | 1 | 0 | 0 | 0 | 0 | 0 | 0 |
| −0.9 | 1 | 0 | 0 | 0 | 0 | 0 | 0 |
| −0.8 | 1 | 0 | 0 | 0 | 0 | 0 | 0 |
| −0.7 | 1 | 0 | 0 | 0 | 0 | 0 | 0 |
| −0.6 | 1 | 0 | 0 | 0 | 0 | 0 | 0 |
| −0.5 | 1 | 0 | 0 | 0 | 0 | 0 | 0 |

TABLE 7B-continued

Global path constraints applied when a past payload is detected.

Timeline starting at current device time i

| Diff. path time and payload program time ($\mu - \tau$) | i | i + 1 | i + 2 | i + 3 | i + 4 | i + 5 | i + 6 |
|---|---|---|---|---|---|---|---|
| | Constraints on detection of past payload. One (1) indicates past payload could have occurred. Zero (0) indicates past payload could not have occurred and hence corresponding path should be discarded | | | | | | |
| −0.4 | 1 | 0 | 0 | 0 | 0 | 0 | 0 |
| −0.3 | 1 | 0 | 0 | 0 | 0 | 0 | 0 |
| −0.2 | 1 | 0 | 0 | 0 | 0 | 0 | 0 |
| −0.1 | 1 | 0 | 0 | 0 | 0 | 0 | 0 |
| 0 | 0 | 0 | 0 | 0 | 0 | 0 | 0 |
| 0.1 | 0 | 0 | 0 | 0 | 0 | 0 | 0 |
| 0.2 | 0 | 0 | 0 | 0 | 0 | 0 | 0 |
| 0.3 | 0 | 0 | 0 | 0 | 0 | 0 | 0 |
| 0.4 | 0 | 0 | 0 | 0 | 0 | 0 | 0 |
| 0.5 | 0 | 0 | 0 | 0 | 0 | 0 | 0 |
| 0.6 | 0 | 0 | 0 | 0 | 0 | 0 | 0 |
| 0.7 | 0 | 0 | 0 | 0 | 0 | 0 | 0 |
| 0.8 | 0 | 0 | 0 | 0 | 0 | 0 | 0 |
| 0.9 | 0 | 0 | 0 | 0 | 0 | 0 | 0 |
| 1.0 | 0 | 0 | 0 | 0 | 0 | 0 | 0 |
| 1.1 | 0 | 0 | 0 | 0 | 0 | 0 | 0 |
| 1.2 | 0 | 0 | 0 | 0 | 0 | 0 | 0 |
| 1.3 | 0 | 0 | 0 | 0 | 0 | 0 | 0 |
| 1.4 | 0 | 0 | 0 | 0 | 0 | 0 | 0 |
| 1.5 | 0 | 0 | 0 | 0 | 0 | 0 | 0 |
| 1.6 | 0 | 0 | 0 | 0 | 0 | 0 | 0 |
| 1.7 | 0 | 0 | 0 | 0 | 0 | 0 | 0 |
| 1.8 | 0 | 0 | 0 | 0 | 0 | 0 | 0 |
| 1.9 | 0 | 0 | 0 | 0 | 0 | 0 | 0 |
| 2 | 0 | 0 | 0 | 0 | 0 | 0 | 0 |
| 2.1 | 0 | 0 | 0 | 0 | 0 | 0 | 0 |
| 2.2 | 0 | 0 | 0 | 0 | 0 | 0 | 0 |
| 2.3 | 0 | 0 | 0 | 0 | 0 | 0 | 0 |
| 2.4 | 0 | 0 | 0 | 0 | 0 | 0 | 0 |
| 2.5 | 0 | 0 | 0 | 0 | 0 | 0 | 0 |
| 2.6 | 0 | 0 | 0 | 0 | 0 | 0 | 0 |
| 2.7 | 0 | 0 | 0 | 0 | 0 | 0 | 0 |
| 2.8 | 0 | 0 | 0 | 0 | 0 | 0 | 0 |
| 2.9 | 0 | 0 | 0 | 0 | 0 | 0 | 0 |

TABLE 8

Path to cost mapping based on difference between path time and payload time for a fractional slide of 0.1 seconds.

| Diff. path time and payload program time ($\mu - \tau$) | Path to cost mapping |
|---|---|
| −2.9 | 1 |
| −2.8 | 2 |
| −2.7 | 3 |
| −2.6 | 4 |
| −2.5 | 5 |
| −2.4 | 6 |
| −2.3 | 7 |
| −2.2 | 8 |
| −2.1 | 9 |
| −2 | 10 |
| −1.9 | 11 |
| −1.8 | 12 |
| −1.7 | 13 |
| −1.6 | 14 |
| −1.5 | 15 |
| −1.4 | 16 |
| −1.3 | 17 |
| −1.2 | 18 |
| −1.1 | 19 |
| −1.0 | 20 |
| −0.9 | 21 |
| −0.8 | 22 |
| −0.7 | 23 |
| −0.6 | 24 |
| −0.5 | 25 |
| −0.4 | 26 |
| −0.3 | 27 |
| −0.2 | 28 |
| −0.1 | 29 |
| 0 | 30 |
| 0.1 | 31 |
| 0.2 | 32 |
| 0.3 | 33 |
| 0.4 | 34 |
| 0.5 | 35 |
| 0.6 | 36 |
| 0.7 | 37 |
| 0.8 | 38 |
| 0.9 | 39 |
| 1.0 | 40 |
| 1.1 | 41 |
| 1.2 | 42 |
| 1.3 | 43 |
| 1.4 | 44 |
| 1.5 | 45 |
| 1.6 | 46 |
| 1.7 | 47 |
| 1.8 | 48 |

TABLE 8-continued

Path to cost mapping based on difference between path time
and payload time for a fractional slide of 0.1 seconds.

| Diff. path time and payload program time ($\mu - \tau$) | Path to cost mapping |
|---|---|
| 1.9 | 49 |
| 2 | 50 |
| 2.1 | 51 |
| 2.2 | 52 |
| 2.3 | 53 |
| 2.4 | 54 |
| 2.5 | 55 |
| 2.6 | 56 |
| 2.7 | 57 |
| 2.8 | 58 |
| 2.9 | 59 |

The steps involved in the method for handling desynchronized audio are similar to the ones for the synchronized case. When a payload is initially detected, the 59 paths and associated timelines are initialized. Each of these paths is associated with an assumed underlying duration of watermarked audio in question. Only one of these 59 paths is the "true" program timeline. The cost values for the 59 paths are obtained from Table 6. The global cost is calculated and the program timing corresponding to the path with the least global cost is output as the estimated program timeline for the instance of the detector slide. As the detector slides every time by one second to attempt the next detection, the timelines of the paths are updated by the duration of the detector slide (1 second). One of the four possible scenarios are possible.

i. Additional detections of an already detected or "current" payload
ii. Detection of a new payload
iii. Absence of a payload detection
iv. Detection of a past payload If a payload was detected as in case of i, ii and iii, the global path constraints are applied and one or more paths could be discarded as a consequence. The cost function is calculated for each path by factoring in the path to cost mapping associated with the detected payload as well as the advancement in time since the first detection of this/current payload. If the payload detected is a new payload, then the path to cost mapping is determined using Table 8. In all cases, the global cost is calculated for each path by summing the cost of the path since its beginning. At every instance, the program time associated with the least global cost path is output as the estimated program time. If no payload is detected, then the cost for each path is assigned as the cost associated with the last detection. The global cost is calculated as before and the estimated program time is generated.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the signal processing operations for watermarking, fingerprinting, path estimation, and timeline construction are implemented, in some embodiments, as instructions stored in tangible computer-readable media (e.g., including semiconductor memory such as volatile memory SRAM, DRAM, etc., non-volatile memory such as PROM, EPROM, EEPROM, NVRAM (also known as "flash memory"), etc., magnetic memory such as a floppy disk, hard-disk drive, magnetic tape, etc., optical memory such as CD-ROM, CD-R, CD-RW, DVD, Holographic Versatile Disk (HVD), Layer-Selection-Type Recordable Optical Disk (LS-R), etc., or the like or any combination thereof) and executed in a programmable computer (including both software and firmware instructions). In other embodiments, these operations are implemented as digital logic circuitry in a special purpose digital circuit, or combination of instructions executed in one or more processors and digital logic circuit modules. The methods and processes described above are implemented in programs executed from a system's memory (a computer readable medium, such as an electronic, optical or magnetic storage device).

Operating Environment

The components and operations of the watermark encoder and decoder are implemented in modules (also referred to as watermark "embedder" and "detector"). Notwithstanding the specific discussion of the embodiments set forth herein, the term "module" refers to software, firmware or circuitry configured to perform the methods, processes, functions or operations described herein. This software is embodied as a software package, code, instructions, instruction sets or data recorded on non-transitory computer readable storage mediums. Software instructions for implementing the detailed functionality is implemented in MatLab or C, and can also be written in C++, Visual Basic, Java, Python, Tcl, Perl, Scheme, Ruby, etc., in conjunction with associated data. Firmware may be embodied as code, instructions or instruction sets or data that are hard-coded (e.g., nonvolatile) in memory devices. As used herein, the term "circuitry" may include, for example, singly or in combination, hardwired circuitry, programmable circuitry such as computer processors comprising one or more individual instruction processing cores, state machine circuitry, or firmware comprised of instructions executed by programmable circuitry.

Implementation can additionally, or alternatively, employ special purpose electronic circuitry that has been custom-designed and manufactured to perform some or all of the component acts, as an application specific integrated circuit (ASIC). To realize such an implementation, the relevant module(s) (e.g., encoding and decoding of machine readable auxiliary messages) are first implemented using a general purpose computer, using software such as MatLab (from Mathworks, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

In view of the many embodiments to which principles of this technology can be applied, it should be recognized that the detailed embodiments are illustrative only and should not be taken as limiting the scope of my inventive work.

Rather, we claim all such embodiments as fall within the scope and spirit of the following claims, and equivalents thereto. (These claims encompass only a subset of what we regard as inventive in this disclosure. No surrender of unclaimed subject matter is intended, as we reserve the right to submit additional claims in the future.)

The particular combinations of elements and features in the above-detailed embodiments are exemplary only; the interchanging and substitution of these teachings with other teachings in this and the incorporated-by-reference patents/applications are also contemplated.

I claim:

1. A method of timeline construction comprising:
buffering an incoming signal in a detection buffer, the incoming signal comprising a host signal in which watermark payloads are encoded in a pattern in which a watermark payload is repeated for a segment of the host signal and then changed to another payload, and the detection buffer stores at least a portion of the segment in which the payload is repeated;
repetitively executing watermark detection on host signal content in the detection buffer to produce a detection result;
for plural detection results, determining possible detection paths;
determining a cost value for the possible detection paths;
computing global costs corresponding to possible detection paths, a global cost comprising a sum of cost function values for a possible detection path; and
outputting an estimated program time associated with a possible detection path of lowest global cost.

2. The method of claim 1 wherein the act of outputting produces a program time at a time granularity less than time length of the incoming signal in the detection buffer.

3. The method of claim 1 wherein the incoming signal is advanced through the buffer in increments, and for each increment:
executing the watermark detection on content in the buffer, updating the global cost of paths based on detection result of the increment, and outputting the program time with lowest global cost.

4. The method of claim 3 wherein the incoming signal is received in a receiving device and buffered as the incoming signal is played at real time play speed, and wherein the outputting of program times keeps pace with real time play speed.

5. The method of claim 1 wherein the incoming signal comprises an audio signal.

6. The method of claim 5 wherein the incoming signal is sensed by a microphone, and the incoming signal is received in a receiving device and buffered as the incoming signal is played at real time play speed, and wherein the outputting of program times keeps pace with real time play speed.

7. The method of claim 1 wherein determining the cost value comprises determining cost of possible detection paths based on area of watermarked signal associated with the possible detection paths.

8. The method of claim 1 comprising determining a difference between a path time of a possible detection path and a program time associated with a detected payload, and eliminating a possible path where the difference indicates that a possible path violates a global constraint.

9. A non-transitory computer readable medium on which is stored executable instructions, which when executed by one or more processors, perform a method of timeline construction comprising:
buffering an incoming signal in a detection buffer, the incoming signal comprising a host signal in which watermark payloads are encoded in a pattern in which a watermark payload is repeated for a segment of the host signal and then changed to another payload, and the detection buffer stores at least a portion of the segment in which the payload is repeated;
repetitively executing watermark detection on host signal content in the detection buffer to produce a detection result;
for plural detection results, determining possible detection paths;
determining a cost value for the possible detection paths;
computing global costs corresponding to possible detection paths, a global cost comprising a sum of cost function values for a possible detection path; and
outputting a program time associated with a possible detection path of lowest global cost.

10. The non-transitory computer readable medium of claim 9 wherein the act of outputting produces a program time at a time granularity less than time length of the incoming signal in the detection buffer.

11. The non-transitory computer readable medium of claim 9 wherein the watermark detection advances through the incoming signal in increments, and for each increment:
executing the watermark detection on content in the buffer, updating the global cost of paths based on detection result of the increment, and outputting the program time with lowest global cost.

12. The non-transitory computer readable medium of claim 11 wherein the incoming signal is received in a receiving device and buffered as the incoming signal is played at real time play speed, and wherein the outputting of program times keeps pace with real time play speed.

13. The non-transitory computer readable medium of claim 9 wherein the incoming signal comprises an audio signal.

14. The non-transitory computer readable medium of claim 13 wherein the incoming signal is sensed by a microphone, and the incoming signal is received in a receiving device and buffered as the incoming signal is played at real time play speed, and wherein the outputting of program times keeps pace with real time play speed.

15. The non-transitory computer readable medium of claim 9 wherein determining the cost value comprises determining cost of possible detection paths based on area of watermarked signal associated with the possible detection paths.

16. The non-transitory computer readable medium of claim 9 comprising determining a difference between a path time of a possible detection path and a program time associated with a detected payload, and eliminating a possible path where the difference indicates that a possible path violates a global constraint.

17. A timeline construction system comprising:
a capture device;
a memory in communication with the capture device, configured to receive an incoming signal, the memory configured to buffer an incoming signal in a detection buffer, the incoming signal comprising a host signal in which watermark payloads are encoded in a pattern in which a watermark payload is repeated for a segment of the host signal and then changed to another payload, and the detection buffer is configured to store at least a portion of the segment in which the payload is repeated;

a detector in communication with the memory, and configured to repetitively execute watermark detection on host signal content in the detection buffer to produce a detection result; and a timeline constructor, in communication with the detector, and configured to determine possible detection paths for plural detection results, configured to determine a cost value for the possible detection paths, and compute global costs corresponding to possible detection paths, a global cost comprising a sum of cost function values for a possible detection path, and configured to output an estimated program time associated with a possible detection path of lowest global cost.

18. The system of claim 17 wherein the timeline constructor is configured to produce a program time at a time granularity less than time length of the incoming signal in the detection buffer.

19. The system of claim 17 wherein the memory is configured to advance the incoming signal through the buffer in increments, and for each increment:

the detector is configured to execute the watermark detection on content in the buffer, and the timeline constructor is configured to update the global cost of paths based on a detection result of the increment and output the program time with lowest global cost.

20. The system of claim 19 wherein the incoming signal is received and buffered as the incoming signal is played at real time play speed, and wherein the output of program times keeps pace with real time play speed.

* * * * *